(12) United States Patent
Yang

(10) Patent No.: US 11,443,458 B2
(45) Date of Patent: Sep. 13, 2022

(54) METHODS AND DECOMPRESSION UNITS FOR DECOMPRESSING A COMPRESSED BLOCK OF IMAGE DATA

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

(*) Notice: Subject to any disclaimer, the term of this patent is extended or adjusted under 35 U.S.C. 154(b) by 99 days.

(21) Appl. No.: 17/001,269

(22) Filed: Aug. 24, 2020

(65) Prior Publication Data

US 2021/0056731 A1 Feb. 25, 2021

(30) Foreign Application Priority Data

Aug. 23, 2019 (GB) ...................................... 1912183
Aug. 23, 2019 (GB) ...................................... 1912184
(Continued)

(51) Int. Cl.
*G06T 9/00* (2006.01)
*G06F 7/50* (2006.01)
(Continued)

(52) U.S. Cl.
CPC .................. *G06T 9/00* (2013.01); *G06F 7/50* (2013.01); *G06F 7/727* (2013.01); *G06T 3/40* (2013.01)

(58) Field of Classification Search
CPC .... G06T 9/00; G06T 9/20; G06T 7/50; G06T 7/80; G06T 7/13; G06T 7/0002;
(Continued)

(56) References Cited

U.S. PATENT DOCUMENTS 10,230,982 B2* 3/2019 Takami .................. H04N 19/42
2009/0295816 A1 12/2009 Kallio
(Continued)

FOREIGN PATENT DOCUMENTS

EP 3059964 A1 8/2016
EP 3035288 B1 7/2018
(Continued)

*Primary Examiner* — Duy M Dang
(74) *Attorney, Agent, or Firm* — Potomac Law Group, PLLC; Vincent M DeLuca

(57) ABSTRACT

Methods and decompression units for decompressing data from a compressed block of image data, the compressed block of image data representing a block of image data comprising a plurality of image element values, the image element values being divisible into at least a first value and a second value such that the block of image data comprises a two-dimensional block of first values. The method comprises: analysing a header of the compressed block of image data to identify (i) a location in a body of the compressed block of image data of a fixed-length parameter that corresponds to a first desired value in the two-dimensional block of first values, and (ii) common base information for the first desired value, the common base information being common to a first set of values comprising all of the two-dimensional block of first values or a portion of the two-dimensional block of first values that includes the first desired value; retrieving the fixed-length parameter that corresponds to the first desired value from the identified location in the body of the compressed block of image data; and generating the first desired value from the common base information and the fixed-length parameter.

20 Claims, 31 Drawing Sheets

(30) Foreign Application Priority Data

Sep. 5, 2019 (GB) .................................. 1912795
Sep. 5, 2019 (GB) .................................. 1912800

(51) Int. Cl.
*G06F 7/72* (2006.01)
*G06T 3/40* (2006.01)

(58) Field of Classification Search
CPC ... G06T 3/40; G06T 1/60; G06T 3/602; G06F 7/727; G06K 9/36; H04N 19/00278; H04N 19/00951; H04N 7/26; H04N 19/00587; H04N 19/0063; H04N 5/23251; H04N 19/136; H04N 19/124; H04N 19/12; H04N 19/126; H04N 19/15; H04N 19/176; H04N 19/115; H04N 19/119; H04N 19/42; H04N 1/41; H04N 1/64; H04N 19/00; H04N 19/186; H04N 19/20; H04N 19/423; H04N 19/90; H04N 19/96

See application file for complete search history.

(56) References Cited

U.S. PATENT DOCUMENTS

| | | | |
|---|---|---|---|
| 2010/0027679 A1* | 2/2010 | Sunahara | H04N 19/70 |
| | | | 375/240.24 |
| 2014/0348437 A1 | 11/2014 | Okamoto | |
| 2017/0278215 A1* | 9/2017 | Appu | G06T 1/60 |
| 2018/0014021 A1* | 1/2018 | Midtskogen | H04N 19/186 |
| 2018/0160129 A1 | 6/2018 | Kalevo et al. | |
| 2018/0293778 A1* | 10/2018 | Appu | G06T 9/00 |
| 2019/0246117 A1 | 8/2019 | Hugosson et al. | |
| 2019/0318524 A1 | 10/2019 | Yang | |

FOREIGN PATENT DOCUMENTS

| | | |
|---|---|---|
| GB | 2451911 B | 3/2010 |
| GB | 2507838 B | 9/2014 |
| GB | 2530312 B | 9/2016 |
| GB | 2530311 B | 1/2017 |

* cited by examiner

32x32 Block (Level 1) — 2302, 2304

| 2310 | 2312 | 2314 | 2316 | | 2318 | | 2320 |
|---|---|---|---|---|---|---|---|
| 0 | 0 | 0 | 1 | | 0000 | | 1010000 |
| CH0 COM | CH1 COM | CH2 COM | CH3 COM | | CH3 LEN | | CH3 COMM. INFO |

16x16 Block 0 (Level 2) — 2306

| 2322 | 2324 | 2326 | 2328 | | 2330 | | 2332 |
|---|---|---|---|---|---|---|---|
| 0 | 0 | 1 | 0 | | 0000 | | 00100011 |
| CH0 COM | CH1 COM | CH2 COM | CH3 COM | | CH2 LEN | | CH2 COMM. INFO |

. . .

16x16 Block 3

| 2334 | 2336 | 2338 | 2340 |
|---|---|---|---|
| 0 | 0 | 0 | 0 |
| CH0 COM | CH1 COM | CH2 COM | CH3 COM |

8x8 Block 0 (Level 3) — 2308

| 2342 | 2344 | 2346 | 2348 | 2350 | 2352 | 2354 | 2356 |
|---|---|---|---|---|---|---|---|
| 1 | 1 | 0 | 0 | 0100 | 0100 | 00100000 | 00101100 |
| CH0 COM | CH1 COM | CH2 COM | CH3 COM | CH0 LEN | CH1 LEN | CH0 COMM. INFO | CH1 COMM. INFO |

. . .

8x8 Block 15

| 2358 | 2360 | 2362 | 2364 | 2366 | 2368 | 2370 | 2372 | 2374 | 2376 |
|---|---|---|---|---|---|---|---|---|---|
| 1 | 1 | 1 | 0 | 0000 | 0100 | 0100 | 00100000 | 00100000 | 00100000 |
| CH0 COM | CH1 COM | CH2 COM | CH3 COM | CH0 LEN | CH1 LEN | CH2 LEN | CH0 COMM. INFO | CH1 COMM. INFO | CH2 COMM. INFO |

METHODS AND DECOMPRESSION UNITS FOR DECOMPRESSING A COMPRESSED BLOCK OF IMAGE DATA

CROSS-REFERENCE TO RELATED APPLICATIONS AND CLAIM OF PRIORITY

This application claims foreign priority under 35 U.S.C. 119 from United Kingdom Application Nos. 1912184.7 and 1912183.9 filed Aug. 23, 2019, and United Kingdom Application Nos. 1912800.8 and 1912795.0 filed Sep. 5, 2019, all incorporated herein by reference in their entireties.

BACKGROUND

Data compression, both lossless and lossy, is desirable in many applications in which data is to be stored in, and/or read from memory. By compressing data before storage of the data in memory, the amount of data transferred to the memory may be reduced. An example of data for which data compression is particularly useful is image data. The term 'image data' is used herein to refer to two-dimensional data that has a value corresponding to each pixel or each sample location of an image that is produced as part of a rasterization process on a Graphics Processing Unit (GPU). Image data includes, but is not limited to, depth data to be stored in a depth buffer, pixel data (e.g. colour data) to be stored in a frame buffer, texture data to be stored in a texture buffer and surface normal data to be stored in a surface normal buffer. These buffers may be any suitable type of memory, such as cache memory, separate memory subsystems, memory areas in a shared memory system or some combination thereof.

A GPU may be used to process data in order to generate image data. For example, a GPU may determine pixel values (e.g. colour values) of an image to be stored in a frame buffer which may be output to a display. GPUs usually have highly parallelized structures for processing large blocks of data in parallel. There is significant commercial pressure to make GPUs (especially those intended to be implemented on mobile/embedded devices) operate at lower power levels. Competing against this is the desire to use higher quality rendering algorithms on fast GPUs, which thereby puts pressure on a relatively limited resource: memory bandwidth. However, increasing the bandwidth of the memory subsystem might not be an attractive solution because moving data to and from, and even within, the GPU consumes a significant portion of the power budget of the GPU. The same issues may be relevant for central processing units (CPUs) as well as GPUs.

FIG. 1 shows an example graphics rendering system 100 which may be implemented in an electronic device, such as a mobile/embedded device. The graphics rendering system 100 comprises a host CPU 102, a GPU 104, a memory 106 (e.g. graphics memory) and a display 108. The CPU 102 is configured to communicate with the GPU 104. Data, which may be compressed data, can be transferred in either direction, between the GPU 104 and the memory 106. Images (e.g. pixel data) which are rendered by the GPU 104 may be stored in memory 106 and displayed on the display 108 via a display interface 116.

The GPU 104 comprises a rendering unit 110, a compression/decompression unit 112, and a memory interface 114. The graphics rendering system 100 is arranged such that data can pass, in either direction, between (i) the CPU 102 and the rendering unit 110; (ii) the CPU 102 and the memory interface 114; (iv) the memory interface 114 and the memory 106; (v) the rendering unit 110 and the compression/decompression unit 112; (vi) the compression/decompression unit 112 and the memory interface 114; and (vii) the memory 106 and the display interface 116. In some examples, the graphics rendering system 100 may be further arranged such that data can pass to and from the compression/decompression unit 112 to the display interface 116, and such that data can pass from the display interface 116 to the display 108.

In operation, the GPU 104 processes regions of image data individually. The regions may for example represent rectangular (including square) portions of the render space (i.e. the two-dimensional space representing, for example, an image area to be rendered). The rendering unit 110 may perform scan conversion and rasterization of graphics primitives, such as, but not limited to, triangles and lines, using known techniques such as Z-tests and texture mapping. The rendering unit 110 may contain cache units to reduce memory traffic. Some data is read or written by the rendering unit 110, to the memory 106 via the memory interface 114 (which may include a cache) but for other data, such as data to be stored in a buffer, such as the frame buffer, the data preferably goes from the rendering unit 110 to the memory interface 114 via the compression/decompression unit 112. The compression/decompression unit 112 reduces the amount of data that is to be transferred across the external memory bus to the memory 106 by compressing the data.

The display interface 116 sends data defining a completed image to the display 108. An uncompressed image may be accessed directly from the memory 106. Compressed data may be decompressed via the compression/decompression unit 112 and sent as uncompressed data to the display 108. In alternative examples the compressed data could be read directly by the display interface 116 and the display interface 116 could include logic for decompressing the compressed data in an equivalent manner to the decompression of the compression/decompression unit 112. Although shown as a single entity, the compression/decompression unit 112 may contain multiple parallel compression and/or decompression units for enhanced performance.

As is known to a person of skill in the art, the rendering unit 110 may generate a set of one or more colour values (e.g. RGB or RGBA) for each pixel in the render space and store the colour values in the frame buffer. The collection of colour values for a frame may be referred to herein as colour data, image data, frame buffer data or simply frame data. The rendering unit 110 may also generate other image data, such as depth data, surface normal data, lighting data, etc., and may store those image data values in one or more buffers in memory. These buffers may, in some cases, be referred to as frame buffers, while in other cases the term "frame buffer" may be reserved for buffers which store colour values or which store data to be sent to the display. In some graphics rendering systems the image data values stored in a buffer for a particular render may be used by the rendering unit 110 to render one or more subsequent frames. For example, colour values generated by one render may be used as texture values in the rendering of one or more subsequent frames, and surface normal values generated for a geometric model in one render may be used to apply lighting effects to the same model during the rendering of one or more subsequent frames.

Since the image data (e.g. colour data) can be quite large the memory bandwidth associated with writing image data to a buffer in memory and reading the image data from the buffer in memory may be a significant portion of the total memory bandwidth of the graphics processing system and/or the GPU. As a result, the image data is often compressed, via the compression/decompression unit 112, prior to being stored in a buffer and decompressed, via the compression/decompression unit 112, after being read from the buffer. Since image data often comprises colour data, compression methods may be designed to suit the particular characteristics of colour image data. In other examples, compression methods may be designed for the different characteristics of depth data, or surface normal data.

Known lossless methods for compressing colour data, such as those described in the Applicant's UK Patents 2451911, 2530312 and 2530311, are configured to divide the colour data into blocks and compress each block individually in a manner that requires the whole block to be decompressed together. For example, in these compression methods an 8×8 pixel block of colour values may be compressed together. Then to access any particular colour value in that block the whole 8×8 pixel block has to be decompressed.

However, the rendering unit 110 doesn't typically need all the data (e.g. colour values) in a block for rendering a subsequent frame. For example, the rendering unit 110 may only need colour values related to a few pixels in a block. Accordingly, having to decompress a whole block to access only a small number of colour values in that block can make accessing the colour data in the frame buffer inefficient for the rendering unit 110.

Attempts have been made to address this problem by caching the decompressed blocks, but in many cases having a cache doesn't significantly improve the efficiency of accessing the data (e.g. colour values) in the frame buffer. Other attempts made to address this problem include reducing the block sizes (e.g. reducing the block size to a 4×4 block of colour values), but the inefficiency of having to decompress a whole block to access the colour values for a few pixels has shown to exist at any block level and the smaller the blocks the less efficient the compression is.

The embodiments described below are provided by way of example only and are not limiting of implementations which solve any or all of the disadvantages of known image data compression and/or decompression methods.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and decompression units for decompressing data from a compressed block of image data, the compressed block of image data representing a block of image data comprising a plurality of image element values, the image element values being divisible into at least a first value and a second value such that the block of image data comprises a two-dimensional block of first values. The method comprises: analysing a header of the compressed block of image data to identify (i) a location in a body of the compressed block of image data of a fixed-length parameter that corresponds to a first desired value in the two-dimensional block of first values, and (ii) common base information for the first desired value, the common base information being common to a first set of values comprising all of the two-dimensional block of first values or a portion of the two-dimensional block of first values that includes the first desired value; retrieving the fixed-length parameter that corresponds to the first desired value from the identified location in the body of the compressed block of image data; and generating the first desired value from the common base information and the fixed-length parameter.

A first aspect provides a method for decompressing data from a compressed block of image data, the compressed block of image data representing a block of image data comprising a plurality of image element values, the image element values being divisible into at least a first value and a second value such that the block of image data comprises a two-dimensional block of first values, the method comprising: analysing a header of the compressed block of image data to identify (i) a location in a body of the compressed block of image data of a fixed-length parameter that corresponds to a first desired value in the two-dimensional block of first values, and (ii) common base information for the first desired value, the common base information being common to a first set of values comprising all of the two-dimensional block of first values or a portion of the two-dimensional block of first values that includes the first desired value; retrieving the fixed-length parameter that corresponds to the first desired value from the identified location in the body of the compressed block of image data; and generating the first desired value from the common base information and the fixed-length parameter.

The first desired value may be generated from the common base information and the fixed-length parameter in accordance with a first fixed-length compression algorithm used to compress the first set of values.

The method may further comprise analysing the header of the compressed block of image data to identify the first fixed-length compression algorithm.

The first set of values may comprise a first portion of the two-dimensional block of first values. The method may further comprise: analysing the header to identify (i) a location in the body of a fixed-length parameter that corresponds to a second desired value of the two-dimensional block of first values, and (ii) common base information for the second desired value, the common base information being common to a second set of values comprising a second portion of the two-dimensional block of first values that includes the second desired value; retrieving the fixed-length parameter that corresponds to the second desired value from the identified location in the body; and generating the second desired value from the common base information for the second desired value and the fixed-length parameter for the second desired value.

The second desired value may be generated from the common base information for the second desired value and the fixed-length parameter for the second desired value in accordance with a second fixed-length compression algorithm used to compress the second set of values.

The first and second fixed-length compression algorithms may be different.

The first and second sets of values may be different sizes.

The block of image data may further comprise a two-dimensional block of second values.

Each value in the two-dimensional block of second values may be a colour value for a second colour channel.

The method may further comprise: analysing the header to identify (i) a location in the body of a fixed-length parameter that corresponds to a third desired value of the two-dimensional block of second values, and (ii) common base information for the third desired value, the common base information being common to a third set of values comprising all of the two-dimensional block of second values or a portion of the two-dimensional block of second values that includes the third desired value; retrieving the fixed-length parameter that corresponds to the third desired value from the identified location in the body; and generating the third desired value from the common base information for the third desired value and the fixed-length parameter for the third desired value.

The third desired value may be generated from the common base information for the third desired value and the fixed-length parameter for the third desired value in accordance with a third fixed-length compression algorithm used to compress the third set of values.

The first and third fixed-length compression algorithms may be different.

The first and third sets of values may be different sizes.

Each first value and each second value may corresponds to a pixel. The body may comprise a pixel data unit for each pixel, the pixel data unit comprising: first data representing the first value in the two-dimensional block of first values corresponding to that pixel, the first data comprising the first value or a fixed-length parameter for that first value generated in accordance with a fixed-length compression algorithm; and second data representing the second value in the two-dimensional block of second values corresponding to that pixel, the second data comprising the second value or a fixed-length parameter for that second value generated in accordance with a fixed-length compression algorithm.

In the body the pixel data units may be grouped into blocks and the first data of each pixel data unit in a block may be the same size and the second data of each pixel data unit in a block may be the same size.

Each block of pixel data units may comprise X pixel data units; the first set of values may comprise Y values of the two-dimensional block of first values; and X is an integer greater than or equal to two and Y is an integer multiple of X Analysing the header to identify a location in the body of the fixed-length parameter that corresponds to the first desired value may comprise: analysing the header to identify a size of the first data for the block of pixel data units corresponding to the first value; analysing the header to identify a size of the second data for the block of pixel data units corresponding to the first value; and determining a location in the body of the pixel data unit corresponding to the first desired value based on the identified sizes of the first data and the second data.

Analysing the header to identify a location in the body of the fixed-length parameter that corresponds to the first desired value may comprise analysing the header to identify a length of the fixed-length parameters for the values in the first set of values, and identifying the location in the body of the fixed-length parameter that corresponds to the first desired value based on the identified length of the fixed-length parameters for the values in the first set of values.

Analysing the header to identify the common base information for the first desired value may comprise analysing the header to identify the first set of values and identifying the common base information associated with the first set of values.

Analysing the header to identify the first set of values may comprise analysing the header to identify a size of a compressed set of values comprising the first desired value, the size of a compressed set of values being one of a plurality of predetermined sizes.

The common base information may comprise information identifying one of one or more predetermined values and the fixed-length parameter has zero bits; and generating the first desired value from the common base information and the fixed-length parameter may comprise using the identified predetermined value as the first desired value.

The one or more predetermined values may comprise only a single value and the information identifying the one of the one or more predetermined values comprises information identifying a particular fixed-length compression algorithm that was used to compress the first set of values.

The one or more predetermined values may comprise a plurality of predetermined values.

The block of image data may further comprise a two-dimensional block of second values; the common base information may comprise information identifying a first predetermined value for the first set of values and a second predetermined value for a second set of values comprising all of the two-dimensional block of second values or a portion of the two-dimensional block of second values; the fixed-length parameter may have zero bits; and generating the first desired value from the common base information and the fixed-length parameter comprises using the first predetermined value as the first desired value.

The common base information may comprise an origin value and the fixed-length parameter comprises a delta value that represents a difference between the first value and the origin value; and generating the first desired value from the common base information and the fixed-length parameter comprises adding the origin value and the delta value to form the first desired value.

The common base information may comprise a plurality of origin values and the fixed-length parameter comprises an index identifying one of the plurality of origin values and a delta value representing a difference between the first value and the identified origin value; and generating the first desired value from the common base information and the fixed-length parameter may comprise identifying one of the plurality of origin values from the index and adding the identified origin value to the delta value to form the first desired value.

The addition of the origin value and the delta value is performed modulo m wherein m is $2^x$ and each first value in the two-dimensional block of first values comprises x bits.

The common base information may comprise a look up table of values and the fixed-length parameter comprises an index to the look up table; and generating the first desired value from the common base information and the fixed-length parameter may comprise identifying one of the values in the look up table from the index and using the identified value as the first desired value.

The common base information may comprise a common value that is common to the first set of values and the fixed-length parameter has zero bits; and generating the first desired value from the common base information and the fixed-length parameter may comprise using the common value as the first desired value.

Each image element value may comprise a colour value.

Each first value of the two-dimensional block of first values may comprise a colour value for a first colour channel.

The block of image data may comprise image data generated by a rasterization process on a graphics processing unit.

A second aspect provides a decompression unit configured to decompress data from a compressed block of image data, the compressed block of image data representing a block of image data comprising a plurality of image element values, the image element values being divisible into at least a first value and a second value such that the block of image data comprises a two-dimensional block of first values, the decompression unit comprising: a header analysis unit configured to analyse a header of the compressed block of image data to identify (i) a location in a body of the compressed block of image data of a fixed-length parameter corresponding to a first desired value of the two-dimensional block of first values, and (ii) common base information for the first desired value, the common base information being common to a first set of values comprising all of the two-dimensional block of first values or a portion of the two-dimensional block of first values that includes the first desired value; a body analysis unit configured to retrieve the fixed-length parameter corresponding to the first desired value from the identified location of the body of the compressed block of image data; and a value generation unit configured to generate the first desired value from the common base information and the fixed-length parameter.

A third aspect provides a decompression unit configured to perform the method of the first aspect.

The compression units, decompression units and compression/decompression units described herein may be embodied in hardware on an integrated circuit. There may be provided a method of manufacturing, at an integrated circuit manufacturing system, a compression unit, a decompression unit or a compression/decompression unit described herein. There may be provided an integrated circuit definition dataset that, when processed in an integrated circuit manufacturing system, configures the system to manufacture the compression unit, the decompression unit or the compression/decompression unit. There may be provided a non-transitory computer readable storage medium having stored thereon a computer readable description of a compression unit, a decompression unit or a compression/decompression unit that, when processed in an integrated circuit manufacturing system, causes the integrated circuit manufacturing system to manufacture an integrated circuit embodying a compression unit, a decompression unit or a compression/decompression unit.

There may be provided an integrated circuit manufacturing system comprising: a non-transitory computer readable storage medium having stored thereon a computer readable description of a compression unit, a decompression unit or a compression/decompression unit described herein; a layout processing system configured to process the computer readable description so as to generate a circuit layout description of an integrated circuit embodying the compression unit, the decompression unit or the compression/decompression unit; and an integrated circuit generation system configured to manufacture the compression unit, decompression unit, or the compression/decompression unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 17 is a schematic diagram of an example compressed block format when the channel blocks are divided into sub-blocks prior to compression;

FIG. 23 is a schematic diagram of an example header for a compressed block when a hierarchical compression scheme is used;

Figure 1:
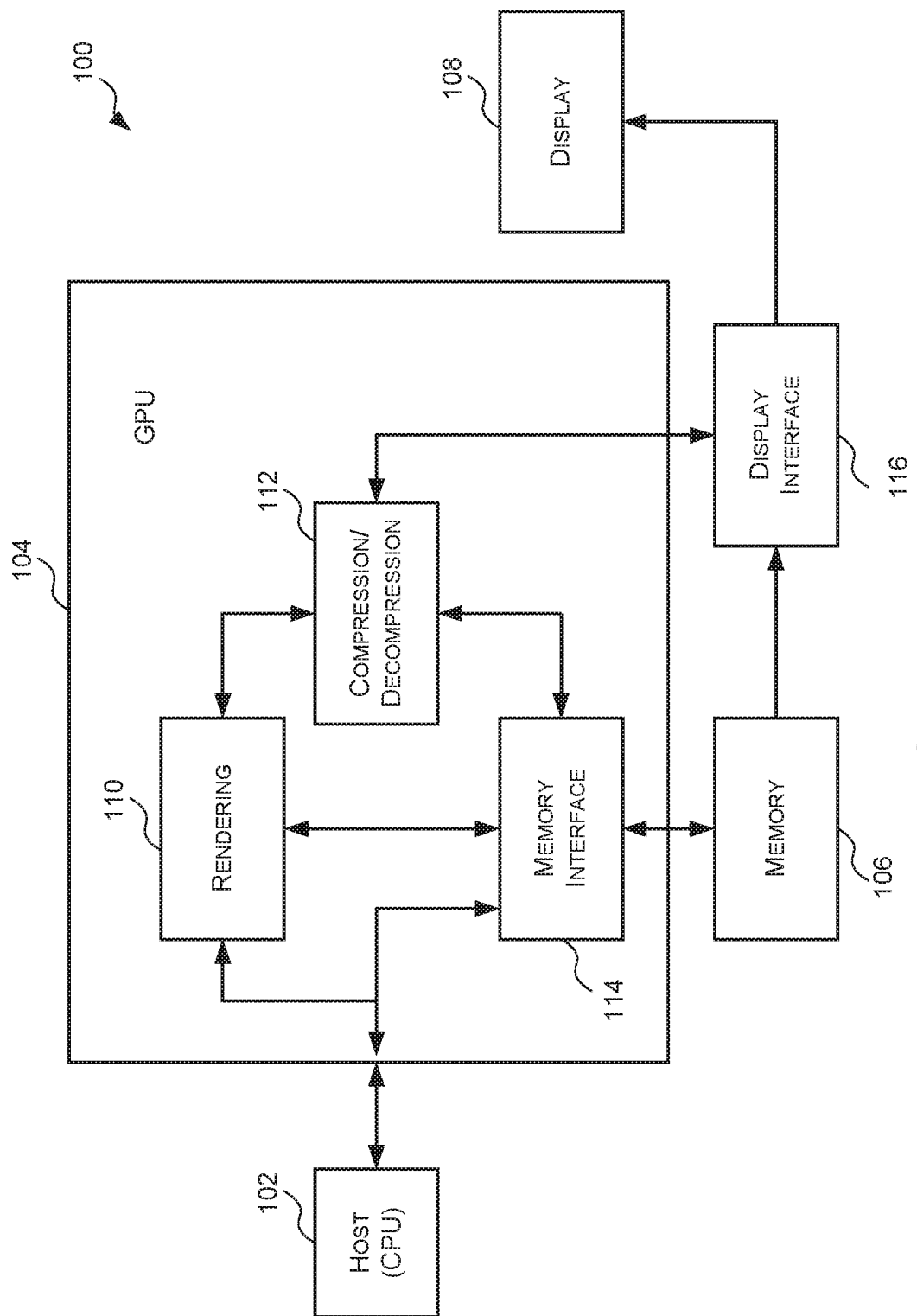
FIG. 1 is a block diagram of an example graphics rendering system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, compressing image data on a block basis in a manner that requires decompression of the whole block to access individual values makes it difficult for the logic, such as the rendering logic, that randomly accesses the image data to access the data efficiently. What is therefore needed is a lossless method of compressing image data which allows the compressed data to be randomly accessed (i.e. individual values in the compressed block can be accessed without having to decompress the whole block).

Accordingly, described herein are methods and systems for compressing a block of image data so that the individual values of the block can be decompressed without having to decompress the whole block. Specifically, described herein are methods and systems for compressing a block of image data that comprises a plurality of image element values (e.g. colour values) that are divisible into at least a first value and a second value (e.g. a first channel colour value and a second channel colour value) such that the image data comprises at least a two-dimensional block of first values (e.g. a two-dimensional block of colour values for the first colour channel) and a two-dimensional block of second values (e.g. a two-dimensional block of colour values for the second colour channel). The term 'image element value' is used herein to refer to the unit of the particular image data. Accordingly the image element value is dependent on the type of image data. For example, for colour data the image element value is a pixel value or colour value (e.g. which may be defined by a set of channel colour values); for depth data the image element value is a depth value; for surface normal data the image element value is a surface normal direction (e.g. which may be defined by a set of values representing a unit vector or one or more angles); and for texture data the image element value is a texel value (e.g. which may be defined by a colour value or a set of colour values).

In the methods and systems described herein each two-dimensional block of values is compressed separately using one or more fixed-length compression algorithms. In particular, in the methods and systems described herein one or more of the two-dimensional blocks of values is compressed by compressing all or a portion of the two-dimensional block of values using a fixed-length compression algorithm wherein values in the block (or a portion thereof) are represented by common base information and a fixed-length parameter for each value in the block (or a portion thereof) that is zero, one or more than one bits in length. A compressed block for the image data is then formed from the common base information and the fixed-length parameters. By compressing a two-dimensional block of values (or a portion thereof) using a fixed-length compression algorithm all of the values in that two-dimensional block (or the portion thereof) are represented using the same number of bits thus the portion of the compressed data that relates to a particular value can be easily identified.

In some example methods and systems described herein the image data is divided into one or more blocks (e.g. 32×32 blocks of image elements, 16×16 blocks of image elements or 8×8 blocks of image elements) and the values in any two-dimensional block of values (e.g. each colour channel) in a block are represented by a fixed number of bits. For example, if the image data is colour data that comprises colour values for four channels numbered 0 to 3 and the image data is divided into 8×8 blocks of pixels then each channel 0 colour value in a particular 8×8 block of pixels will be represented by the same number of bits $b_0$, each channel 1 colour value in that 8×8 block of pixels will be represented by the same number of bits $b_1$, each channel 2 colour value in that 8×8 block of pixels will be represented by the same number of bits $b_2$, and each channel 3 colour value in that 8×8 block of pixels will be represented by the same number of bits $b_3$. Thus if all the bits that relate to the same pixel are packed together to form a pixel data unit then each pixel data unit will have $b_0+b_1+b_2+b_3$ bits. If the pixel data units for a block are then packed together in pixel order to form a block data unit then the start of the pixel data unit for the $i^{th}$ pixel, wherein the first pixel is numbered 0, is at the $i*(b_0+b_1+b_2+b_3)$ bit from the start of the block data unit.

The particular bits of the pixel data unit that correspond to a particular colour value can then be determined from $b_0$, $b_1$, $b_2$, $b_3$ and the ordering of the channels in the pixel data unit. For example if the bits of each channel are packed together in the pixel data unit in channel order then the bits corresponding to the colour value for channel 0 are the first $b_0$ bits in the pixel data unit; the bits corresponding to the colour value for channel 1 are the $b_1$ bits starting from bit $b_0$; the bits corresponding to the colour value for channel 2 are the $b_2$ bits starting from bit $b_0+b_1$; and the bits corresponding to the colour value for channel 3 are the last $b_3$ bits starting from $b_0+b_1+b_2$. Accordingly the compressed blocks generated by the methods and systems described herein are randomly accessible.

In the example compression and decompression methods and systems described below the blocks of image data are of blocks of colour values, e.g. pixel colour values, and each two-dimensional block of values relates to one of the colour channels of the pixel colour. For example, where the pixel colour values represent four channel RGBA data, there will be a two-dimensional block of values corresponding to each of the R (red), G (green), B (blue), and A (alpha) colour channels. However, the use of pixel colour values is for example only, and it should be understood that the compression and decompression methods and systems may operate on any type of image data, e.g. depth data, lighting data, or surface normal data.

Furthermore, although in the examples below each image element value (e.g. pixel value) is comprised of a plurality of distinct values (e.g. each pixel value comprises a first channel colour value, a second channel colour value etc.) and the image data is divided into two-dimensional blocks values on a per distinct value basis (e.g. one two-dimensional block of values comprises the first channel colour values, another two-dimensional block of values comprises the second channel colour values etc.) in other examples the image data may be divided into two-dimensional blocks of values in another manner. In some cases, each image element value may be a single distinct value (e.g. depth value) which may be divided into smaller chunks or portions which are used to form the two-dimensional blocks of values. For example, if the image element value is a multi-byte value the first two-dimensional block of values may comprise the first byte of each image element value (e.g. depth value), and a second two-dimensional block of values may comprise the second byte of each image element value (e.g. depth value). In other cases, each image element value may comprise a plurality of distinct values (e.g. a colour value for each of a plurality of colour channels), but the image data may not be divided into two-dimensional blocks of values on a per distinct value basis. For example, if each image element value comprises a first 10-bit colour channel value, a second 10-bit colour channel value, a third 10-bit colour channel value and a 2-bit colour channel value, instead of dividing the image data into two-dimensional blocks of values on a per channel basis the image data may be divided into two-dimensional blocks of values on a per-byte basis. In particular, a first two-dimensional block of values may comprise the first byte of each image element value and a second two-dimensional block of values may comprise the second byte of each image element value. In another example, the top eight-bits of each 10-bit colour channel value may form a block and a final block may be formed of the two lowest bits of each channel. For example, a first two-dimensional block of values may comprise the first 8-bits of the first colour channel value, a second two-dimensional block of values may comprise the first 8-bits of the second colour channel value, a third two-dimensional block of values may comprise the first 8-bits of the third colour channel value, and a fourth two-dimensional block of values may comprise the last two bits of each colour channel. It will be evident to a person of skill in the art that these are examples only and that the image element values may be divided into multiple values in another manner to form the two-dimensional blocks of values.

In some cases, each image element value may be divided into a plurality of multi-bit values. In other words, each image element value may be divided into a plurality of sub-values wherein each sub-value comprises, or is formed by, at least two bits. For example, where each image element value is divided into a first value and a second value such that the block of image data comprises a two-dimensional block of first values and a two-dimensional block of second values, each first value may be a multi-bit value (i.e. a value comprising, or formed by, more than one bit) and each second value may be a multi-bit value (i.e. a value comprising, or formed by, more than one bit). In some cases, the image element values may be divided into eight-bit (i.e. byte) values. For example, as described above, each image element value may be divided into sub-values along byte lines (e.g. the first eight-bits of an image element value may form the first value, the second eight-bits of an element value may form the second value etc.) Dividing the image element values into multi-bit values, as opposed to single-bit values, may allow the compression methods and systems described herein to more efficiently compress a two-dimensional block of values (e.g. first values (e.g. first colour channel values) or second values (e.g. second colour channel values)), and thus more efficiently compress a block of image data comprising that two-dimensional block of values, as it reduces the number of two-dimensional blocks of values (which reduces the header overhead) and allows some of the more complicated fixed-length compression algorithms described below to be used to compress the two-dimensional block of values.

Figure 2:
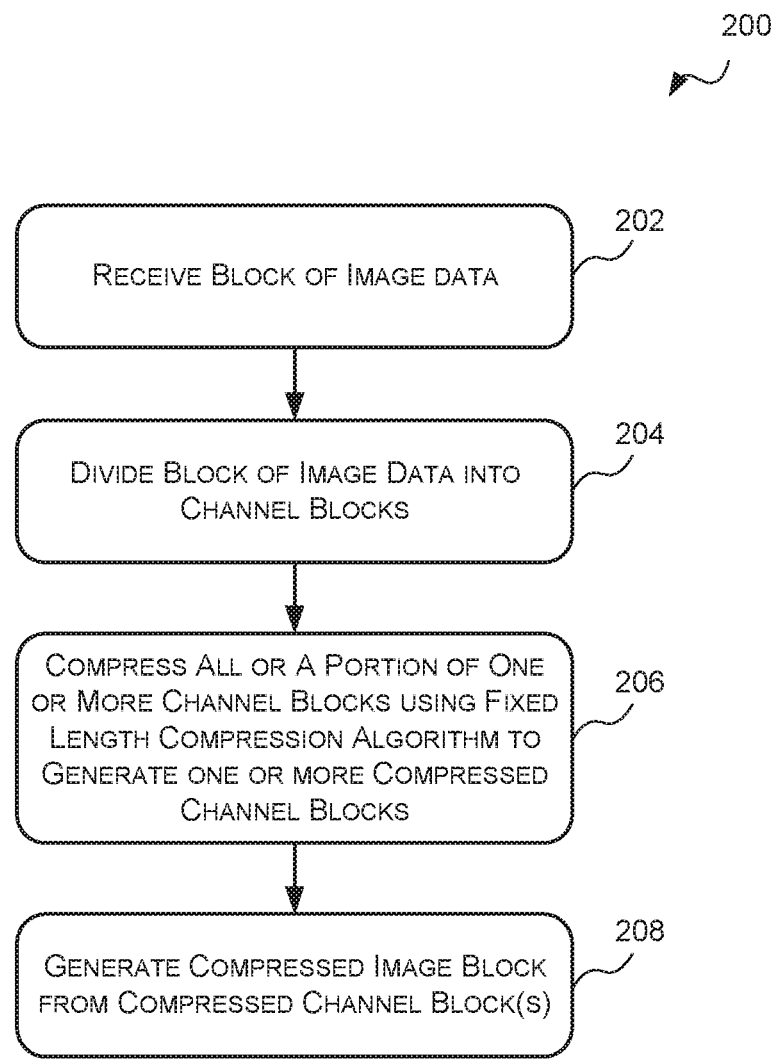
FIG. 2 is a flow diagram of an example method for compressing a block of image data.

Reference is now made to FIG. 2 which illustrates an example method 200 for compressing a block of image data. The method 200 begins at step 202 where a block of image data to be compressed is received. In this example the block of image data is a block of colour values or pixel values.

As is known to those of skill in the art, data defining a digital image (e.g. a frame) comprises a set of one or more colour values for each pixel that may be used to determine the colour of that pixel. The set of colour values for a pixel may comprise a colour value for each colour channel. The number of channels is typically based on the format of the image. For example, if the image is in RGB format there are three colour channels—red, green and blue—and there is a red colour value, a green colour value and a blue colour value for each pixel. Similarly if the image is in RGBA format there are four channels—red, green, blue and opacity (or alpha)—and there is a red colour value, a green colour value, a blue colour value and an opacity (or alpha) value for each pixel. The colour values for each channel can be understood as forming a two-dimensional array or block.

Figure 3:
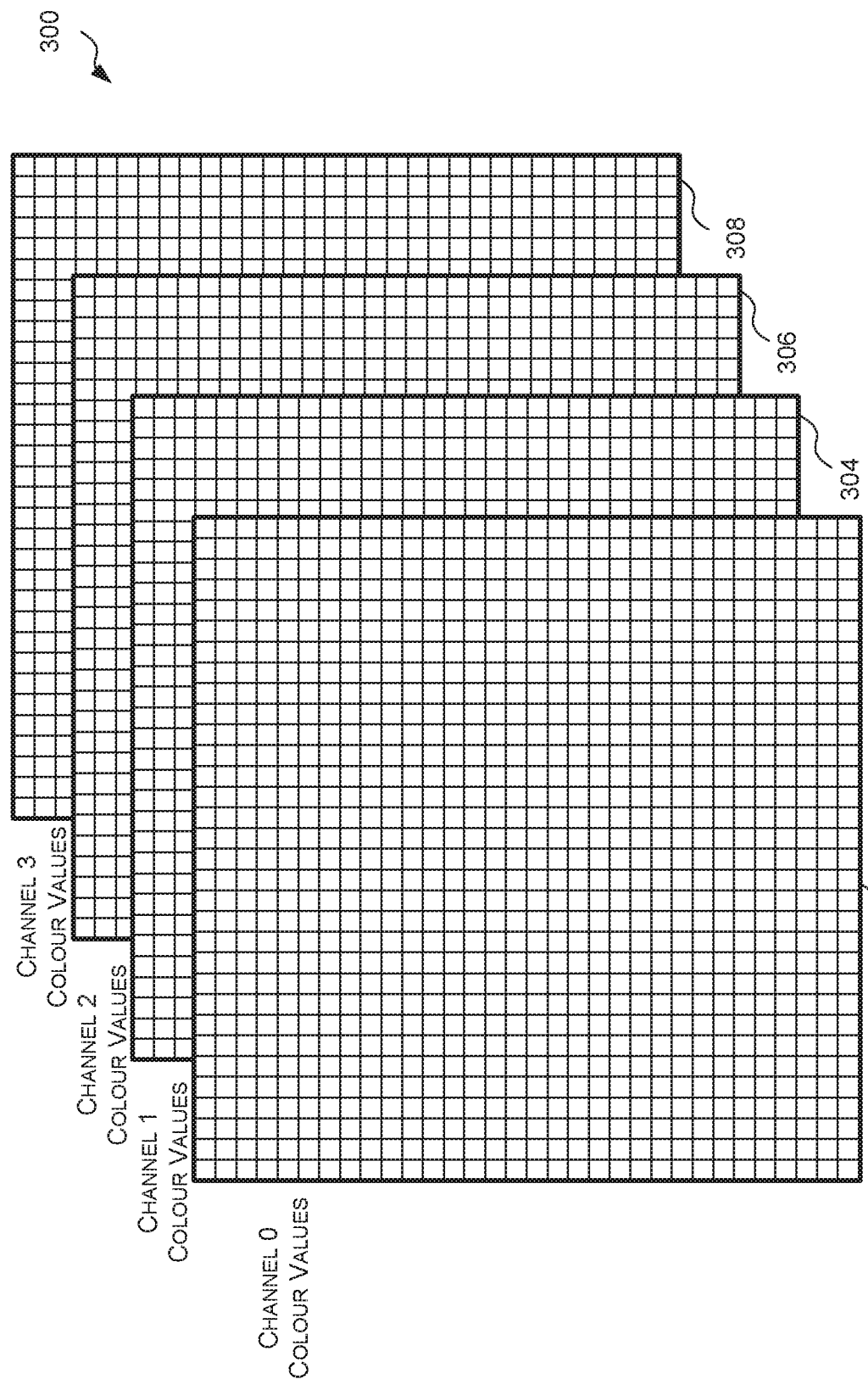
FIG. 3 is a schematic diagram illustrating an example block of image data comprising data for multiple colour channels.

For example, FIG. 3 illustrates example image data 300 for a 32×32 pixel RGBA digital image. The image data 300 comprises a two-dimensional block of 8-bit colour values for each channel which may be referred to herein as a channel block. Specifically, the image data 300 comprises a 32×32 block 302 of 8-bit colour values for channel 0 (i.e. the red channel); a 32×32 block 304 of 8-bit colour values for channel 1 (i.e. the green channel); a 32×32 block 306 of 8-bit colour values for channel 2 (i.e. the blue channel); and a 32×32 block 308 of 8-bit colour values for channel 3 (i.e. the opacity channel). The colour at each pixel (which may be referred to herein as the pixel colour value) is determined from the different channel colour values associated with that pixel (i.e. the channel 0 colour value, the channel 1 colour value, the channel 2 colour value, and the channel 3 colour value associated with that pixel).

A block of image data is the portion of the image data corresponding to a two-dimensional block of pixels in the image. Accordingly a block of image data comprises a two-dimensional block of colour values for each colour channel. The block of image data may be any suitable size. For example, the block of image data may comprise colour values for a 32×32 block of pixels, a 16×16 block of pixels or an 8×8 block of pixels. Where the compression is used to compress frame buffer data in a graphics processing system that implements tile-based rendering, the block of image data may correspond to a tile (e.g. a 32×32 block of pixels corresponding to a 32×32 pixel tile), to a set of tiles (e.g. a 32×32 block of pixels corresponding to four 16×16 pixel tiles), or to a portion of a tile (e.g. a 16×16 block of pixels corresponding to a quarter of a 32×32 pixel tile). Once a block of image data has been received the method 200 proceeds to step 204.

At step 204, the block of image data is divided into channel blocks. For example, if the block of image data 300 shown in FIG. 3 is received in step 202 the block of image data 300 is divided into the four channel blocks 302, 304, 306 and 308 shown in FIG. 3. Once the block of image data has been divided into channel blocks, the method 200 proceeds to step 206 where the channel blocks are compressed separately. With the exception of areas of constant colour, e.g. background or clear colour, for which specific compression techniques will be described below, rendered images typically do not contain many pixels which have the same pixel colour value (the colour determined from the colour values for each channel). It is possible, however, for many pixels (particularly those in close proximity to each other) to have one or more similar channel (e.g. red, green, blue or opacity) colour values. Accordingly, compressing a block of image data on a per channel basis may allow more efficient compression of image data as those parts of the image data that are more likely to be similar are compressed together.

Figure 4:
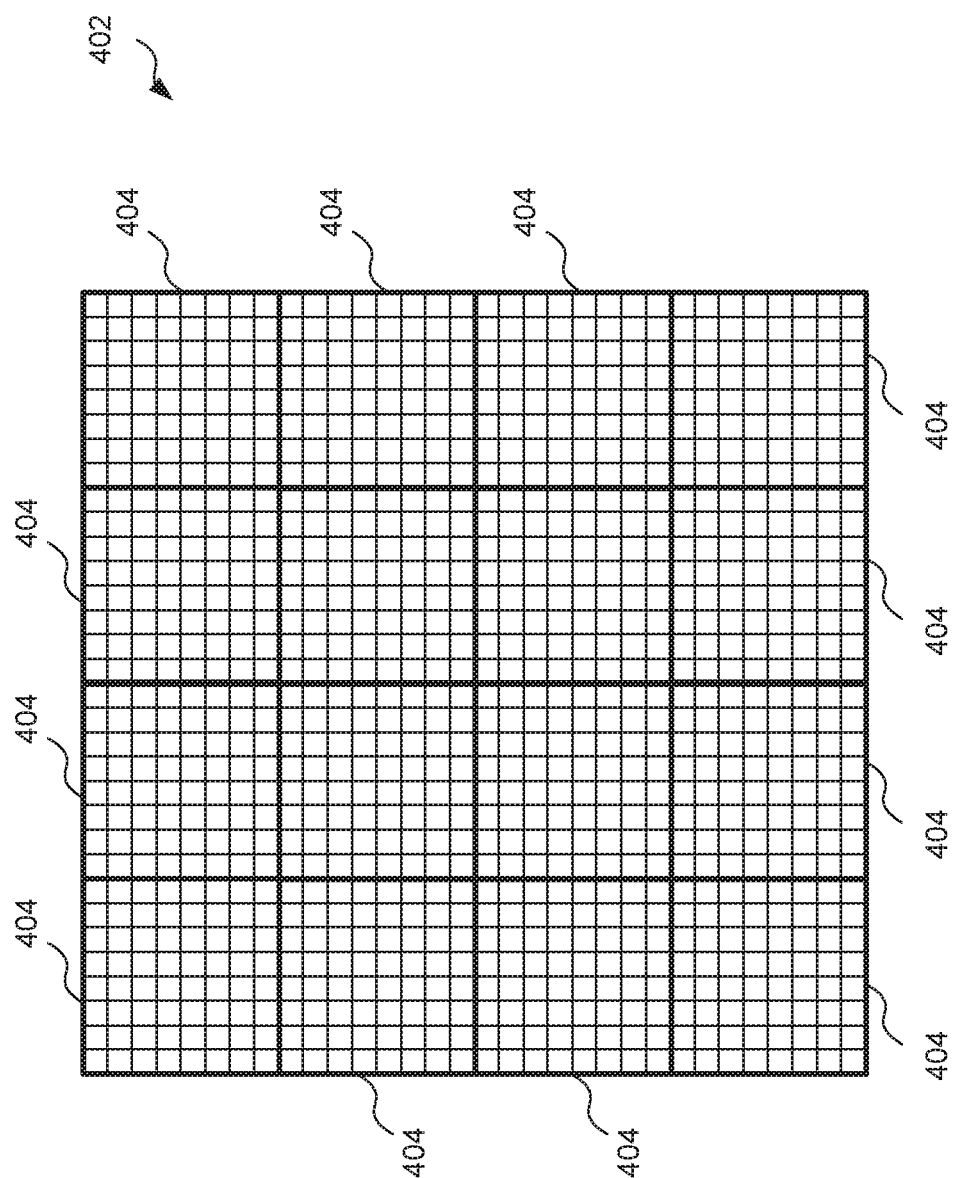
FIG. 4 is a schematic diagram illustrating a channel block divided into a plurality of sub-blocks.

At step 206, one or more of the channel blocks is compressed by compressing one or more data sets of the channel block using a fixed-length compression algorithm to generate one or more compressed channel blocks. In some cases, an entire channel block may be compressed so that the data set that is compressed is the entire channel block. In other cases, the channel block may be sub-divided into channel sub-blocks so that the data set(s) that are compressed comprise one or more channel sub-blocks. The term channel sub-block is used herein to mean a portion of a channel block that is smaller than the channel block in at least one dimension. For example, as shown in FIG. 4, if the channel block 402 is a 32×32 block of colour values then the channel block 402 may be sub-divided into sixteen 8×8 sub-blocks 404 of colour values and one or more of the 8×8 sub-blocks 404 may be compressed using a fixed-length compression algorithm.

As is known to those of skill in the art, a fixed-length compression algorithm is a compression algorithm in which each of the items (e.g. colour values) in the set of items (e.g. channel block/sub-block of colour values) being compressed is represented by the same number of bits in the compressed format. Accordingly, by using a fixed-length compression algorithm to compress a channel block/sub-block each colour value in that block/sub-block is represented in the compressed block by the same number of bits which allows the bits relating to any particular colour value in the channel block/sub-block to be easily identified. Thus, using a fixed-length compression algorithm allows the compressed block to be randomly accessible.

The fixed-length compression algorithm is configured to compress a block or sub-block of values by (i) identifying common base information for the block; and (ii) identifying a fixed-length parameter for each value such that the original value can be obtained from the common base information and the fixed-length parameter. For example, one fixed-length compression algorithm may identify a common origin value for the block or sub-block and identify a fixed-length delta value for each value in the block or sub-block that represents the difference between the common origin value and the value. Example fixed-length compression algorithms which may be used to compress a channel block/sub-block are described below.

When an entire channel block is compressed as a whole, only a single set of common base information is generated for the channel block and a fixed-length parameter is generated for each colour value in the channel block. For example, if the channel block is a 32×32 block of colour values then only a single set of common base information is generated for the channel block and a fixed-length parameter may be generated for each colour value in the channel block. In contrast, when the channel block is divided into a plurality of sub-blocks and one or more of the channel sub-blocks are compressed, a set of common base information is generated for each sub-block that is compressed. For example, a 32×32 channel block may be divided into four 16×16 channel sub-blocks and if two of these sub-blocks are compressed then common base information and fixed-length parameters are generated for each of the two compressed sub-blocks.

Where a channel block is divided into channel sub-blocks and multiple channel sub-blocks are compressed, the same fixed-length compression algorithm does not have to be used to compress each sub-block. For example, a first channel sub-block may be compressed using a first fixed-length compression algorithm and a second channel sub-block for the same channel may be compressed using a second, different, fixed-length compression algorithm. As described in more detail below, this allows each channel sub-block to be compressed by the most suitable fixed-length compression algorithm for that channel sub-block.

Similarly, where all or a portion of multiple channel blocks are compressed the same compression algorithm(s) do not have to be used for all the channel blocks. For example, a first sub-block of a first channel block may be compressed using a first fixed-length compression algorithm whereas a first sub-block of a second channel block may be compressed using a second, different fixed-length compression algorithm. As described in more detail below, since different channels have different characteristics this allows each channel to be compressed by the most suitable fixed-length compression algorithm(s) for that channel.

Once one or more of the channel blocks have been compressed the method 200 proceeds to step 208.

At step 208, a compressed block of image data is generated from the compressed channel blocks generated in step 206. In some cases, a compressed block may comprise a header and a body. The header comprises information that identifies the size or length of the fixed-length parameter used for each compressed channel block/sub-block and the common base information for each compressed channel block/sub-block. For example, the header may comprise, for each compressed channel block/sub-block: (i) a length or size field (which may also be referred to herein as the format field) that indicates the length of the fixed-length parameter for that compressed channel block/sub-block; and (ii) a common base information field that comprises the common base information for that compressed channel block/sub-block. The body comprises the fixed-length parameters for each compressed channel block/sub-block and the original colour values for any uncompressed channel block/sub-block.

Where a channel block/sub-block can be compressed using one of a plurality of fixed-length compression algorithms the header may also comprise, for each compressed channel block/sub-block, information indicating the fixed-length compression algorithm that was used to compress that channel block/sub-block. In some cases, there may be a separate compression algorithm field for each compressed channel block/sub-block which indicates the compression algorithm that was used to compress that channel block/sub-block. However, in other cases the information indicating the fixed-length compression algorithm that was used to compress a channel block/sub-block may be incorporated into another field. For example, in some cases the length or size field may be used to indicate which compression algorithm was used (e.g. the length or size field may be set to a certain value to indicate a first fixed-length compression algorithm was used and set to another value to indicated a second, different, fixed-length compression algorithm was used).

The header may also comprise information indicating which, if any, channel blocks/sub-blocks were not compressed. In some cases, there may be a separate compressed/uncompressed field for each channel block/sub-block that indicates whether that channel block/sub-block was compressed or not. However, in other cases the information indicating that a channel block/sub-block was not compressed may be incorporated into another field. For example, in some cases the length or size field or the compression algorithm field may be used to indicate that a channel block/sub-block was not compressed. Example formats for a compressed block are described below with reference to FIGS. 15 to 17.

As described above, the body comprises the fixed-length parameters for each compressed channel block/sub-block and the original colour values for any uncompressed channel block/sub-block. The fixed-length parameters and/or original colour values may be stored in the body in any manner that allows the fixed-length parameters and/or original colour values to be randomly accessible. In some cases, as described in more detail below, the fixed-length parameters and/or original colour values for each pixel may be stored together in a pixel data unit. For example, where the image data comprises colour values for four channels numbered 0 to 3, each pixel data unit may comprise the fixed-length parameter/original colour value for channel 0, the fixed-length parameter/original colour value for channel 1, the fixed-length parameter/original colour value for channel 2, and the fixed-length parameter/original colour value for channel 3. In these cases, the pixel data units may be stored in in the body in any order which allows the pixel data units (and thus the fixed-length parameters/original colour values thereof) to be randomly accessible. In some cases, where the channel blocks are divided into sub-blocks prior to compression, the pixel data units for each sub-block may be stored together. For example, if the channel blocks are divided into 8×8 sub-blocks then the pixel data units for each 8×8 image data sub-block may be stored together.

Example Fixed-Length Compression Algorithms

Example fixed-length compression algorithms which may be used to compress a channel block/sub-block in step 206 of the method 200 of FIG. 2 will now be described.

A first example fixed-length compression algorithm which may be used to compress a channel block/sub-block in step 206 of the method 200 of FIG. 2 is referred to herein as the common value compression algorithm. In this compression algorithm if all the colours values in the channel block/sub-block are the same then all the colour values of the block/sub-block can be efficiently represented by a single copy of that colour value. While rendered images typically do not contain many pixels which have the same pixel colour value (the colour determined from the colour values for each channel), it is possible for many pixels (particularly those in close proximity to each other) to share one or more common channel (e.g. red, green, blue or opacity) colour values. For example, where the image data is in RGBA format it is very common for many of the pixels to have the same opacity (or alpha) value. Accordingly, in the common value compression algorithm the common base information is the common colour value and the fixed-length parameters have zero bit length (i.e. no fixed-length parameters are stored).

Figure 5:
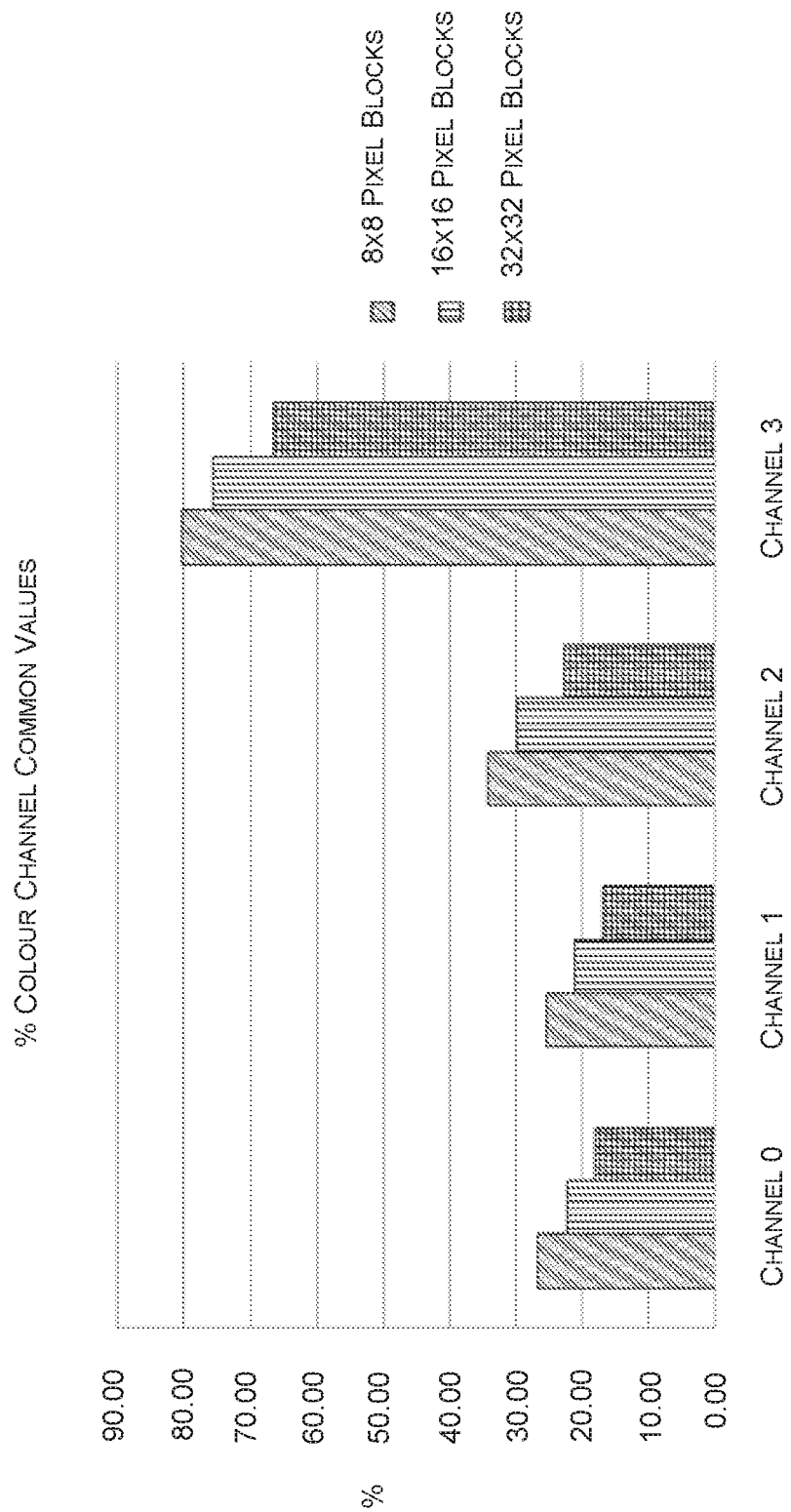
FIG. 5 is a graph illustrating the percentage of colour channels with a common colour value for an example benchmark.

As is known to those of skill in the art, there are a set of standard benchmark tests which are used to measure the graphics performance of devices. The benchmark tests provide the device with game-like content and the performance of the device in response thereto is measured and used to benchmark the device's graphics performance. FIG. 5 illustrates the percentage of blocks in the Manhattan 3.0 benchmark test that have a common channel colour value for a variety of block sizes. Specifically, FIG. 5 illustrates the number of 8×8 blocks, 16×16 blocks and 32×32 blocks which have a common colour value for each of the R, G, B, and A channels. It can be seen from FIG. 5 that around 20% of the 8×8 blocks had a common colour value for channel 0 (red channel) and channel 1 (green channel); 30% of the 8×8 blocks had a common colour value for channel 2 (blue channel); and 80% of the 8×8 blocks had a common colour value for channel 3 (opacity channel). It can be seen from FIG. 5 that as the block size increases (e.g. to 16×16 and 32×32) the number of blocks which had a common channel colour value decreased. However, even at a block size of 32×32 60% of the blocks had a common colour value for channel 3 (opacity channel). Accordingly, significant bandwidth savings can be achieved by identifying those blocks that have a common channel colour value and representing all the colour values of that block with a single copy of that colour value.

A second example fixed-length compression algorithm which may be used to compress a channel block/sub-block in step 206 of the method 200 of FIG. 2 is referred to herein as the origin and delta compression algorithm. In this compression algorithm each colour value is represented by a common origin value and an individual delta value with a fixed number of bits. Each delta value indicates the difference between the colour value and the origin value. The number of delta bits is based on the range of colour values in the block. Specifically the number of delta bits to represent a range k is $\lceil \log_2(k+1) \rceil$. Table 1 illustrates the number of delta bits required to represent ranges up to 255. It can be seen that the smaller the range of colour values in a block/sub-block, the fewer bits can be used to represent those colour values.

TABLE 1

| Range | Delta Bits |
|---|---|
| [0, 1] | 1 |
| [0, 3] | 2 |
| [0, 7] | 3 |

TABLE 1-continued

| Range | Delta Bits |
|---|---|
| [0, 15] | 4 |
| [0, 31] | 5 |
| [0, 63] | 6 |
| [0, 127] | 7 |
| [0, 255] | 8 |

In some cases, the origin and delta compression algorithm may only be deemed a suitable compression algorithm if the number of bits used to represent the range is less than the number of bits to represent the original colour values. For example, if the original colour values are 8-bits then the origin and delta compression algorithm may only be deemed to be suitable if the range can be represented with 7 or fewer bits.

A compressed colour value can be easily decompressed by adding the delta value for that colour value to the origin value.

In some cases, the minimum colour value or the maximum colour value in the block/sub-block is used as the origin. This allows all of the delta values to be positive or all the delta values to be negative, which can simplify the decompression calculations. In other cases, an intermediate value in the range, such as the mean or the midpoint of the range of values may be used as the origin and one bit of the delta value may be used as a sign bit.

Figure 6:
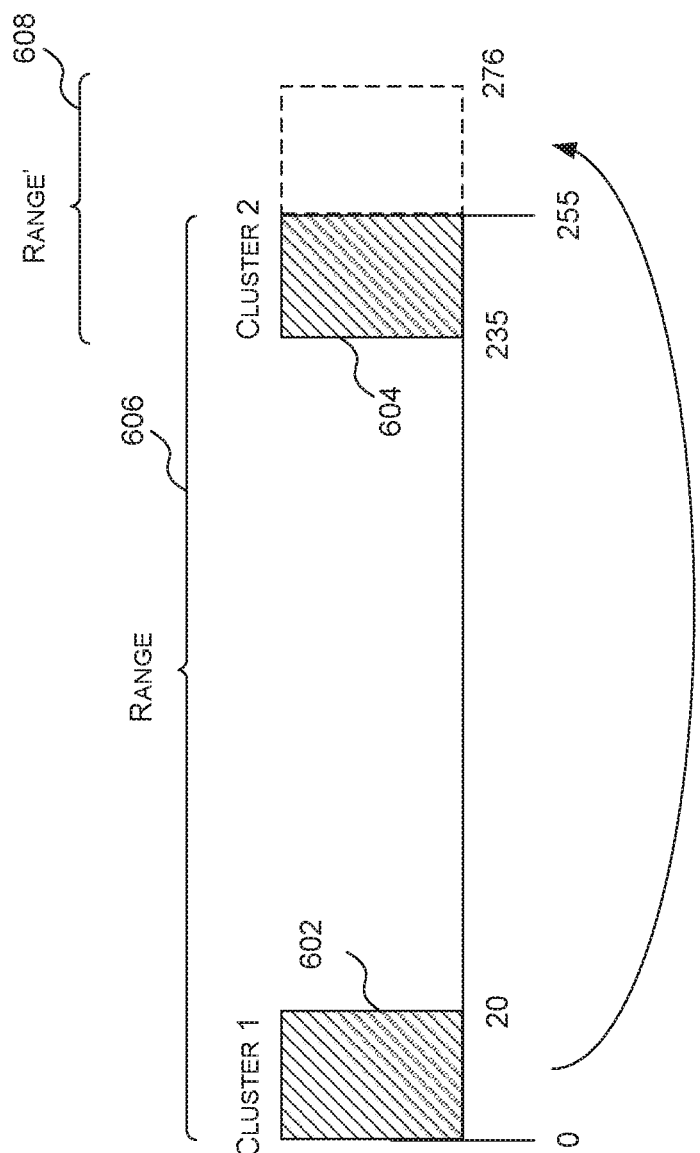
FIG. 6 is a schematic diagram illustrating a set of colour values falling into two clusters.

In yet other cases, it may be more efficient to determine the delta value as the difference between the colour value and the origin value modulo $2^x$ wherein x is the number of bits used to represent the colour values. This may allow a block/sub-block of colour values that are clustered into ranges that are at the two ends of the colour value range to be represented more efficiently. For example, if each colour value is 8-bits which allows a minimum colour value of 0 and maximum colour value of 255; and, as shown in FIG. 6, the colour values for a channel block/sub-block fall into two clusters 602 and 604 wherein the minimum value of the first cluster 602 is 0 and the maximum value of the first cluster 602 is 20, and the minimum value of the second cluster 604 is 235 and the maximum value of the second cluster 604 is 255 then the range 606 of values in the block/sub-block is 255 thus 8 delta bits are required to represent the range.

Figure 7:
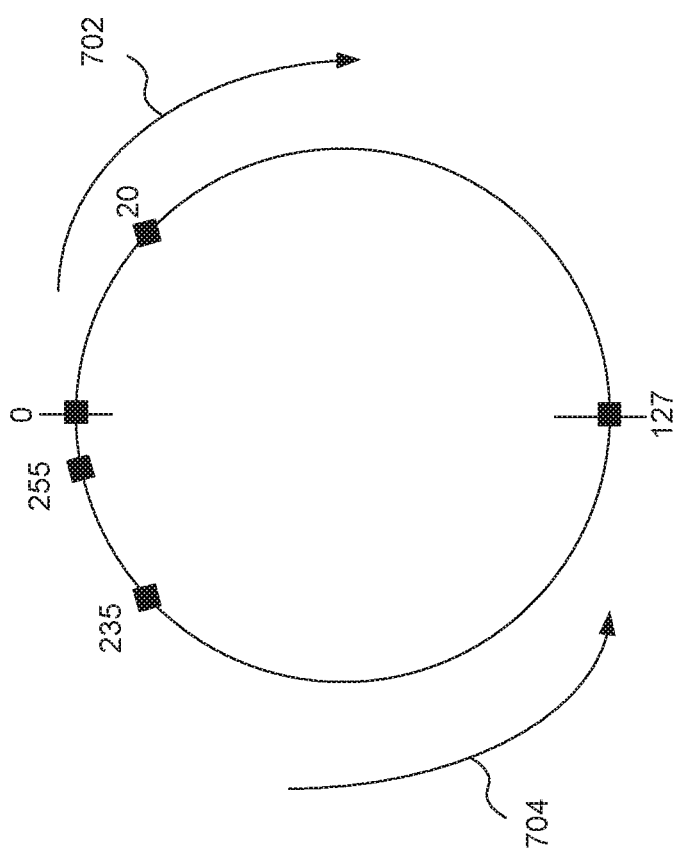
FIG. 7 is a schematic diagram illustrating modulo arithmetic.

If, however, the 8-bit range [0, 255] is considered a circle when using modulo arithmetic (i.e. modulo $2^x=2^8=256$) as shown in FIG. 7, then there are two paths that can be taken to get from one number in the range to another number in the range. Specifically, the clockwise path 702 may be taken where a value is added to the first number; or the counter-clockwise path 704 may be taken where a value is subtracted from the first number. For example, to get from 255 to 0, either 1 can be added to 255 (i.e. (255+1) mod 256=0) or 255 can be subtracted from 255 (i.e. (255−255) mod 256=0).

The range for a set of values can then be represented as any path on the circle that encompasses all of the numbers in the set. For example, the range for the example set of values shown in FIG. 6 which fall into two clusters—a first cluster 602 with a min of 0 and a max of 20, and a second cluster 604 with a min of 235 and a max of 255—can be represented as a path from 0 to 255 which results in a range of 255 which would require 8 delta bits; or the range (shown at 608 in FIG. 6) can be represented as the path from 235 to 20 which results in a range of 41 which would require only 6 delta bits. Thus this example set of values can be represented much more efficiently if the origin is set to 235 and 6 delta bits are used to represent the difference between the colour value and the origin modulo 256.

It will be evident to a person of skill in the art, that these are examples only and other suitable values may be used as the origin value.

Accordingly, in the origin and delta compression algorithm the common base information is the origin value and the fixed-length parameter for each colour value is the delta value.

Figure 8:
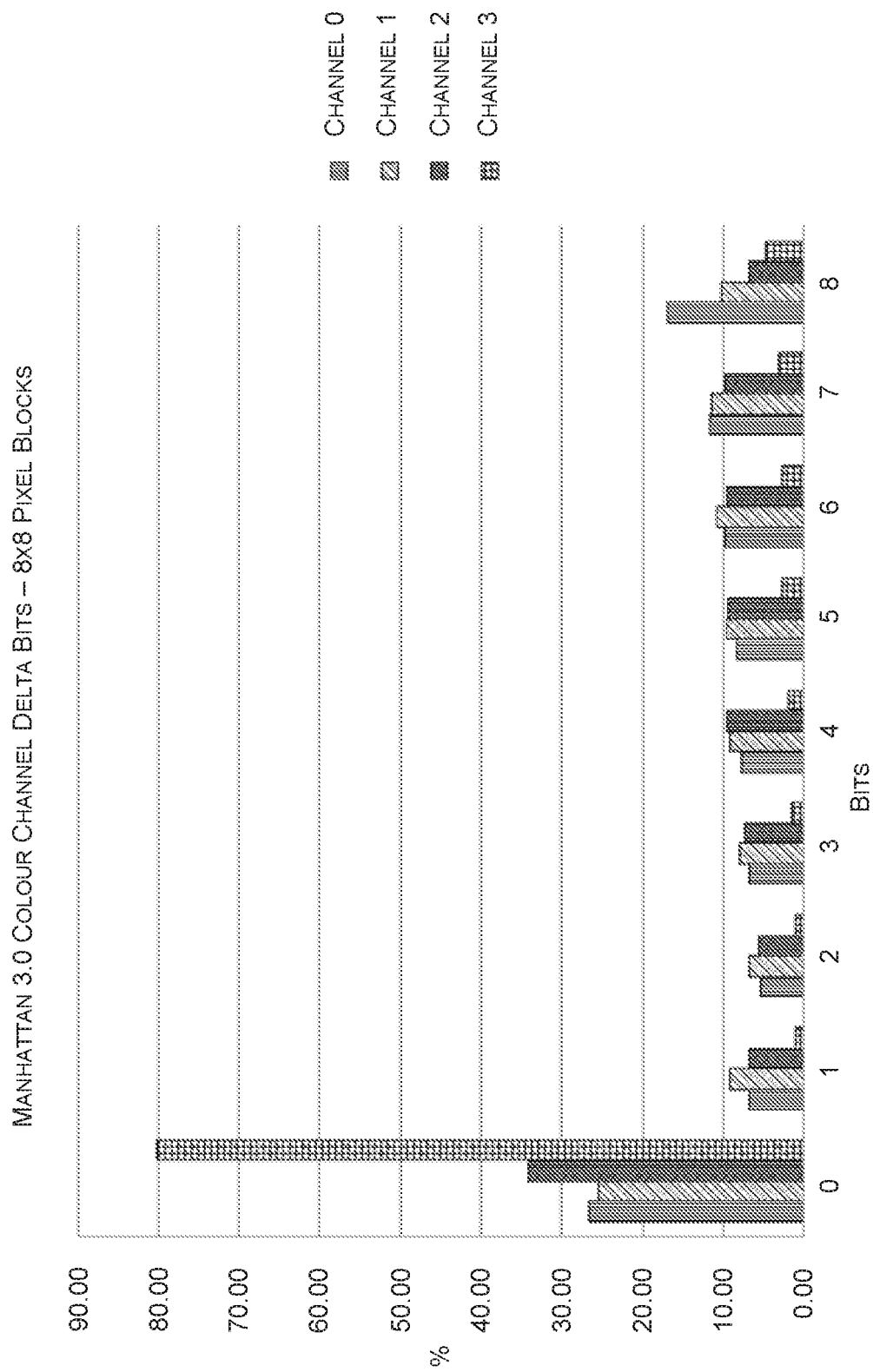
FIG. 8 is a graph illustrating the number of delta bits used to compress 8×8 channel blocks/sub-blocks using the origin and delta compression algorithm for an example benchmark test.
Figure 9:
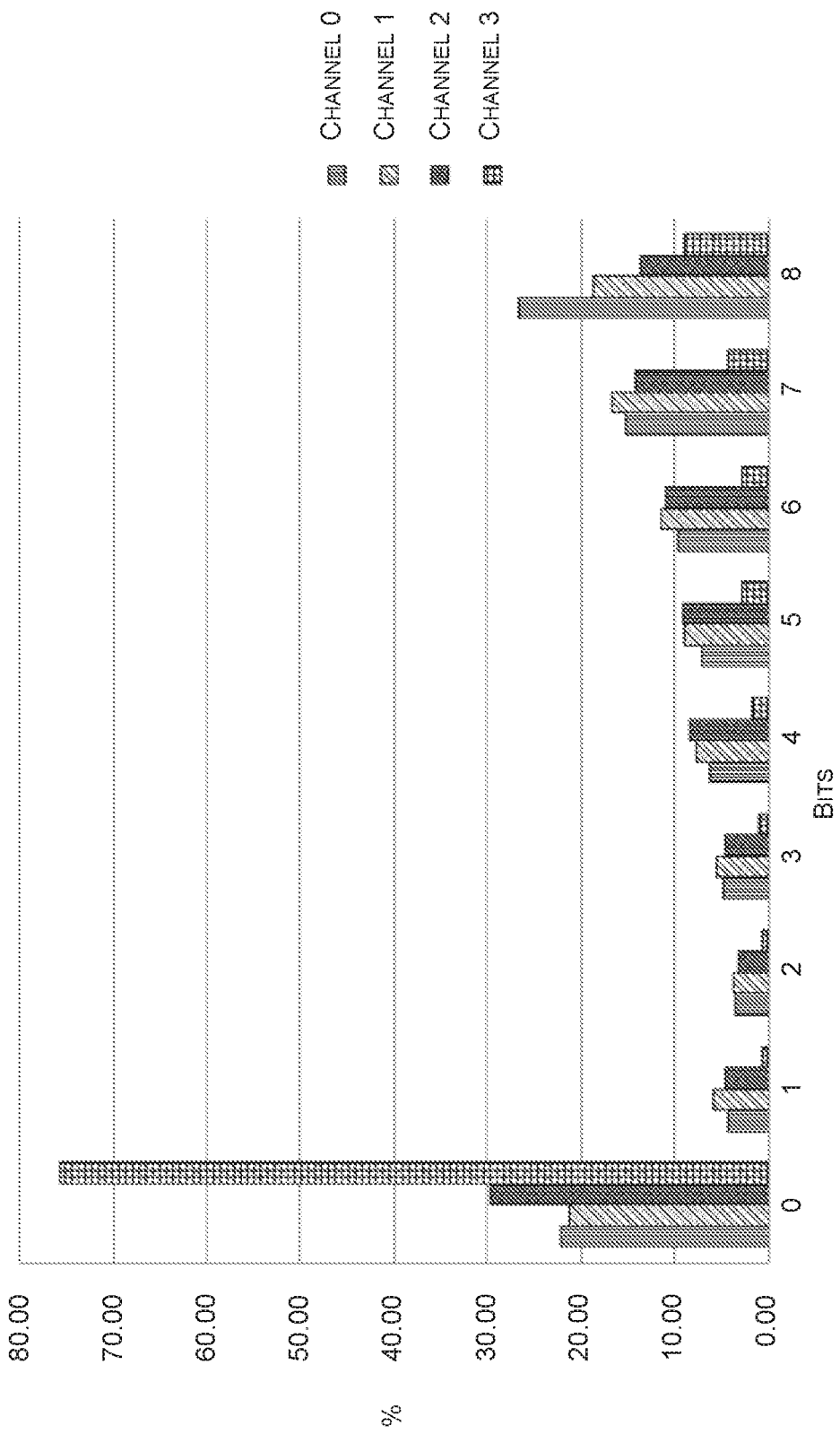
FIG. 9 is a graph illustrating the number of delta bits used to compress 16×16 channel blocks/sub-blocks using the origin and delta compression algorithm for an example benchmark test.
Figure 10:
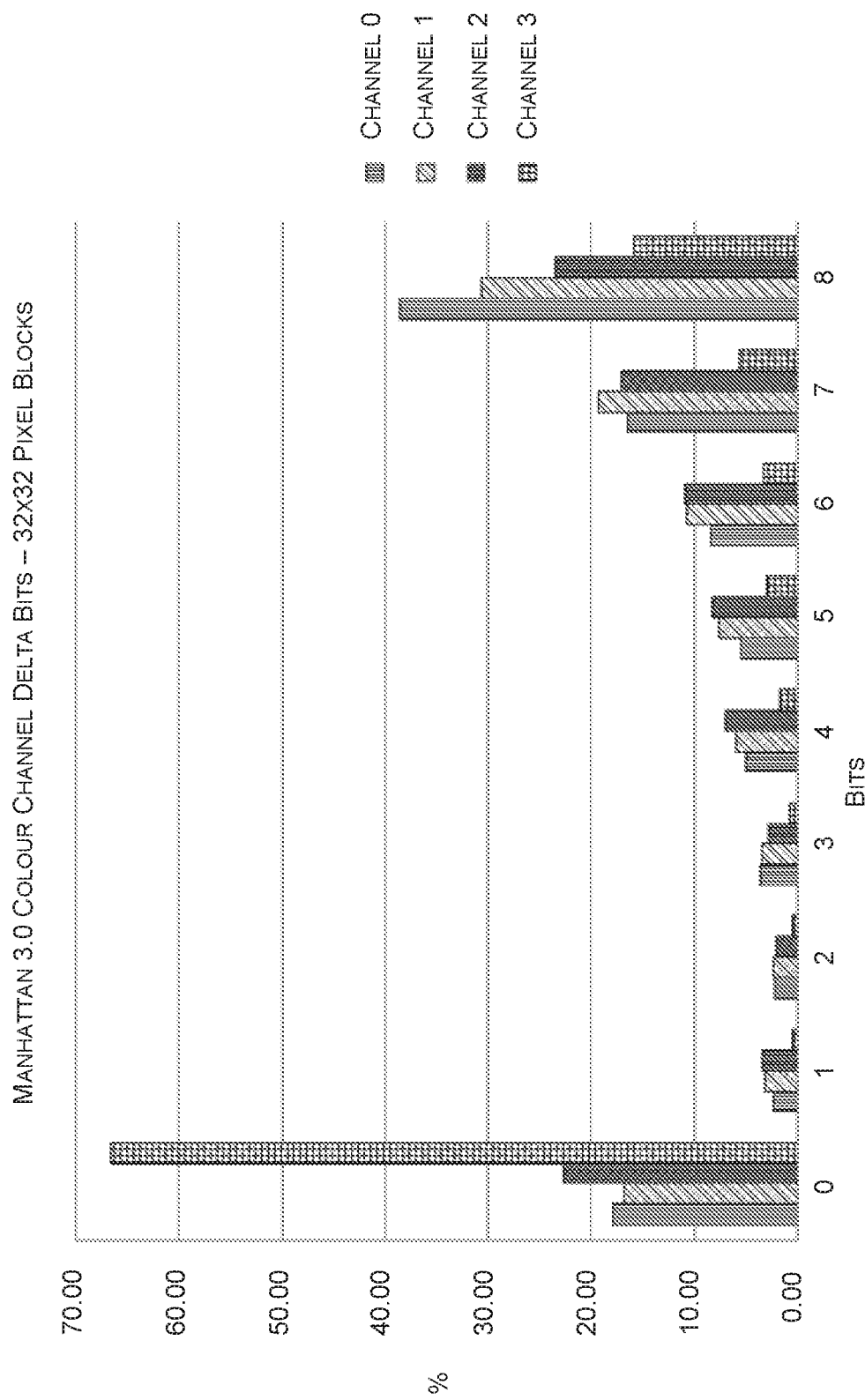
FIG. 10 is a graph illustrating the number of delta bits used to compress 32×32 channel blocks/sub-blocks using the origin and delta compression algorithm for an example benchmark test.

Reference is now made to FIGS. 8 to 10 which show the percentage of channel blocks that were represented with each number of delta bits on a per channel basis when the origin and delta compression algorithm was used to compress RGBA formatted image data with 8-bit colour values in the Manhattan 3.0 benchmark test. Specifically, FIG. 8 illustrates the percentage of 8×8 channel blocks that were represented using 0-8 delta bits; FIG. 9 illustrates the percentage of 16×16 channel blocks that were represented using 0-8 delta bits; and FIG. 10 illustrates the percentage of 32×32 channel blocks that were represented using 0-8 delta bits. It can be seen from FIG. 8 that overall roughly 80% of the 8×8 channel blocks can be compressed using the origin and delta compression algorithm (and the common value algorithm when all the colour values in a channel block are the same).

A third example fixed-length compression algorithm which may be used to compress a channel block/sub-block in step 206 of the method 200 of FIG. 2 is a variant of the origin and delta compression algorithm and is referred to herein as the multiple origin and delta compression algorithm. Instead of there being a single origin, there are multiple origins and each colour value is represented by the common origins, an individual index which identifies one of the common origins and a delta value that indicates the difference between the colour value and the identified origin. The multiple origin and delta compression algorithm may be suitable where the colour values in the channel block/sub-block are clustered into two or more groups such that the range of colour values within the channel block/sub-block is large, but the range within each cluster is small. Accordingly, in the multiple origin and delta compression algorithm the common base information is the plurality of origin values and the fixed-length parameter for each colour value is the index identifying one of the origins and the delta value.

Figure 11:
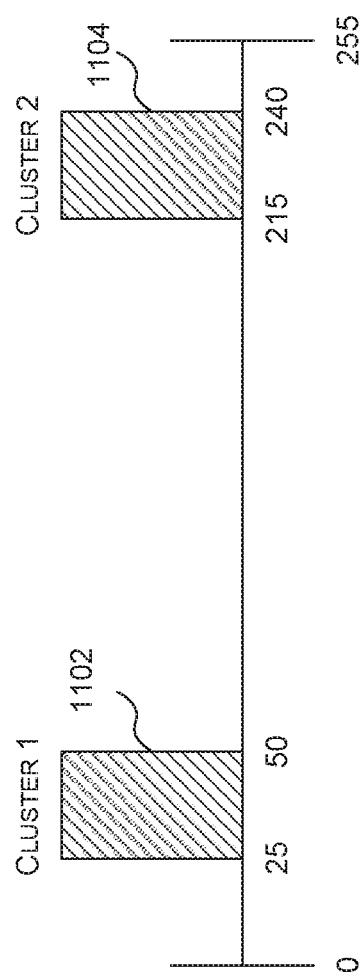
FIG. 11 is a schematic diagram illustrating a second set of colour values falling into two clusters.

For example, FIG. 11 illustrates an example where colour values can be between 0 and 255 and the colour values in a channel block fall within two clusters 1102, 1104—a first cluster 1102 wherein the colour values are between 25 and 50 and a second cluster 1104 wherein the colour values are between 215 and 240. The range of all the colour values in the channel block is 240−25=115 which, according to Table 1, would require 7 delta bits. Alternatively, using modulo 256 arithmetic as described above, the range of all the colour values in the channel block is (50−215) mod 256=91, which, although smaller than 115, still requires 7 delta bits according to Table 1. However, the range for each cluster is only 25, which, according to Table 1, would require only 5 delta bits. Thus if there were two origin values, one for each cluster 1102, 1104, and the delta for each colour value is calculated from one of the origin values each colour value can be represented by a 5 bit delta value. For example, 25 and 215 may be stored as origin values 0 and 1 respectively, then for each colour value falling in the first cluster 1102 an index of 0 is stored along with a 5-bit delta value indicating the difference between the colour value and the first origin value (i.e. 25 in this example); and for each colour value falling in the second cluster 1104 an index of 1 is stored along with a 5-bit delta value indicating the difference between the colour value and the second origin value (i.e. 215 in this example).

A fourth example fixed-length compression algorithm which may be used to compress a channel block/sub-block in step 206 of the method 200 of FIG. 2 is referred to herein as the look-up table compression algorithm. In this compression algorithm each unique colour value in the channel sub-block is stored in a look-up table and then a fixed-length index into the table is generated for each colour value in the block/sub-block. This method is suitable where there are only a small number of different colour values which may occur, for example, in black and white images.

Figure 12:
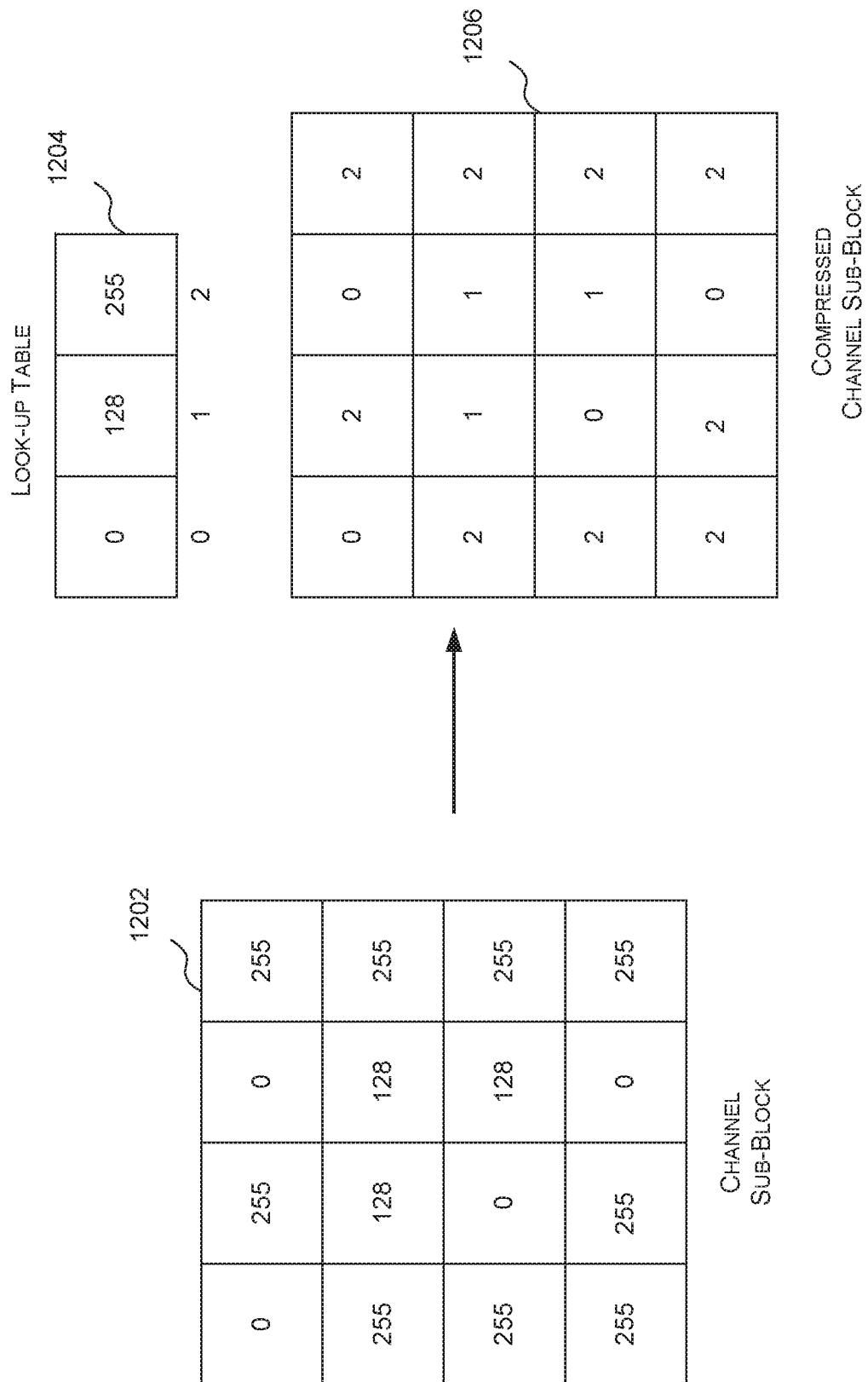
FIG. 12 is a schematic diagram illustrating compressing an example channel sub-block using the look-up table compression algorithm.

For example, as shown in FIG. 12, if a channel sub-block 1202 comprises only three colour values—0, 128 and 255 then according to the look-up table compression algorithm these three values would be placed in a look-up table 1204 and each colour value in the block would be represented by an index into the look-up table as shown at 1206. Specifically, if, as shown in FIG. 12 the colour value 0 is stored at index 0 of the look-up table 1204, the colour value 128 is stored at index 1 of the look-up table 1204, and the colour value 255 is stored at index 2 of the look-up table 1204, then each zero is represented by an index of 0, each 128 is represented by an index of 1, and each 255 is represented by an index of 2.

Accordingly, in the look-up table compression algorithm the common base information is the look-up table of unique colour values and the fixed-length parameter for each colour value is the index to the look-up table.

A fifth example fixed-length compression algorithm which may be used to compress a channel block/sub-block in step 206 of the method 200 of FIG. 2 is referred to herein as the predetermined colour compression algorithm. In this compression algorithm there are a small number (e.g. one to four) of predetermined colour values and if all the colour values in the block are the same and match one of the predetermined colour values then instead of storing the colour value, information (e.g. an index or the like) identifying one of the predetermined colours is stored.

In some cases, there may only be a single predetermined colour value. In these cases, identifying that the predetermined colour compression algorithm was used also identifies the predetermined colour. In other words, in these cases the predetermined colour value compression algorithm may be used to identify one particular colour value.

In other cases, there may be a plurality of predetermined colour values (which may be stored in memory). In these cases, in addition to identifying that the predetermined colour compression algorithm was used to compress a channel block/sub-block, information is stored which identifies one of the plurality of predetermined colour values. This identification of the particular colour value of the plurality of predetermined colour values may take any suitable form. For example, in some cases an index may be stored which identifies the particular colour value.

In some cases, the predetermined colour compression algorithm may be used to compress an entire block of image data (e.g. all channels of a block). For example, in some cases, applications may set each pixel to a clear colour value to clear the frame buffer before any draw calls. The specific clear colour value is generally a specific combination of the channel colour values. For example, the clear colour value may be 00FFFFFF (hexadecimal) for 8-bit per channel ARGB format where the first two hexadecimal values correspond to channel 0, the next two hexadecimal values correspond to channel 1, the next two hexadecimal values correspond to channel 2, and the final two hexadecimal values correspond to channel 3. The clear colour value is generally stored in memory and thus it is not necessary to store the clear colour value in the compressed block. Accordingly, in these cases the predetermined colour value compression algorithm can be used to indicate that every pixel in the block has the clear colour value. It will be evident to a person of skill in the art that this is an example only, and that the predetermined colour compression algorithm may be used to identify another pixel colour value.

In another example, there may, also or alternatively, be a plurality of predetermined special pixel colour values which are frequently used. For example, in some cases, where an 8-bit per channel ARGB format is used, 00000000 (hexadecimal) and FF000000 (hexadecimal) may be defined as special pixel colour values as they are commonly used. In these cases, if it is determined that all of the pixels in a block have the same colour value and it is one of the predetermined colour values (or the clear colour value) then the predetermined colour compression algorithm may be used to compress this block by storing information (e.g. an index) that identifies one of the predetermined pixel colour values. This allows blocks wherein each pixel of the block has the same special pixel colour value to be compressed very efficiently.

In some cases, in addition or alternatively to using the predetermined colour compression algorithm to compress a whole block of image data (e.g. all channels of a block) (which may be referred to herein as the predetermined pixel colour compression algorithm), the predetermined colour compression algorithm may be used to compress individual channel blocks/sub-blocks of a block of image data (which may be referred to herein as the predetermined channel colour compression algorithm). Specifically, instead of there being one or more predetermined pixel colour values (e.g. a 32-bit pixel colour value) there are one or more predetermined channel colour values (e.g. an 8-bit channel colour value) and if all the colour values in a channel block/sub-block are the same and match one of the predetermined channel colour values then the predetermined colour compression algorithm may be used to compress the channel block/sub-block. This may allow more blocks to be efficiently compressed compared to compressing at the pixel level.

The predetermined channel colour compression algorithm works most effectively when the predetermined channel colour values are the most common channel colour values in the unique channel blocks (i.e. the channel blocks in which all the colour values are the same). In some cases, the predetermined channel colour values may be fixed for the graphics processing system (i.e. the same predetermined channel colour values are used for any and all applications running on the graphics processing system). In other cases, the predetermined colour channel colours may be application specific. For example, the graphics processing system may comprise memory (e.g. a register) which can be used to dynamically identify the predetermined channel colour values to be used for a particular application. In some cases, a portion (e.g. two) of the predetermined channel colour values may be fixed and another portion (e.g. two) of the predetermined channel colour values may be programmable or dynamically selectable.

Figure 13:
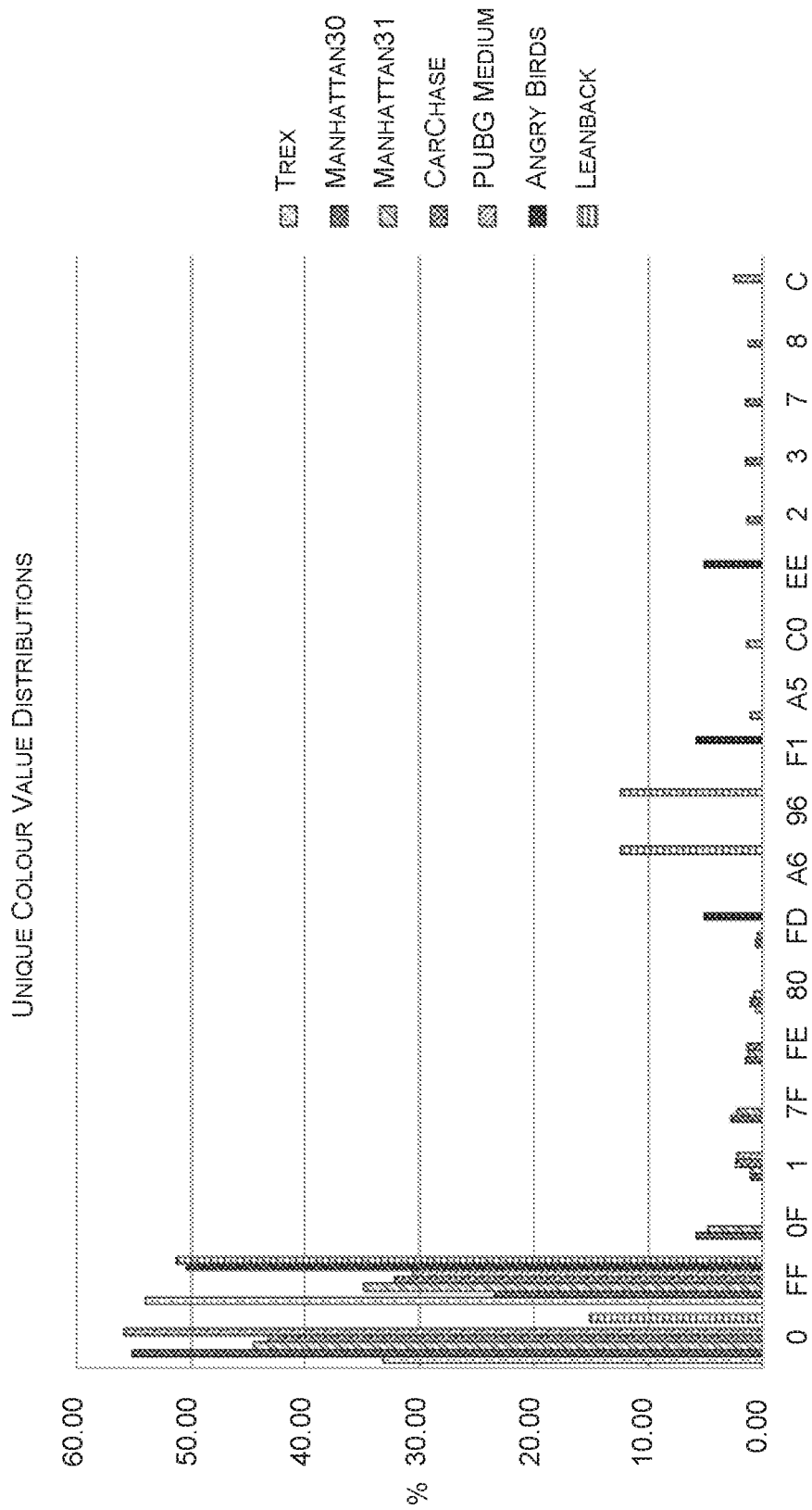
FIG. 13 is a graph illustrating the distribution of channel colour values for unique channel blocks for a plurality of applications.

For example, FIG. 13 shows the distribution of colour values for the 8×8 channel blocks with a unique colour value (i.e. all the colour values in the 8×8 block are the same) for a plurality of different applications. It can be seen in FIG. 13 that a significant portion of the unique 8×8 channel blocks have colour values of 00 (hexadecimal) or FF (hexadecimal). Accordingly, the predetermined channel colour compression algorithm may be used to efficiently compress a significant number of unique colour channel blocks if the predetermined channel colour values are set to 00 (hexadecimal) and FF (hexadecimal). Also, since pixel colour values of 00000000 (hexadecimal), FFFFFFFF (hexadecimal), 00FFFFFF (hexadecimal) and FF000000 (hexadecimal) are very common this will also cover off the common pixel colour values.

However, it can be seen that the next highest colour values for the unique channel blocks is application specific. For example, FD (hexadecimal), F1 (hexadecimal) and EE (hexadecimal) are commonly used channel colour values in the 'Angry Birds' application but not in other applications. Similarly, A6 (hexadecimal) and 96 (hexadecimal) are commonly used channel colour values in the 'Leanback' application, but not in other applications. Accordingly, the number of blocks that can be compressed using this method may be increased if a number (e.g. two) of the predetermined channel colour values were programmable. For example, in some cases there may be four predetermined channel colour values—two of the predetermined colour values may be fixed at 00 (hexadecimal) and FF (hexadecimal)—and two of the predetermined colour values may be programmable (e.g. via register settings). For example, the two programmable predetermined colour values may be set to FD (hexadecimal) and F1 (hexadecimal) when running 'Angry Birds' and A6 (hexadecimal) and 96 (hexadecimal) when running 'Leanback'. In some cases, the two programmable predetermined colour values may have default values that are common for many applications, such as, but not limited to 0F (hexadecimal) and 01 (hexadecimal).

Figure 14:
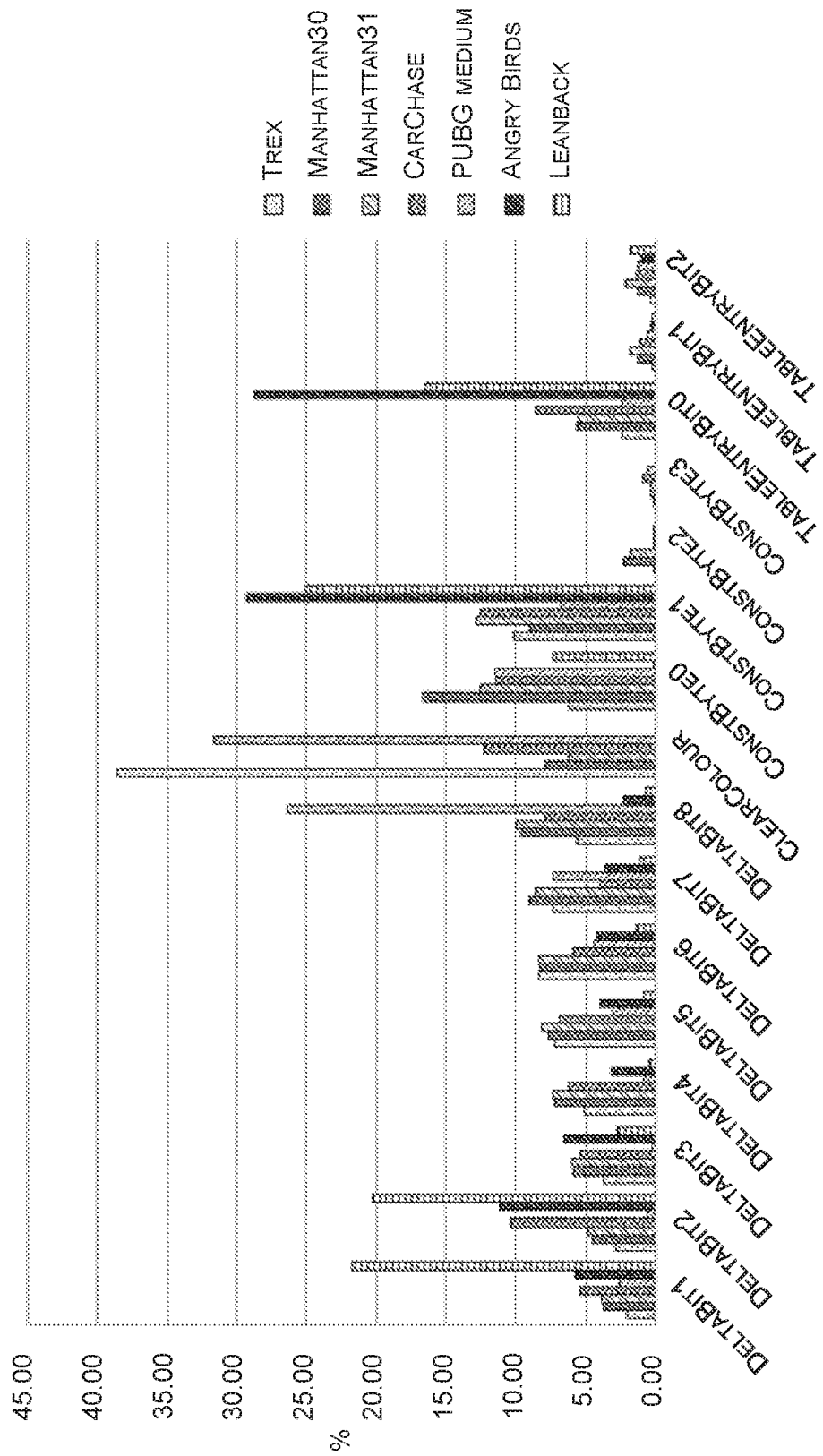
FIG. 14 is a graph illustrating the distribution of compression algorithms for a plurality of applications when the compression algorithms comprise the origin and delta compression algorithm, the predetermined colour compression algorithm and the look-up table compression algorithm.

Reference is now made to FIG. 14 which illustrates the distribution of fixed-length compression algorithms when 8×8 channel blocks are compressed using one of the following fixed-length compression algorithms: the origin and delta compression algorithm (referred to in FIG. 14 as 'DeltaBitx' wherein the number x indicates the number of delta bits that were used); the predetermined pixel colour compression algorithm wherein the predetermined colour value is the clear colour value (referred to in FIG. 14 as 'ClearColour'); the predetermined channel colour compression algorithm wherein there are four predetermined channel colours of 00 (hexadecimal), FF (hexadecimal), 0F (hexadecimal) and 01 (hexadecimal) (referred to in FIG. 14 as 'ConstBytex' wherein the number x indicates which of the four predetermined channel colour values numbered from 0 to 3 was used); and the look-up table compression algorithm (referred to in FIG. 14 as 'TableEntryBitx' wherein the number x indicates the number of index bits). As 'TableEntryBit0' (i.e. the look-up table compression algorithm with zero index bits) is equivalent to the common value compression algorithm, the notation 'TableEntryBit0' is used in this example to indicate that the common value compression algorithm was used.

Accordingly, in the predetermined colour value compression algorithm (either the pixel colour value version or the channel colour value version) the common base information is the information identifying one colour of the one or more predetermined colours and the fixed-length parameters have zero bit length (i.e. no fixed-length parameters are stored).

It will be evident to a person of skill in the art that these are example fixed-length compression algorithms only and that any fixed-length compression algorithm in which the compressed data for any colour value can be randomly accessed may be used in the method 200 of FIG. 2.

Example Compressed Block Formats

Example formats for the compressed blocks generated in accordance with the method 200 of FIG. 2 will now be described.

Figure 15:
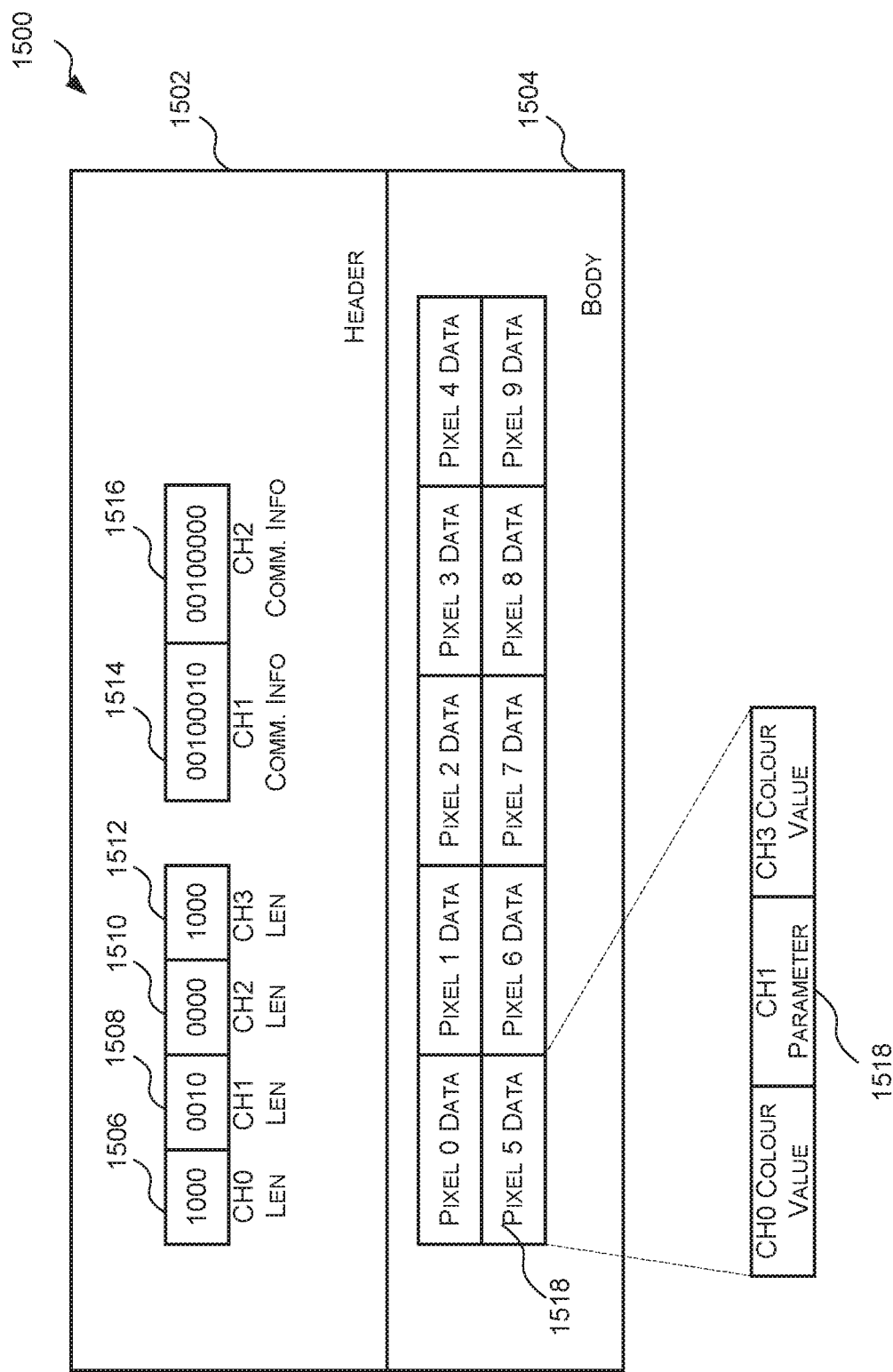
FIG. 15 is a schematic diagram of a first example compressed block format when the channel blocks are not divided into sub-blocks prior to compression.

Reference is now made to FIG. 15 which illustrates a first example format for a compressed block 1500 of image data where the channel blocks are not divided into sub-blocks prior to compression (i.e. each channel block is compressed in its entirety or left uncompressed). In this example there are four channels and thus four channel blocks, however it will be evident to a person of skill in the art that this is an example only and that the method and techniques described herein may be applied to image data with a different number of channels.

The example compressed block 1500 comprises a header 1502 and a body 1504. The header 1502 comprises information indicating which channel blocks were compressed, and for each compressed channel block comprises: information indicating the fixed-length compression algorithm used to compress that channel block, the size or length of the fixed-length parameter, and the common base information for that channel block. The body 1504 comprises the raw or uncompressed colour values for each uncompressed channel block and the fixed-length parameters for each compressed channel block.

In FIG. 15 the header 1502 comprises a length or size field 1506, 1508, 1510, 1512 for each channel block that indicates whether or not that channel block was compressed, and if compressed, indicates the compression algorithm used to compress the channel block and the length or size of the fixed-length parameter. In the example shown in FIG. 15 each length or size field 1506, 1508, 1510, 1512 is 4-bits, a 0 ('0000' (binary)) indicates that the corresponding channel block was compressed using the common value compression algorithm; any number between 1 ('0001' (binary)) and 7 ('0111' (binary)) indicates that the corresponding channel block was compressed using the origin and delta compression algorithm and the parameter length (i.e. the number of delta bits) is equal to that number; and an 8 ('1000' binary) indicates that the corresponding channel block was not compressed and the raw or original colour values of that channel block are included in the compressed block. This is summarized in Table 2.

TABLE 2

| Size Field (binary) | Raw | Compression Algorithm | Parameter Length |
|---|---|---|---|
| 0000 | N | Common Value | 0 |
| 0001-0111 | N | Origin and Delta | Value in Size Field |
| 1000 | Y | — | — |

Accordingly, in the example shown in FIG. 15 the length field 1506, 1512 for channels 0 and 3 is set to eight ('1000' (binary)) indicating channels 0 and 3 were not compressed; the length field 1508 for channel 1 is two ('0010' (binary)) indicating channel 1 was compressed using the origin and delta compression algorithm and the length of the fixed-length parameter is two bits; and the length field 1510 for channel 2 is set to zero ('0000' (binary)) indicating channel 2 was compressed using the common value compression algorithm and the fixed-length parameter is zero bits (i.e. no fixed-length parameter is stored for this channel block).

The header 1502 also comprises a common base information field 1514, 1516 for each compressed channel block that indicates the common base information which, combined with the fixed-length parameter for a colour value, can be used to obtain the raw or original colour value. In this example, only channels 1 and 2 have been compressed so the header 1502 comprises a common base information field 1514, 1516 for channels 1 and 2 only. The common base information is generally based on the fixed-length compression algorithm used to compress the channel block. In this example, channel 1 was compressed according to the origin and delta compression algorithm so the common base information field 1514 comprises the origin value (e.g. minimum colour value); and channel 2 was compressed according to the common value compression algorithm so the common base information field 1516 comprises the common colour value.

The body 1504 comprises the colour values for any uncompressed channel blocks and the fixed-length parameters for any compressed channel blocks. The colour values and/or fixed-length parameters may be stored in the body 1504 in any suitable manner that allows the fixed-length parameters and/or colour values associated with any pixel to be randomly accessible. In some cases, as shown in FIG. 15, the fixed-length parameters and/or colour values that correspond to the same pixel are packed together to form a pixel data unit 1518. In the example shown in FIG. 15, channels 0 and 3 are uncompressed and channels 1 and 2 are compressed, therefore each pixel data unit 1518 comprises the uncompressed colour value for channel 0, the fixed-length parameter for channel 1, the fixed-length parameter for channel 2, and the uncompressed colour value for channel 3. However, in this particular example since channel 2 was compressed with the common value compression algorithm the fixed-length parameter has 0 bits, so no fixed-length parameter is actually stored for channel 2. The pixel data units 1518 may be stored in the body 1504 in any order. For example, the pixel data units 1518 may be stored in a Morton (or Z) order or scan line order within the block.

Figure 16:
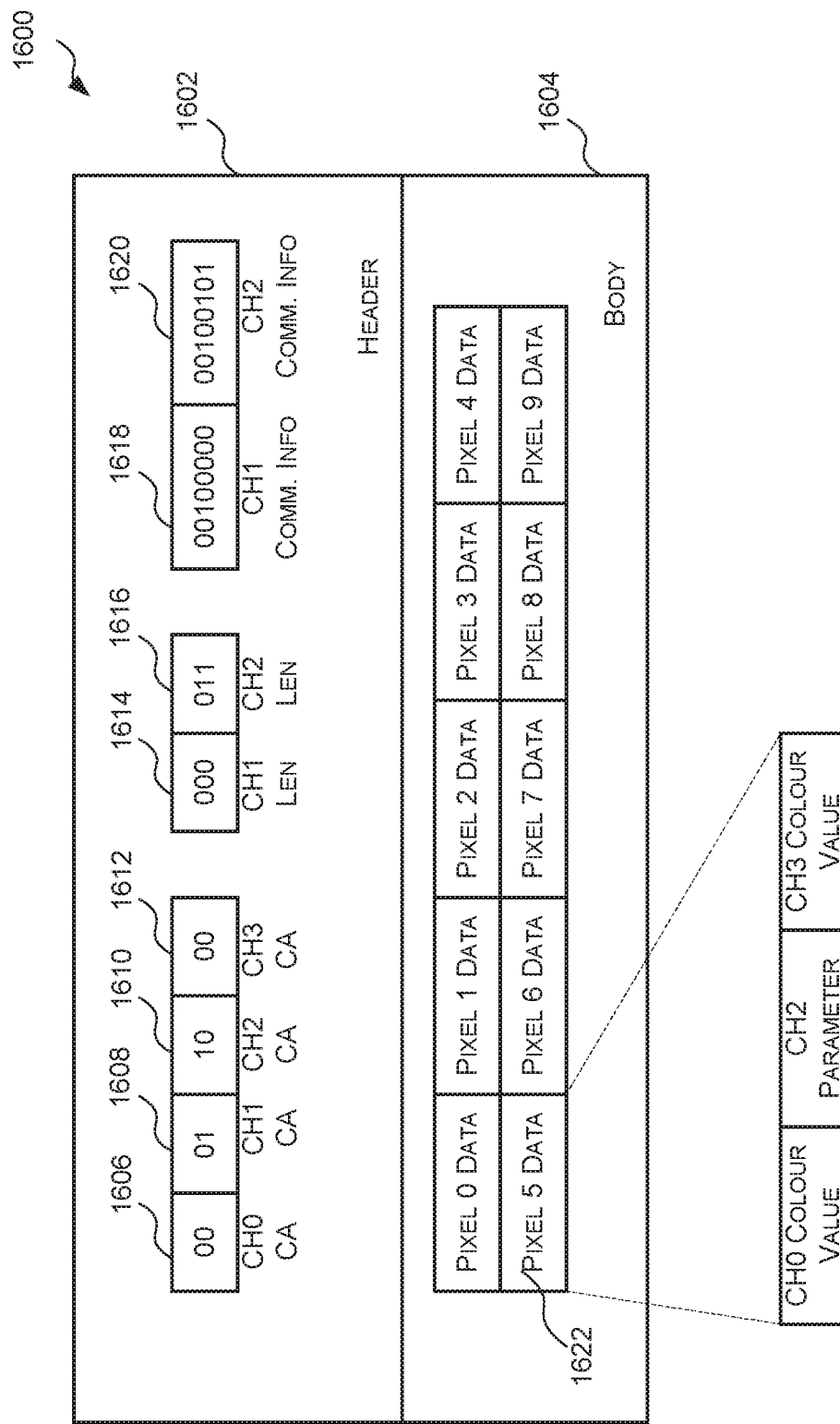
FIG. 16 is a schematic diagram of a second example compressed block format when the channel blocks are not divided into sub-blocks prior to compression.

Reference is now made to FIG. 16 which illustrates a second example format for a compressed block 1600 of image data generated in accordance with the method 200 of FIG. 2 where the channel blocks are not divided into sub-blocks prior to compression (i.e. each channel block is compressed in its entirety or left uncompressed). In this example, like the example of FIG. 15, there are four channels and thus four channel blocks, however it will be evident to a person of skill in the art that this is an example only and that the methods and techniques may be applied to image data with a different number of channels. The example compressed block 1600 comprises a header 1602 and a body 1604. Like the compressed block 1500 of FIG. 15, the header 1602 comprises information indicating which channel blocks were compressed, and for each compressed channel block comprises information indicating the compression algorithm that was used to compress that channel block, the size or length of the fixed-length parameter, and the common base information for that channel block; and the body 1604 comprises the raw or uncompressed colour values for each uncompressed channel block and the fixed-length parameters for each compressed channel block.

The header 1602 in this example comprises a compression algorithm field 1606, 1608, 1610, 1612 for each channel block. Each compression algorithm field 1606, 1608, 1610, 1612 indicates whether or not the corresponding channel block has been compressed or not, and if compressed it indicates the particular fixed-length compression algorithm that was used to compress the channel block. In this example the compression algorithm field is two bits and a 0 ('00' (binary)) in the compression field for a channel block indicates that the channel block was not compressed (and that raw original colour values are stored) and anything else indicates that the channel block was compressed, and the particular fixed-length compression algorithm used to compress the channel block. Specifically, in this example a 1 ('01' (binary)) indicates that the common value compression algorithm was used to compress the channel block; a 2 ('10' (binary)) indicates that the origin and delta compression algorithm was used to compress the channel block; a 3 ('10' (binary)) indicates that the look-up table compression algorithm was used to compress the channel block. This is summarized in Table 3.

TABLE 3

| Compression Algorithm Field | Raw | Compression Algorithm |
| --- | --- | --- |
| 00 | Y | — |
| 01 | N | Common Value |
| 10 | N | Origin and Delta |
| 11 | N | Look-up Table |

In the example shown in FIG. 16, the compression algorithm fields 1606, 1608, 1610 and 1612 indicate that channels 0 and 3 were not compressed, and that channels 1 and 2 were compressed using the common value, and origin and delta compression algorithms respectively. If a channel block is not compressed then, as described in more detail below, the body comprises the original or uncompressed colour values for that block.

In the example of FIG. 16 the header 1602 also comprises a length or size field 1614, 1616 for each compressed channel block that indicates the length or size of the fixed-length parameter. In this example only channels 1 and 2 have been compressed so the header 1602 only comprises a length or size field 1614, 1616 for channels 1 and 2. In this example, the length or size field 1614, 1616 is three bits which can be used to indicate a size or length ranging from 0 bits to 7 bits. Specifically, channel 1 has a fixed-length parameter of 0 bits (i.e. it was compressed using the common value compression algorithm, so no fixed-length parameters are stored) and channel 2 has a fixed-length parameter of 3 (i.e. the fixed-length parameters are each 3 bits). However, it will be evident to a person of skill in the art that this is an example only and that the length or size field 1614, 1616 may have any suitable number of bits and/or format. In some cases, there may not be a length or size field for blocks compressed using the common value compression algorithm as it is known from the compression field that the length of the fixed-length parameter is zero bits.

The header 1602 also comprises a common base information field 1618, 1620 for each compressed channel block that indicates the common base information which, combined with the fixed-length parameter for a colour value, can be used to obtain the raw or original colour value. In this example, only channels 1 and 2 have been compressed so the header 1602 only comprises common base information fields 1618, 1620 for channels 1 and 2. The common base information is generally based on the fixed-length compression algorithm used to compress the channel block. In this example channel 1 was compressed using the common value compression algorithm so the common base information field 1618 for channel 1 comprises the common value; and channel 2 was compressed using the origin and delta compression algorithm so the common base information field 1620 for channel 2 comprises the origin value.

The body 1604, like the body 1504 of FIG. 15, comprises the colour values for any uncompressed channel blocks and the fixed-length parameters for any compressed channel blocks. The colour values and/or fixed-length parameters may be stored in the body 1604 in any suitable manner that allows the fixed-length parameters and/or colour values to be randomly accessible. In some cases, as described above, the fixed-length parameters and/or colour values that correspond to the same pixel are packed together to form a pixel data unit 1622. Since in the example shown in FIG. 16, channels 0 and 3 are uncompressed and channels 1 and 2 are compressed each pixel data unit 1622 comprises the uncompressed colour value for channel 0, the fixed-length parameter for channel 1, the fixed-length parameter for channel 2, and the uncompressed colour value for channel 3. However, since channel 1 was compressed using the common value compression algorithm the fixed-length parameter has a length of 0 bits, so no fixed-length parameter is stored for channel 1. The pixel data units 1622 may be stored in the body 1604 in any order. For example, as described above, the pixel data units 1622 may be stored in Morton (or Z) order or scan line order within the block.

Figure 17:
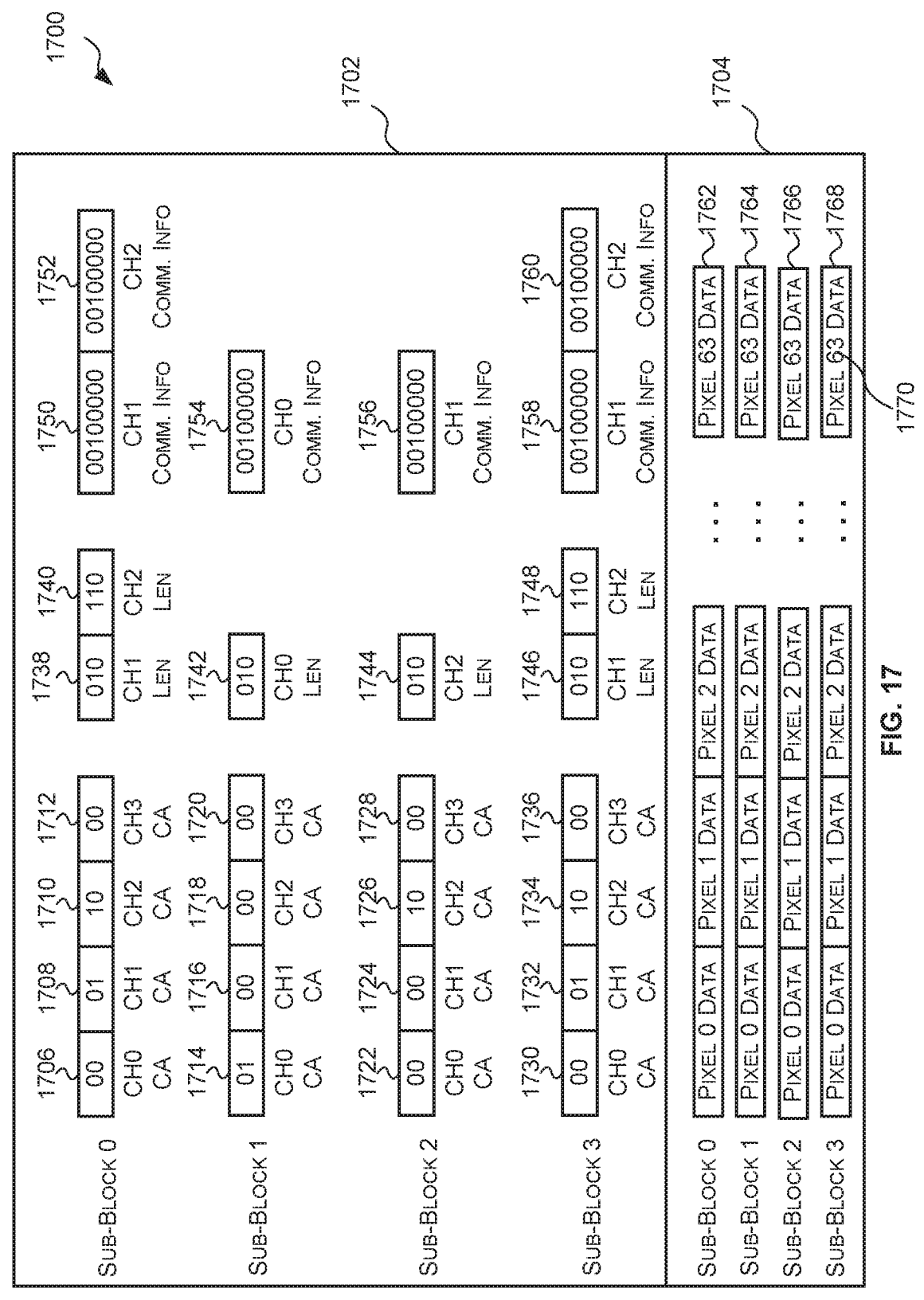
Figure 18:
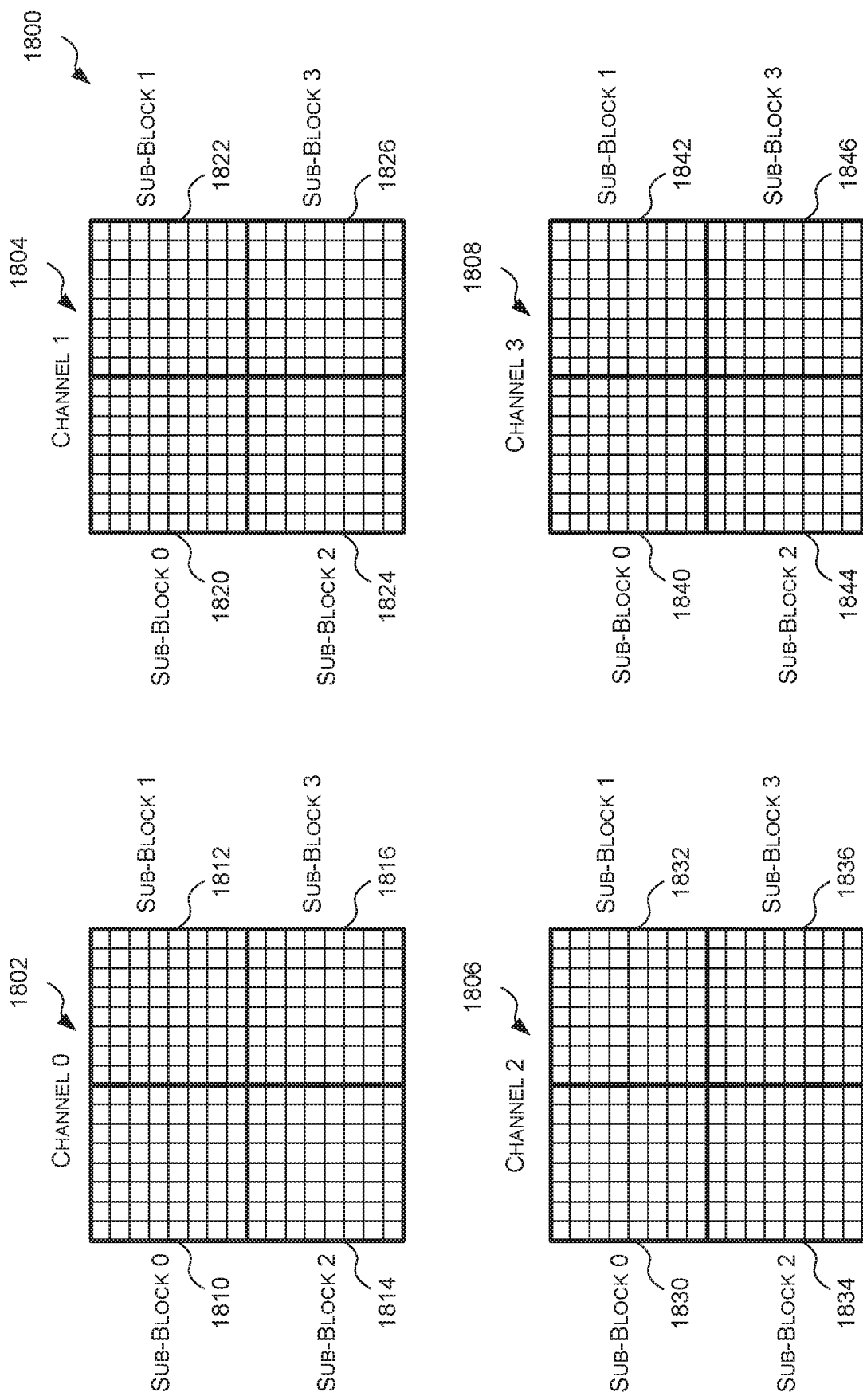
FIG. 18 is a schematic diagram of a block of image data wherein each channel block is divided into a plurality of sub-blocks.

Reference is now made to FIG. 17 which illustrates an example format for a compressed block 1700 of image data where each channel block is divided into four sub-blocks and each sub-block can be compressed or left uncompressed. In this example there are four channels and thus four channel blocks, however it will be evident to a person of skill in the art that this is an example only and that the methods and techniques may be applied to image data with a different number of channels. For example, as shown in FIG. 18 the block of image data 1800 may comprise RGBA image data for a 16×16 block of pixels. The image data 1800 can be divided into four 16×16 channel blocks 1802, 1804, 1806, 1808—i.e. a 16×16 block 1802 of colour values for channel 0 (red channel); a 16×16 block 1804 of colour values for channel 1 (green channel); a 16×16 block 1806 of colour values for channel 2 (blue channel); and a 16×16 block 1808 of colour values for channel 3 (opacity channel). In this example, prior to compression, each channel block 1802, 1804, 1806, 1808 is divided into four 8×8 sub-blocks—sub-block zero 1810, 1820, 1830, 1840, sub-block one 1812, 1822, 1832, 1842, sub-block two 1814, 1824, 1834, 1844, and sub-block three 1816, 1826, 1836, 1846.

Like the compressed blocks 1500 and 1600 of FIGS. 15 and 16, the compressed block 1700 of FIG. 17 comprises a header 1702 and a body 1704. The header 1702 comprises information indicating which sub-blocks were compressed, and for each compressed sub-block comprises information indicating the compression algorithm used to compress that sub-block, the size or length of the fixed-length parameter, and the common base information for that sub-block; and the body 1704 comprises the raw or uncompressed colour values for the uncompressed channel sub-blocks and the fixed-length parameters for the compressed channel sub-blocks.

The header 1702 of FIG. 17 is similar to the header 1602 of FIG. 16 in that it comprises: compression algorithm fields 1706, 1708, 1710, 1712, 1714, 1716, 1718, 1720, 1722, 1724, 1726, 1728, 1730, 1732, 1734, 1736; length or size fields 1738, 1740, 1742, 1744, 1746, 1748; and common base information fields 1750, 1752, 1754, 1756, 1758 and 1760. However, where the header 1602 of FIG. 16 only comprises a single set of compression algorithm fields, length or size fields, and common base information fields, the header 1702 of FIG. 17 comprises a set of compression algorithm fields, length or size fields, and common base information fields for each sub-block of the image data. Each set of compression algorithm fields, length or size fields, and common base information fields works the same way as the compression algorithm fields, length or size fields, and common base information fields of FIG. 16 except instead of describing the compression (or lack thereof) of a channel block they describe the compression of a channel sub-block. Specifically, for each sub-block of the image data there is: a compression algorithm field for each channel that indicates whether that channel sub-block has been compressed and if so, by which algorithm; a length or size field for each compressed channel sub-block that indicates the length of the fixed-length parameter for that compressed channel sub-block; and a common base information field for each compressed channel sub-block that comprises the common base information for that compressed channel sub-block.

It will be evident to a person of skill in the art that this is only an example format for the header 1702 and the header 1702 may take any suitable format. For example, in other cases, instead of the header comprising a set of compression algorithm fields, length or size fields, and common base information fields for each sub-block as described with reference to FIG. 16, the header may comprises a set of length or size fields and common base information fields for each sub-block as described with reference to FIG. 15.

The body 1704 of FIG. 17 includes the fixed-length parameters for each compressed channel sub-block and the original colour values for each uncompressed channel sub-block. The fixed-length parameters and/or original colour values may be stored in the body 1704 in any suitable manner in which they can be randomly accessed. In some cases, such as in the example shown in FIG. 17, the fixed-length parameters and/or original colour values are grouped by sub-block to form a sub-block data unit 1762, 1764, 1766, 1768. Within each sub-block data unit 1762, 1764, 1766, 1768 the fixed-length parameters and/or colour values related to the same pixel may be packed together to form a pixel data unit 1770 as described above with respect to FIGS. 15 and 16. For example, if for a particular sub-block, channels 0 and 1 are not compressed and channels 2 and 3 are compressed then each pixel data unit for that sub-block may comprise the original uncompressed colour value for channel 0, the original uncompressed colour value for channel 1, the fixed-length parameter for channel 2, and the fixed-length parameter for channel 3.

To improve the memory usage and bandwidth efficiency the sub-block data units 1762, 1764, 1766, 1768 may be packed together. The sub-block data units 1762, 1764, 1766, 1768 may be packed at any granularity such as, but not limited to, bytes or 4-byte words (i.e. the next sub-block may start at the next byte after the previous sub-block ends or the next sub-block may start at the next 4-byte word after the previous sub-block ends).

Although the start of each sub-block data unit 1762, 1764, 1766, 1768 can be determined from the length information and/or the compression algorithm information, in some cases the header 1702 may also include an offset field for each sub-block that indicates the location (e.g. address) within the body at which the sub-block data unit 1762, 1764, 1766, 1768 for that sub-block starts. This may allow the compressed data for a particular sub-block to be located more quickly, however it increases the size and complexity of the header 1702. In some cases, the offset field may indicate the address offset with respect to the start of the body 1704 at which the corresponding sub-block data unit begins. Using an offset, as opposed to the actual address, allows a smaller number of bits to be used to specify the address of the sub-block data unit.

It will be evident to a person of skill in the art that these are example formats for compressed blocks generated in accordance with the method 200 of FIG. 2 and that the compressed blocks may take any suitable form.

Dynamic Selection of Fixed-Length Compression Algorithm

In some cases, the fixed-length compression algorithm that is used to compress a channel block/sub-block in step 206 of the method 200 of FIG. 2 may be dynamically selected based on the diversity of the colour values in the channel block/sub-block. For example, in some cases, prior to compressing a channel block/sub-block the colour values of the channel block/sub-block are analysed to generate one or more diversity statistics that indicate the diversity of the colour values in the channel block/sub-block. One of a plurality of fixed-length compression algorithms is then selected for the channel block/sub-block based on the diversity statistic(s). Diversity statistics may include, but are not limited to, the number of unique colour values in the channel block/sub-block, the range of the colour values in the channel block/sub-block (or statistics from which the range may be determined such as the minimum and maximum colour values) and/or any other suitable statistic.

Figure 19:
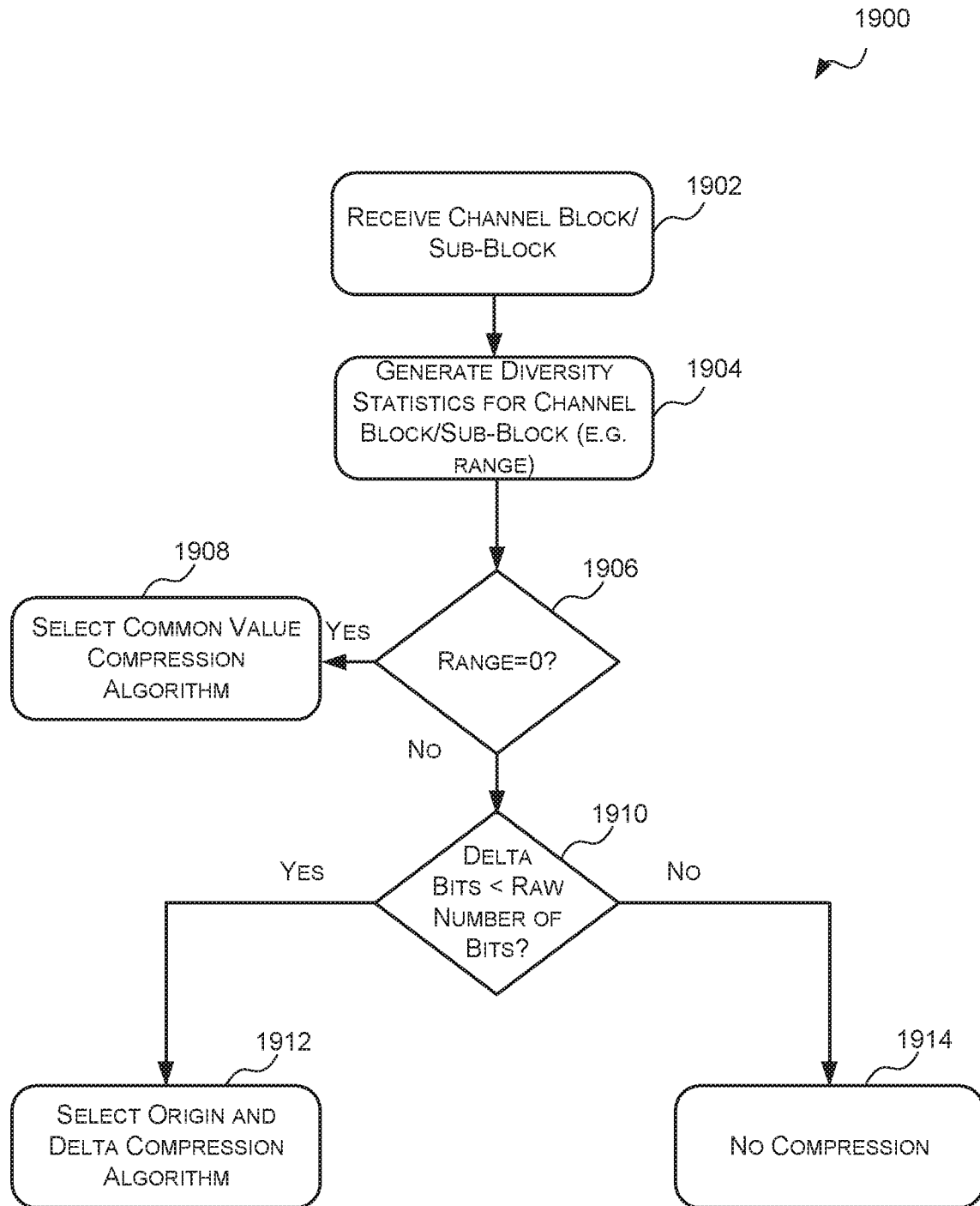
FIG. 19 is a flow diagram of a first example method for selecting a fixed-length compression algorithm for compressing a channel block/sub-block.

Reference is now made to FIG. 19 which illustrates a first example method 1900 for dynamically selecting a fixed-length compression algorithm for compressing a channel block/sub-block. In this example method 1900 either the common value compression algorithm or the origin and delta compression algorithm may be used to compress channel blocks/sub-blocks. The method 1900 begins at step 1902 where a channel block/sub-block is received (e.g. a 32×32 or 16×16 block of colour values for a channel). Once the channel block/sub-block has been received, the method 1900 proceeds to step 1904 where diversity statistics are generated for the received channel block/sub-block. In this example, the diversity statistics may include the range of the colour values in the channel block/sub-block (or statistics from which the range may be determined such as the minimum and maximum colour values in the block/sub-block). The range may be determined using any suitable method, such as, but not limited to, the modulo method described above. Once the diversity statistics are generated, the method 1900 proceeds to step 1906 where a determination is made as to whether the range is zero (i.e. all the colour values in the channel block/sub-block are the same). If the range is zero, then the common value compression algorithm is selected at step 1908 to compress the channel block/sub-block. If, however, the range is not zero (indicating there are at least two different colour values in the channel block/sub-block) then a determination is made at step 1910 as to whether the range can be represented with fewer delta bits than the raw or original colour values. For example, if the raw or original colour values are each 8-bits then a determination is made as to whether the range can be represented with fewer than 8-bits. If it is determined at step 1910 that the range can be represented with fewer delta bits than the raw or original colour values, then the origin and delta compression algorithm may be selected at step 1912 to compress the channel block/sub-block. If, however, it is determined at step 1910 that the range cannot be represented with fewer delta bits than the raw or original colour values then at step 1914 a determination is made not to compress the channel block/sub-block.

Figure 20:
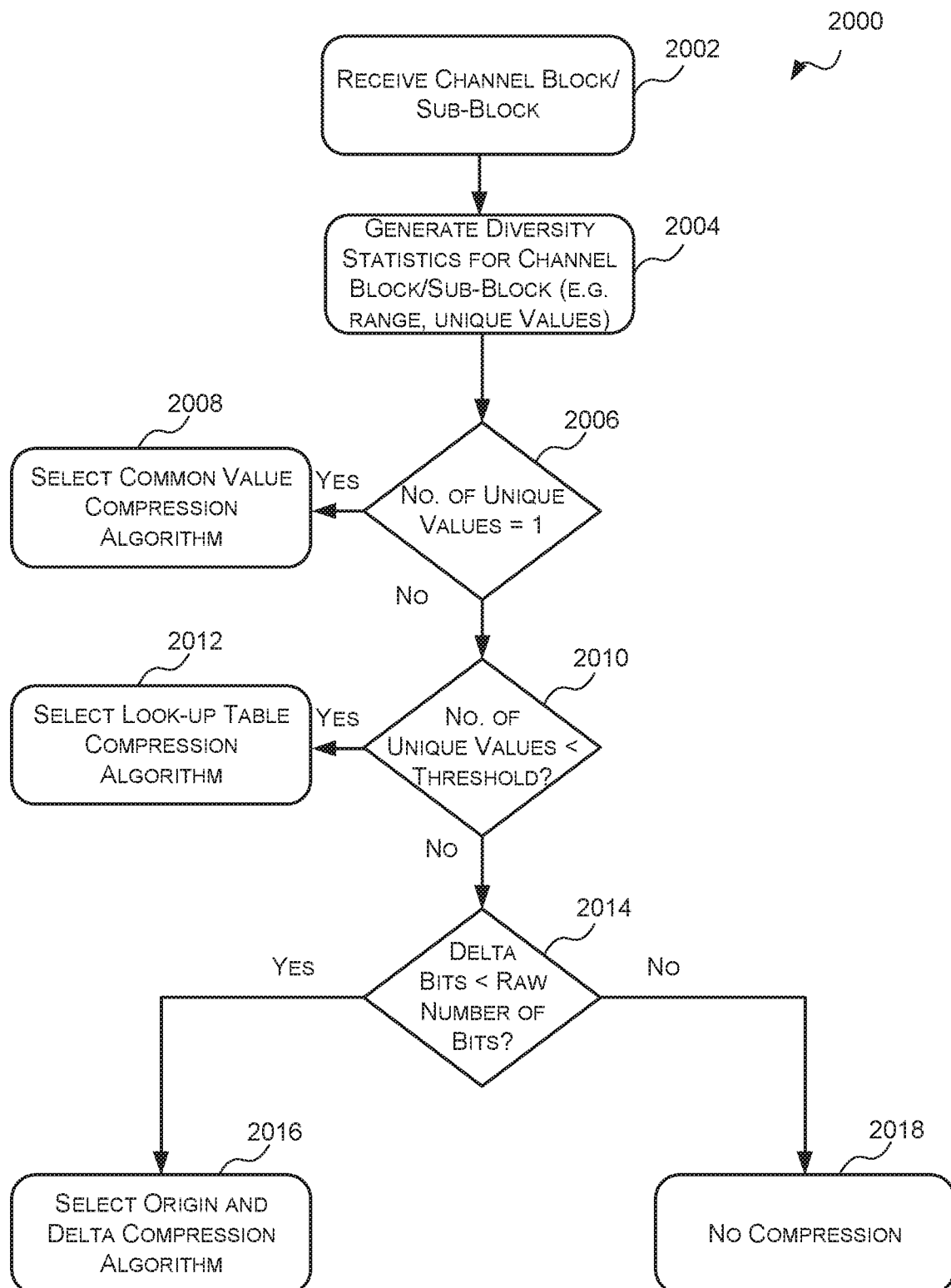
FIG. 20 is a flow diagram of a second example method for selecting a fixed-length compression algorithm for compressing a channel block/sub-block.

Reference is now made to FIG. 20 which illustrates a second example method 2000 for dynamically selecting a fixed-length compression algorithm for a channel block/sub-block. In this example method 2000 any of: the common value compression algorithm, the origin and delta compression algorithm, and the look-up table compression algorithm may be used to compress a channel block/sub-block. The method 2000 begins at step 2002 where a channel block/sub-block is received (e.g. a 32×32 or 16×16 block of colour values for a channel). Once the channel block/sub-block has been received, the method 2000 proceeds to step 2004 where diversity statistics are generated for the received channel block/sub-block. In this example, the diversity statistics may include the range of colour values in the channel block/sub-block (or statistics from which the range may be determined such as the minimum and maximum colour values) and the number of unique colour values in the channel block/sub-block. The range may be determined using any suitable method, such as, but not limited to, the modulo method described above. Once the diversity statistics for the channel block/sub-block have been generated, the method 2000 proceeds to step 2006 where a determination is made whether the number of unique colour values in the block/sub-block is one (i.e. all the colour values in the channel block/sub-block are the same). As the range will also be zero when there is only one unique colour value in the channel block/sub-block the decision may alternatively be based on the range. If it is determined in step 2006 that there is only one unique colour value in the block/sub-block, then at step 2008 the common value compression algorithm is selected. If, however, it is determined at step 2006 that there is more than one unique colour value in the channel block/sub-block then the method 2000 proceeds to step 2010.

At step 2010 a determination is made as to whether the number of unique colour values exceeds a threshold (e.g. 2, 3 or 4). If it is determined at step 2010 that the number of unique colour values does not exceed the threshold then the look-up table compression algorithm is selected to compress the channel block/sub-block at step 2012. If, however, it is determined that the number of unique colour values does exceed the threshold then the method 2000 proceeds to step 2014 where a determination is made as to whether the range can be represented with fewer bits than the raw or original colour values. For example, if the raw or original colour values are each 8-bits then a determination is made as to whether the range can be represented with fewer than 8-bits. If it is determined at step 2014 that the range can be represented with fewer bits than the raw or original colour values, then the origin and delta compression algorithm is selected to compress the channel block/sub-block at step 2016. If, however, it is determined at step 2014 that the range cannot be represented with fewer bits than the raw or original colour values then at step 2018 a determination is made not to compress the channel block/sub-block.

It will be evident to a person of skill in the art that these are examples only and that any suitable criteria and/or method may be used to select a fixed-length compression algorithm for compressing a channel block/sub-block. For example, in some cases the compression algorithm that would allow the channel block/sub-block to be represented by the smallest amount of data may be selected to compress the channel block/sub-block. For example, in some cases, if it is determined at step 2010 of method 2000 of FIG. 20 that the number of unique colour values does not exceed the threshold, instead of proceeding directly to step 2012, the total amount of data to store the channel block/sub-block using the look-up table compression algorithm may be determined (including the data in the look-up table and the indices for each colour value in the channel block/sub-block) and compared to the total amount of data to store the channel block/sub-block using the origin and delta compression algorithm (including the common base information (e.g. the origin value) and the delta values for each colour value in the channel block/sub-block). If it is determined that the total amount of data to store the channel block/sub-block using the look-up table compression algorithm is less than the total amount of data to store the channel block/sub-block using the origin and delta compression algorithm, then the method may proceed to step 2012. If, however, it is determined that the total amount of data to store the channel block/sub-block using the look-up table compression algorithm is greater than or equal to the total amount of data to store the channel sub-block using the origin and delta compression algorithm, then the method may proceed to step 2016.

Although the methods described above for selecting a fixed-length compression algorithm to compress a channel block/sub-bock (e.g. the methods 1900 and 2000 of FIGS. 19 and 20) are described as forming part of the method 200 of FIG. 2, in other examples the described methods may be used independently of the method 200 of FIG. 2 to select a fixed-length compression algorithm for a channel block/sub-block or for another block of data.

Hierarchical Compression

In general, the larger the size of the block/sub-block that is compressed, the simpler the header of the compressed block can be and thus the less header overhead. However, the colour values will be more diverse in a larger channel block/sub-block, therefore the number of bits needed to represent the colour values in larger channel blocks/sub-blocks is generally higher. As shown in FIGS. 8-10, the percentage of channel blocks/sub-blocks that required a higher number of delta bits increased for channel block/sub-block sizes of 16×16 pixels and 32×32 pixels compared with channel block/sub-block sizes of 8×8 pixels. Experiments have shown that in the Manhattan 3.0 benchmark test the total compressed data size when the origin and delta compression algorithm was used increased 8% each time the compression block size increased. Specifically, in the Manhattan 3.0 benchmark test compressing the channel blocks using the origin and delta compression algorithm in 8×8 blocks reduced the size of the image data 61% relative to the uncompressed image data; in 16×16 blocks reduced the size of the image data 54%; and in 32×32 blocks reduced the size of the image data 46%. Accordingly, in general, the smaller the size of the block/sub-block that is compressed the better the compression. However, there will be some channel blocks which can be compressed well using a larger block size.

Therefore, to improve the efficiency of compression without losing the ability to represent large blocks of similar colour values efficiently, in some cases a hierarchical compression scheme, which may also be referred to herein as a multi-level compression scheme, may be implemented. In a hierarchical compression scheme the blocks of the channel block that are compressed together (i.e. as a unit) are dynamically selected from a plurality of block sizes. For example, instead of determining in advance that a 32×32 channel block is going to be divided into sixteen 8×8 blocks which are compressed individually, it may be dynamically determined whether the 32×32 channel block is to be compressed as a 32×32 block or as sixteen 8×8 blocks. In some examples, non-square block sizes may be used. For example, block sizes of 32×16, 16×32, 16×8, or 8×16 may also be considered.

In some cases, there may be more than two sizes or levels of compression to choose from. For example, a 32×32 channel block may be compressed at a 32×32 block level, a 16×16 block level or an 8×8 block level. In these cases, a channel block may be compressed using any combination of the lower level blocks. For example, the 32×32 block may be compressed as a 32×32 block or any combination of 16×16 and 8×8 blocks. For example, one 16×16 block may be compressed as a unit whereas the other 16×16 blocks may be compressed as 8×8 blocks.

In these cases, the method 200 of FIG. 2 further comprises selecting the blocks of each channel block to compress. In general, the more diverse the colour values in a channel block, the smaller the size of the blocks that are compressed, and, the less diverse the colour values in the channel block, the larger the size of the blocks that are compressed.

Any suitable criteria may be used to select the block(s) of a particular channel block to compress. In some cases, the blocks of a particular channel block to be compressed may be selected by starting with the largest block size, determining whether the channel can be suitably compressed at that size and if not, dividing that block into a plurality of sub-blocks and, if the sub-block is not the minimum block size, repeating the method for each sub-block (i.e. determine whether that sub-block can be compressed at that block-size and if not, dividing that block into a plurality of sub-blocks) until a suitable compression algorithm is selected for each sub-block or the smallest block-size has been reached.

Figure 21:
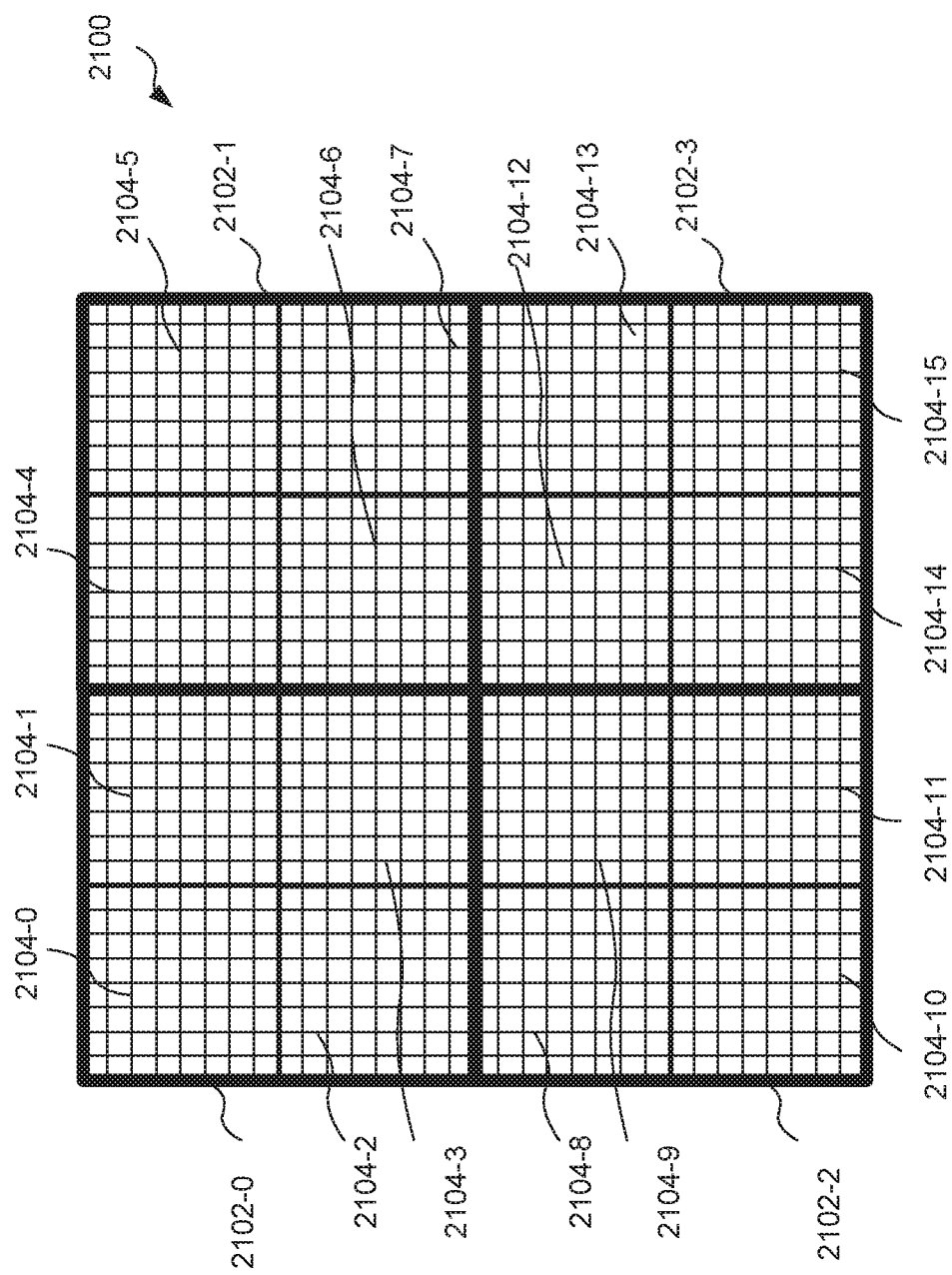
FIG. 21 is a schematic diagram of a channel block that is divided into multiple levels of blocks.

For example, FIG. 21 shows a channel block 2100 that comprises a 32×32 block of colour values which can be divided into four 16×16 sub-blocks 2102-0, 2102-1, 2102-2, 2102-3, each of which can be divided into four 8×8 sub-blocks 2104-0, 2104-1, 2104-2, 2104-3, 2104-4, 2104-5, 2104-6, 2104-7, 2104-8, 2104-9, 2104-10, 2104-11, 2104-12, 2104-13, 2104-14, 2104-15. In this example, the channel block 2100 can be compressed using any combination of 32×32, 16×16 and 8×8 blocks. In this example, a determination is first made as to whether the 32×32 channel block can be suitably compressed as a 32×32 block. If it is determined that the channel block can be compressed as a 32×32 block, then the 32×32 block is compressed. If, however, it is determined that the channel block cannot be suitably compressed as a 32×32 block then the 32×32 block is divided into four 16×16 blocks and a determination is made for each 16×16 block whether that block can be suitably compressed. If any 16×16 block can be suitably compressed, then that 16×16 block is compressed. If, however, any 16×16 block cannot be suitably compressed as a 16×16 block then that 16×16 block is divided into 8×8 blocks and the 8×8 blocks are compressed (or not compressed). In some cases, the determination of whether the channel block/sub-block can be suitably compressed at that block size is based on the size of the fixed-length parameter for that channel block/sub-block.

This may result in, for example, the entire 32×32 block being compressed together, each 16×16 block being compressed together, one to three 16×16 blocks being compressed together (e.g. blocks 2102-0, 2102-1, and 2102-2) and the remaining 16×16 block(s) (e.g. block 2102-3) being compressed as 8×8 blocks (e.g. blocks 2104-12, 2104-13, 2104-14, 2104-15); or all the 8×8 blocks being individually compressed.

Figure 22:
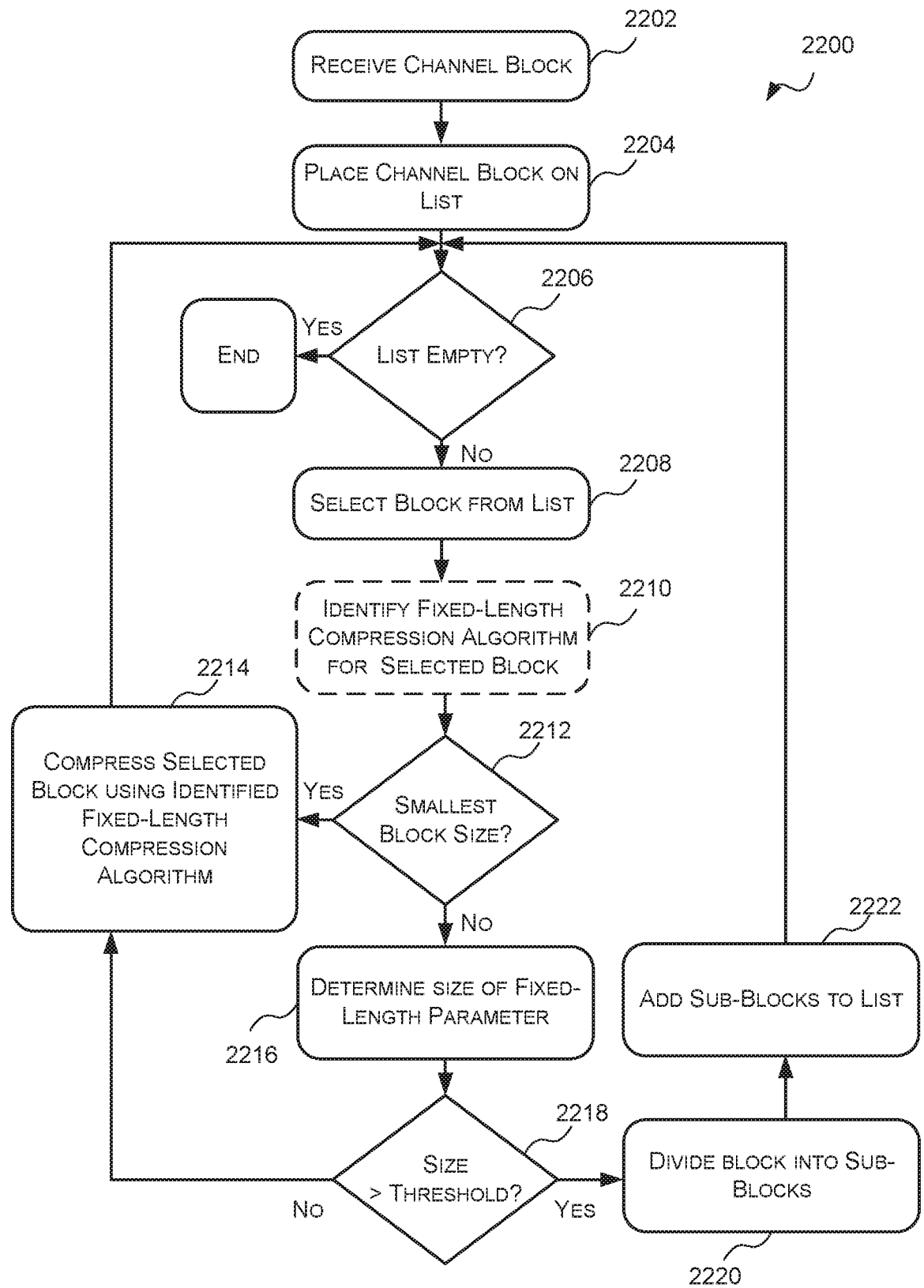
FIG. 22 is a flow diagram of an example method for selecting the blocks of a channel block to compress.

Reference is now made to FIG. 22 which illustrates an example method 2200 for selecting the blocks of a channel block to be compressed which may be implemented by a compression unit, such as the compression unit 2400 described below. The method 2200 begins at step 2202 where a channel block (e.g. a 32×32 block of colour values for a particular channel) to be compressed is received. Once the channel block has been received the method 2200 proceeds to step 2204 where the received channel block is placed on a list of blocks to be compressed. The method 2200 then proceeds to step 2206 where it is determined whether the list of blocks to be compressed is empty. If it is determined that the list is empty, then the compression of the channel block is complete, and the method 2200 ends. If, however, there is at least one block in the list of blocks to be compressed then the method 2200 proceeds to step 2208 where one of the blocks in the list of blocks to be compressed is selected and removed from the list. In the first iteration of step 2208 the channel block will be selected. In any other iteration of block 2208 (if necessary) a channel sub-block will be selected. Once a block has been selected from the list of blocks to be compressed, the method 2200 proceeds to step 2210.

At step 2210, a fixed-length compression algorithm for compressing the block is selected or identified. Any suitable method, such as, but not limited to, those described above with reference to FIGS. 19 and 20, may be used to select or identify a fixed-length compression algorithm for compressing the block. Once a fixed-length compression algorithm for compressing the block has been selected or identified the method 2200 proceeds to step 2212.

At step 2212, it is determined whether the selected block is the minimum block size. If the selected block is the minimum block size, then the selected block has to be compressed at this level or left uncompressed (i.e. it cannot be divided into sub-blocks for compression). If, however, the selected block is not the minimum sized block then the block may only be compressed at this level if it can be suitably compressed using the selected or identified fixed-length compression algorithm. If it cannot be suitably compressed using the selected or identified fixed-length compression algorithm it may be divided into sub-blocks which may be individually compressed. Accordingly, if it is determined at step 2212 that the selected block is of the minimum block size, then the method 2200 proceeds to step 2214 where the selected block is compressed using the selected or identified fixed-length compression algorithm (which may include storing the raw or original colour values). If, however, it is determined at step 2212 that the selected block is not the minimum block size (i.e. it is larger than a minimum sized block) then the method 2200 proceeds to step 2216.

At step 2216, the size of the fixed-length parameter when the selected fixed-length compression algorithm is used to compress the selected block is determined. Once the size of the fixed-length parameter is determined, the method 2200 then proceeds to step 2218. At step 2218, a determination is made as to whether the size of the fixed-length parameter exceeds a threshold which indicates that the block can be suitably or efficiently compressed. In some cases, the threshold may be 0 meaning that a higher level block size is only used if all the colour values in the block are the same. In other cases, the threshold may be another small number such as, but not limited to, 1, 2 or 3. In some cases, the threshold may be based on the size of the selected block. Therefore there may be different thresholds for different sized blocks (e.g. the 32×32 block threshold may be different than the 16×16 block threshold). If it is determined at step 2218 that the size does not exceed the threshold, then the method 2200 proceeds to step 2214 where the selected block is compressed using the selected or identified fixed-length compression algorithm.

If, however it is determined at step 2218 that the size of the fixed-length parameter exceeds the threshold (e.g. indicating that it is not suitable or efficient to compress this entire block together) then the method 2200 proceeds to steps 2220 and 2222 where the block is divided into a plurality (e.g. n) of sub-blocks and the sub-blocks are added to the list of blocks to be compressed. The number and size of the sub-blocks may be based on the size of the selected block and the block sizes supported by the compression unit. In some cases, the selected block is divided into sub-blocks of the next smallest supported block size. For example, if the channel block is a 32×32 pixel block and the compression unit can compress the 32×32 pixel block at the 32×32 pixel block level, the 16×16 pixel block level or an 8×8 pixel block level, then if the selected block is a 32×32 pixel block it may be divided into four 16×16 pixel blocks, and if the selected block is a 16×16 pixel block it may be divided into four 8×8 pixel blocks. Once the sub-blocks have been added to the list of blocks to be compressed, steps 2210 to 2222 are repeated for each sub-block.

Specifically, for each sub-block, a fixed-length compression algorithm is selected or identified for that sub-block. If the sub-block is the smallest supported block size then the sub-block is compressed using the selected or identified fixed-length compression algorithm. If, however, the sub-block is not the minimum supported block size the size of the fixed-length parameter for the selected fixed-length compression algorithm is determined. If the size of the fixed-length parameter does not exceed the threshold then the sub-block is compressed according to the selected fixed-length compression algorithm. If, however, the size of the fixed-length parameter for the selected fixed-length compression algorithm exceeds the threshold then the sub-block is further sub-divided into sub-sub-blocks or mini-blocks and the sub-sub-blocks or mini blocks are added to the list of block to be compressed. The method is then repeated for the sub-sub-blocks or the mini blocks until the entire channel block has been compressed.

It will be evident to a person of skill in the art that where there is only one fixed-length compression algorithm or the fixed-length compression algorithm for a selected block is predetermined then step 2210 may be omitted for that block.

It will be evident to a person of skill in the art that this is an example method only and that other suitable methods may be used to select the blocks of a channel block to be compressed. For example, other methods may work in reverse—i.e. they may start with the lowest level blocks and only if it is possible to compress the lower level blocks with a certain number of bits is the higher level block considered for compression.

When a hierarchical compression scheme is implemented the compressed block (e.g. the header of the compressed block) may also comprise information indicating which blocks of each channel have been compressed. For example, in some cases, the header of the compressed block may comprise for each compression level, information for each block at that level, that indicates whether that block has been compressed together for each channel. For example, RGBA image data for a 32×32 block of pixels comprises four 32×32 channel blocks of colour values. If each channel block can be compressed as a 32×32 block, as one or more 16×16 blocks and/or one or more 8×8 blocks then there are three compression levels—level 1: compression of a 32×32 block;

level 2: compression of 16×16 blocks; and level 3: compression of 8×8 blocks. In this example there is one block at level 1 thus the header of the compressed block may comprise information for that block that indicates whether that block has been compressed for each channel. There are four blocks at level 2 thus the header may comprise information for each of these four blocks that indicate whether that block has been compressed for each channel. There are sixteen blocks at level 3 thus the header may comprise information for each of these sixteen blocks that indicate whether that block has been compressed for each channel.

Reference is now made to FIG. 23 which illustrates an example header 2302 for a compressed block of image data that has been generated using a hierarchical compression scheme (i.e. the blocks and the sizes thereof that are compressed are dynamically selected). In this example, the header is generated for a 32×32 block of image data with four channels such that each of the four channel blocks comprises a 32×32 block of colour values like the channel block 2100 of FIG. 21. In this example there are three possible levels of compression—level 1: 32×32 block, level 2: 16×16 blocks; and level 3: 8×8 blocks. However, it will be evident to a person of skill in the art that this is an example only and that the techniques and principles described herein may be applied to different sized image/channel blocks that can be compressed at different block sizes.

The header 2302 of FIG. 23 is divided into a level 1 section 2304, a level 2 section 2306 and a level 3 section 2308. Each section 2304, 2306, 2308 comprises information for each block at that level that indicates whether that block is compressed for each channel. Each section 2304, 2306, 2308 also comprises information indicating the length or size of the fixed-length parameter and the common base information for any block at that level that is compressed. In some cases, the corresponding section will also include information that indicates the fixed-length compression algorithm which was used to compress the block.

In the example shown in FIG. 23, each section 2304, 2306, 2308 comprises a set of compression fields (one for each channel) for each block at that level that indicates whether or not that channel block is compressed at that level. For example, at level 1 there is only one block—the 32×32 block—so the level 1 section 2304 comprises a set of four compression fields 2310, 2312, 2314, 2316 (one for each channel) which indicates whether the 32×32 block of that channel was compressed. For example, the first compression field 2310 indicates whether the 32×32 block was compressed for channel 0, the second compression field 2312 indicates whether the 32×32 block was compressed for channel 1, the third compression field 2314 indicates whether the 32×32 block was compressed for channel 2 and the fourth compression field 2316 indicates whether the 32×32 block was compressed for channel 3. In this example, a '1' in a compression field indicates that the block was compressed for that channel and a '0' indicates that the block of that channel was not compressed. When the compression field indicates that a block is compressed for a channel at a particular level, it indicates that the channel block is represented at that level in the encoding using one of the available compression methods, which, it should be noted, may also include a raw (or not compressed) mode. Accordingly, the level 1 section 2304 of FIG. 23 indicates that only channel 3 was compressed as a 32×32 block. Similarly, at level 2 there are four blocks (i.e. four 16×16 blocks) so the level 2 section 2306 comprises a set of four compression fields (i.e. one for each channel) for each of the four 16×16 blocks which indicates whether the 16×16 block of that channel was compressed. There are therefore sixteen compression fields at level 2, of which eight are illustrated as fields 2322, 2324, 2326, 2328, 2334, 2336, 2338, and 2340. Similarly, at level 3 there are sixteen blocks (i.e. sixteen 8×8 blocks) so the level 3 section 2308 comprises a set of four compression (i.e. one for each channel) for each of the sixteen 8×8 blocks which indicates whether the 8×8 block of that channel was compressed. There are therefore sixty four compression fields at level 3, of which eight are illustrated as fields 2342, 2344, 2346, 2348, 2358, 2360, 2362, and 2364.

If the compression field for any block indicates that the block is compressed for a channel then the corresponding section 2304, 2306 and 2308 of the header 2302 also comprises information indicating the size or length of the fixed-length parameter and the common base information for that block for that channel. Specifically, in the example shown in FIG. 23 for any block that was compressed for a channel the corresponding section 2304, 2306, 2308 of the header 2302 comprises a length field 2318, 2330, 2350, 2352, 2366, 2368, 2370 that indicates the length or size of the fixed-length parameter for that block; and a common base information field 2320, 2332, 2354, 2356, 2372, 2374, 2376 that indicates the common base information for that block. For example, the first 16×16 block (i.e. 16×16 block 0) is compressed for channel 2 only so the level 2 section 2306 comprises a length field 2330 and common base information field 2332 for channel 2 for that block. Similarly, the last 8×8 block (i.e. 8×8 block 15) is compressed for channels 0, 1 and 2 so the level 3 section 2308 comprises a length field 2366, 2368, 2370 and a common base information field 2372, 2374, 2376 for each of channels 0, 1 and 2. The length field and the common base information field may be configured as described above with respect to FIG. 15.

It will be evident to a person of skill in the art that this is an example header only and that the header may take any suitable form. For example, in other cases, instead of having a length field and common base information field for each compressed block there may be a compression algorithm field, a length field and a common base information field as described with respect to FIG. 16. In yet other cases, instead of having a separate compression field and length field there may be a single length field which indicates whether or not the block is compressed, and if so, indicates the compression algorithm and the length or size of the fixed-length parameter. For example, as described above with respect to FIG. 15 there may be a 4-bit length field where a 0 ('0000' (binary)) indicates that the corresponding channel block was compressed using the common value compression algorithm; any number between 1 ('0001' (binary)) and 7 ('0111' (binary)) indicates that the corresponding channel block was compressed using the origin and delta compression algorithm and the parameter length (i.e. the number of delta bits) is equal to that number; an 8 ('1000' (binary)) indicates that the corresponding channel block was not compressed and the raw or original colour values of that channel block are included in the compressed block; and a 15 ('1111' (binary)) indicates that the corresponding channel block was not compressed (or, not encoded) at this level. This is summarised in Table 4.

TABLE 4

| Size Field (binary) | Is the channel block compressed/encoded at this level? | Raw | Compression Algorithm | Parameter Length |
| --- | --- | --- | --- | --- |
| 0000 | Y | N | Common Value | 0 |

TABLE 4-continued

| Size Field (binary) | Is the channel block compressed/encoded at this level? | Raw | Compression Algorithm | Parameter Length |
|---|---|---|---|---|
| 0001-0111 | Y | N | Origin and Delta | Value in Size Field |
| 1000 | Y | Y | — | — |
| 1111 | N | — | — | — |

Where the hierarchical compression scheme is used to compress a block of image data the fixed-length parameters and/or original colour values may be stored in the body at the smallest block level. For example, if each channel block can be compressed at a 32×32 block level or an 8×8 block level then the fixed-length parameters and/or original colour values corresponding to each 8×8 image block may be stored or grouped together. This ensures that any pixel within a particular 8×8 block will be represented by the same number of data bits allowing a particular pixel to be randomly accessible within that block. Specifically, either a channel will be compressed/not compressed at this level meaning that the number of bits per colour value for that channel are fixed by the compression algorithm/no compression at this level or a channel will be compressed at a higher level meaning that the number of bits per colour value for that channel are fixed by the compression algorithm at the higher level.

Although the hierarchical compression method is described as forming part of the method 200 of FIG. 2, in other examples the hierarchical compression method may be used independently of the method 200 of FIG. 2 to compress a channel block/sub-block or other image data (e.g. image data with only a single two-dimensional block of values). For example, in some cases the hierarchical compression method may be used to compress colour data at the pixel level.

Compression

Figure 24:
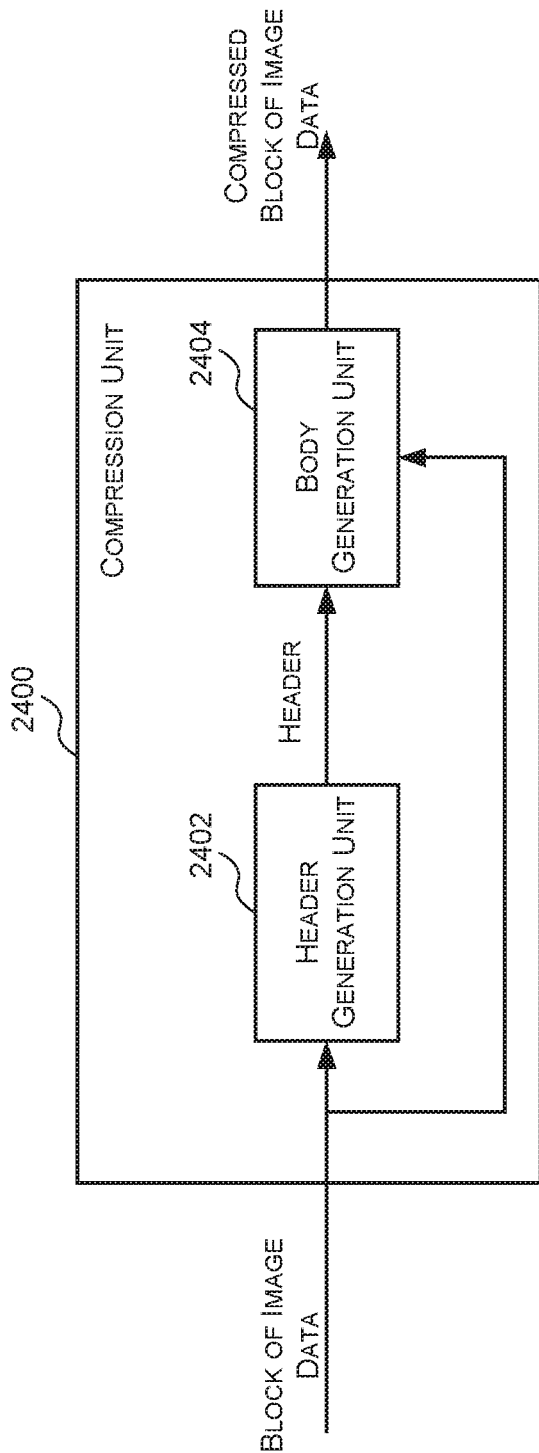
FIG. 24 is a block diagram of an example compression unit for compressing a block of image data.

Reference is now made to FIG. 24 which illustrates an example compression unit 2400 (which may form part of the compression/decompression unit 112 of FIG. 1) for compressing a block of image data using the method 200 of FIG. 2. The compression unit 2400 comprises a header generation unit 2402 and a body generation unit 2404.

The header generation unit 2402 is configured to receive the block of image data to be compressed and generate the header for the compressed data block based on the received image data. The received image data comprises data for an n×m block of pixels which can be divided into an n×m block of colour values for each colour channel. As described above, the header of the compressed data block comprises information that identifies which blocks of each channel block are compressed and if a block of a channel block is compressed, the header also comprises information identifying the length or size of the fixed-length parameters for that block and the common base information for that block.

Where the blocks of each colour channel that are to be compressed and the fixed-length compression algorithm to be used to compress those blocks are known then the header generation unit 2402 may be configured to determine, for each block of the channel blocks to be compressed, the length of the fixed-length parameters and the common base information based on the colour values in those blocks. For example, if each 8×8 block of each channel block is to be compressed using the origin and delta compression algorithm then the header generation unit may be configured to, for each 8×8 block: (i) analyse the colour values in the block to determine the range of values in each 8×8 block; (ii) determine the number of delta bits to represent the range; and (iii) identify the origin value (e.g. the minimum value).

Where the fixed-length compression algorithm to be used to compress a particular block of a channel block is not known in advance (i.e. is not predetermined) then the header generation unit 2402 may also be configured to dynamically select the fixed-length compression algorithm to be used to compress that particular block. The header generation unit 2402 may be configured to select one of a plurality of fixed-length compression algorithms to be used to compress a particular block of a channel block in any suitable manner. For example, the header generation unit 2402 may be configured to select a fixed-length compression algorithm to be used to compress a block of a channel block in accordance with any of the methods described above (e.g. method 1900 or method 2000 of FIGS. 19 and 20 respectively).

Where the particular blocks of a channel block that are to be compressed are not known in advance (i.e. they are not predetermined) then the header generation unit 2402 may also be configured to dynamically select the blocks of the channel block that are to be compressed. Any suitable method, such as a hierarchical method 2200 described above with respect to FIG. 22 may be used to dynamically select the blocks of a channel block that are to be compressed.

The body generation unit 2404 is configured to receive the block of image data and the header generated by the header generation unit 2402 and compress one or more blocks of at least one channel block in accordance with the header. Specifically, the body generation unit 2404 compresses each of the one or more blocks of the at least one channel by generating a fixed-length parameter for each colour value of that block based on the information in the header. As described above, where the blocks to be compressed are known in advance (i.e. are predetermined) and the fixed-length compression algorithm(s) to be used to compress those blocks is/are known in advance (i.e. is/are predetermined) then the header may comprise information identifying the length or size of the fixed-length parameter for each block to be compressed and the common base information. In these cases the body generation unit is configured to generate a fixed-length parameter for each colour value in each relevant block based on the length of the fixed-length parameter for that block and the common base information for that block in accordance with the known fixed-length compression algorithm for that block. For example, if it is known in advance that each 8×8 block is to be compressed using the origin and delta compression algorithm then the body generation unit 2404 generates a delta value (of the specified length) for each colour value in each 8×8 block that represents the difference between the colour value and the origin value for that block.

Where the fixed-length compression algorithm(s) and/or the blocks to be compressed are not known in advance then the header may also comprise information indicating which blocks of each channel block are to be compressed and/or the fixed-length compression algorithm to be used to compress the relevant blocks. In these cases, the body generation unit 2404 may be configured to identify which blocks of each channel block are to be compressed based on the information in the header and/or the fixed-length compression algorithm to be used to compress each of the relevant blocks.

Once the body generation unit 2404 has generated the fixed-length parameters for each block to be compressed, the body generation unit 2404 may be configured to generate the body of the compressed block by combining or merging the fixed-length parameters of each compressed block and the raw colour values for each uncompressed block. As described above, in some cases, the body may be generated by packing the fixed-length parameter(s) and/or colour values for each pixel into a pixel data unit, and then packing the pixel data units of each block together.

In some cases, the body and the header may be merged (by the body generation unit 2404 or another unit) to form a complete compressed block. However, in other cases the body and the header may be output separately.

The body and header may be stored in memory (e.g. frame buffer) together or separately.

Decompression

Figure 25:
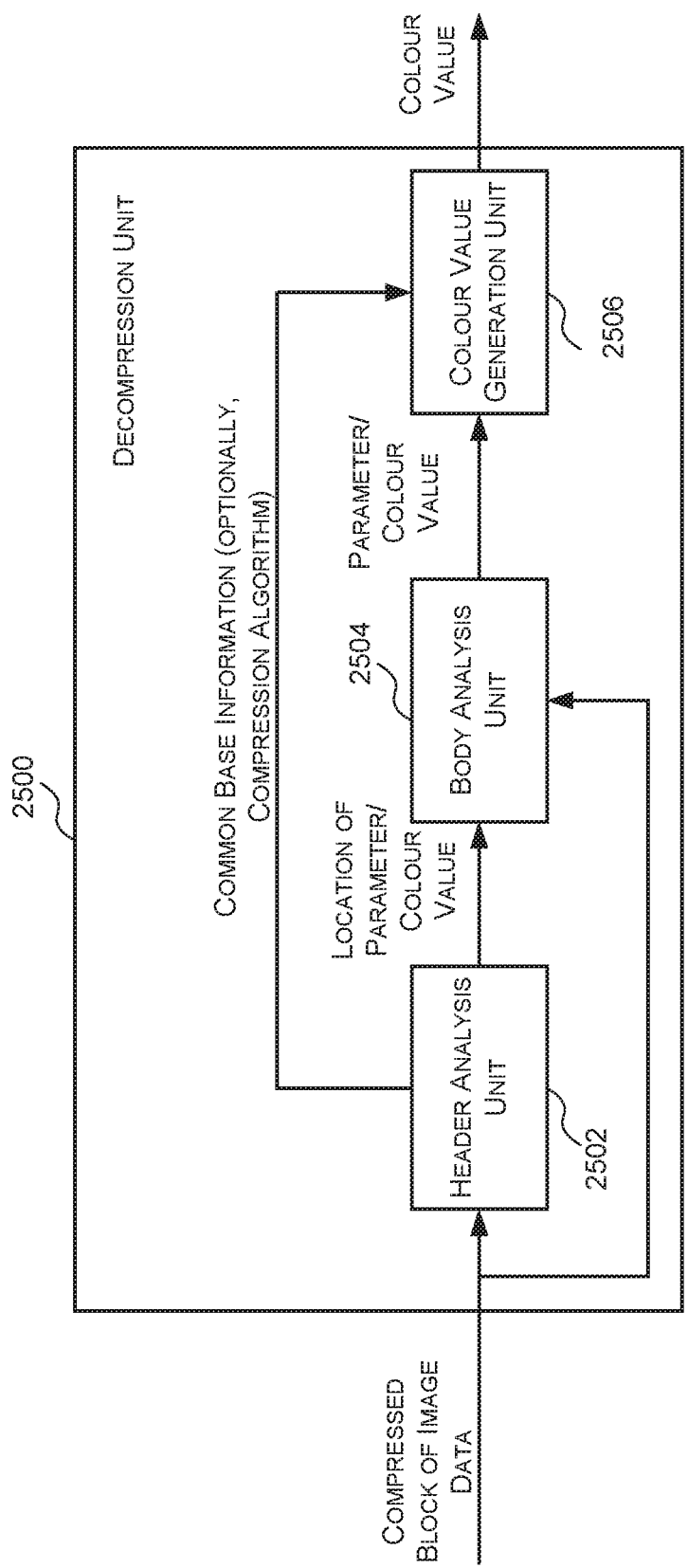
FIG. 25 is a block diagram of an example decompression unit for decompressing a compressed block of image data that was compressed using the method of FIG. 2.

Reference is now made to FIG. 25 which illustrates an example decompression unit 2500 (which may form part of the compression/decompression unit 112 of FIG. 1) for decompressing compressed image data generated in accordance with the method 200 of FIG. 2 to provide a channel colour value for a selected pixel. The decompression unit 2500 comprises a header analysis unit 2502 which is configured to analyse the header to identify the common base information for the channel colour value for the selected pixel and the location of the fixed-length parameter or colour value for the channel colour value for the selected pixel in the body; a body analysis unit 2504 configured to retrieve the fixed-length parameter or colour value from the identified location in the body; and a colour value generation unit 2506 configured to generate the colour value based on the common base information and the fixed-length parameter; or the colour value. The operation of the decompression unit 2500 will now be described in detail with respect to FIG. 26.

Figure 26:
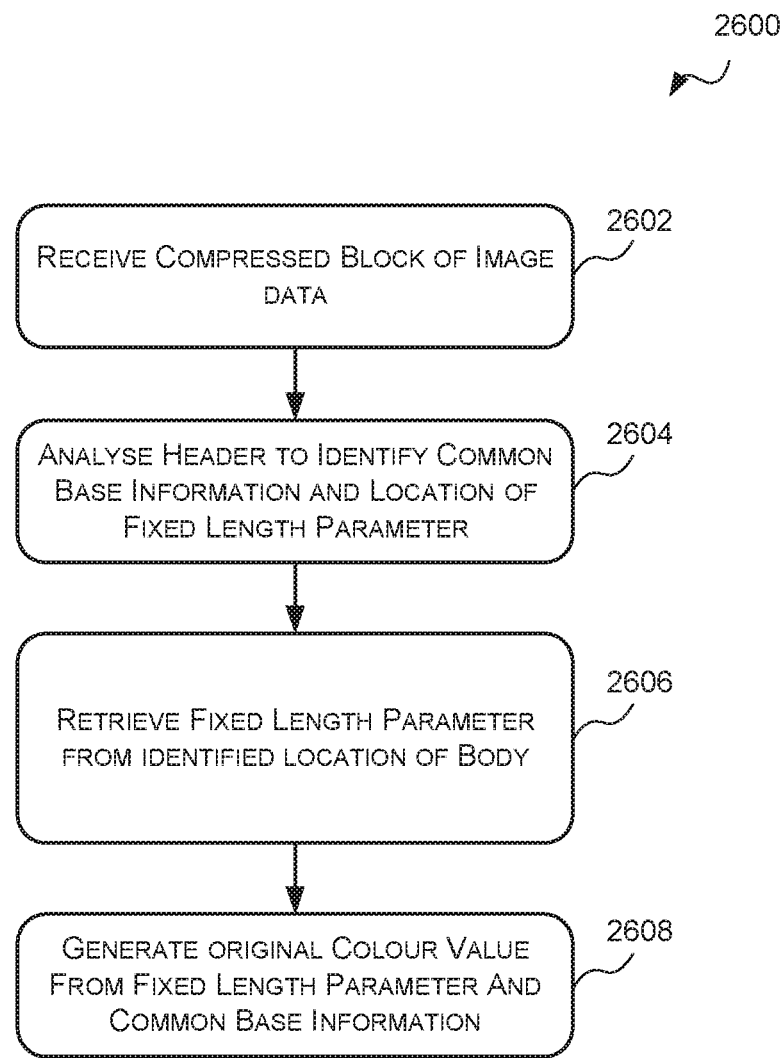
FIG. 26 is a flow diagram of an example method of decompressing a block of image data that was compressed using the method of FIG. 2.

Reference is now made to FIG. 26 which illustrates an example method 2600, which may be implemented by the decompression unit 2500 of FIG. 25, for decompressing a compressed block of image data generated in accordance with the methods described herein to produce a channel colour value for a selected pixel (which may be referred to herein as a pixel channel colour value). The method 2600 begins at step 2602 where the compressed block of image data is received at the decompression unit 2500. As described herein, the compressed block of image data comprises a header and a body. The header comprises information that indicates, for example, the blocks/sub-blocks that are compressed for each channel, and the length of the fixed-length parameter and the common base information of each compressed block/sub-block. The body comprises the fixed-length parameters for each compressed block and the raw colour values for each uncompressed block.

As described above, in some cases, a whole channel block may be compressed such that the header comprises (i) a single set of common base information for that channel block, and (ii) information identifying the length of the fixed-length parameters; and the body comprises a fixed-length parameter for each colour value in the channel block. In other cases, one or more sub-blocks of a channel block may be compressed. In these cases, the header comprises (i) a set of common base information for each compressed channel sub-block, and (ii) information identifying the length of fixed-length parameters for each compressed block, and the body comprises, for each compressed sub-block, a fixed-length parameter for each colour value in that sub-block. For example, where two sub-blocks of a channel block are compressed the header may comprise (i) common base information that is common to the colour values in the first sub-block and common base information that is common to the colour values in the second sub-block, and (ii) information indicating the length of the fixed-length parameters for the first sub-block and information indicating the length of the fixed-length parameters for the second sub-block; and the body may comprise a first fixed-length parameter for each colour value in the first sub-block and a second fixed-length parameter for each colour value in the second sub-block. Where multiple channel sub-blocks are compressed the different sub-blocks may have a different size and/or they may be compressed by different fixed-length compression algorithms. For example, in a hierarchical compression scheme where a 32×32 channel block may be compressed at a 32×32 block level, a 16×16 block level or an 8×8 block level the 32×32 block may be compressed as a 32×32 block or any combination of 16×16 and 8×8 blocks. For example, one 16×16 block may be compressed as a unit whereas the other 16×16 blocks may be compressed as 8×8 blocks. Similarly, where multiple channel sub-blocks are compressed different fixed-length compression algorithms may be used to compress different sub-blocks.

Also, as described above, the compressed block of image data may comprise information representing the colour values of a single channel block or multiple channel blocks. Where the compressed block of image data comprises information representing the colour values of multiple channel blocks (i.e. multiple colour channels) the header may comprise information indicating which block/sub-blocks of each channel have been compressed and for each block/sub-block of a channel that has been compressed the common base information and the length of the fixed-length parameter and, optionally the fixed-length compression algorithm that was used to compress that block/sub-block; and the body may comprise a fixed-length parameter for each colour value in a compressed channel block/sub-block and the colour value for each uncompressed channel block/sub-block. Different channels may be compressed in different sized blocks/sub-blocks and/or with different fixed-length compression algorithms.

Once the compressed block of image data has been received the method 2600 proceeds to step 2604.

At step 2604, the header analysis unit 2502 analyses the header of the compressed block to (i) determine the location in the body of the fixed-length parameter (if compressed) or the colour value (if not compressed) for the channel colour for the selected pixel; and (ii) determine the common base information related to the channel colour value for the selected pixel (if compressed). In some cases the location in the body of the fixed-length parameter (if compressed) or the colour value (if not compressed) may be based on the size of the fixed-length parameters for the compressed block/sub-block to which the desired colour value belongs.

Specifically, when a block of image data is compressed in accordance with the methods described herein the colour values within the lowest block/sub-block level that relate to a particular channel will be represented by a fixed number of bits, thus if the bits that relate to each colour value are stored in a predetermined order the bits in the body of the compressed block that relate to a particular colour value can be determined from the number of bits used to represent the colour values of each channel.

For example, for a four-channel image, if the lowest block-level for the compressed block is an 8×8 block then each channel 0 colour value in that 8×8 block will be represented by the same number of bits $b_0$, each channel 1 colour value in that 8×8 block will be represented by the same number of bits $b_1$, each channel 2 colour value in that 8×8 block will be represented by the same number of bits $b_2$, and each channel 3 colour value in that 8×8 block will be represented by the same number of bits $b_3$. Thus, if all the bits that relate to the same pixel are packed together to form a pixel data unit, then each pixel data unit will have $b_0+b_1+b_2+b_3$ bits. If the pixel data units for a block are then packed together in pixel order to form a block data unit then the start of the pixel data unit for the $i^{th}$ pixel, wherein the first pixel is numbered 0, is at the $i*(b_0+b_1+b_2+b_3)$ bit from the start of the block data unit. As described above, in some cases, the start of the block data unit may be determined from the length of the fixed-length parameters; and, in other cases, the header may comprise an offset value for the block that indicates the offset from the start of the body of the compressed data block at which the block data unit begins.

The particular bits of the pixel data unit that correspond to a particular colour value can then be determined from $b_0$, $b_1$, $b_2$, $b_3$ and the ordering of the channels in the pixel data unit. For example, if the bits of each channel are packed together in the pixel data unit in channel order, then the bits corresponding to the colour value for channel 0 are the first $b_0$ bits in the pixel data unit; the bits corresponding to the colour value for channel 1 are the $b_1$ bits starting from bit $b_0$; the bits corresponding to the colour value for channel 2 are the $b_2$ bits starting from bit $b_0+b_1$; and the bits corresponding to the colour value for channel 3 are the last $b_3$ bits starting from bit $b_0+b_1+b_2$.

If the fixed-length compression algorithm is not predetermined, the header analysis unit 2502 may also determine, from the header, the fixed-length compression algorithm used to compress the channel colour value for the selected pixel. Once the location of the fixed-length parameter or colour value in the body, and the common base information have been determined from the header of the compressed block the method 2600 proceeds to step 2606.

At step 2606, the body analysis unit 2504 retrieves the fixed-length parameter (if compressed) or the colour value (if not compressed) for the channel colour value for the selected pixel from the location of the body determined by the header analysis unit. Once the fixed-length parameter or the raw colour value has been retrieved from the body of the compressed block, the method 2600 proceeds to step 2608.

At step 2608, the colour value generation unit 2506 generates the raw colour value from the retrieved colour value (if not compressed) or from the common base information and the fixed-length parameter (if compressed). How the original colour value is generated from the common base information and the fixed-length parameter is based on the fixed-length compression algorithm used to compress the channel colour value.

For example, if the common value compression algorithm was used to compress the colour value then the common base information comprises the common colour value, the fixed-length parameter has zero bits, and the common colour value is used as the channel colour value; if the origin and delta compression algorithm was used to compress the colour value then the common base information comprise the origin value, the fixed-length parameter comprises a delta value representing the difference between the origin value and the colour value, and the desired colour value is generated by adding the origin value and the delta value (as described above, in some cases the addition may be performed modulo m wherein $m=2^x$ wherein each colour value comprises x bits); if the multiple origin and delta compression algorithm was used to compress the colour value then the common base information comprises multiple origin values and the fixed-length parameter comprises an index identifying one of the origin values and a delta value representing the difference between the identified origin value and the colour value, and the desired colour value is generated by adding the identified origin value and the delta value (as described above, in some cases the addition may be performed modulo m wherein $m=2^x$ wherein each colour value comprises x bits); if the look-up table compression algorithm was used to compress the colour value then the common base information comprises a look-up table with a plurality of colour values and the fixed-length parameter comprises an index that identifies one of the colour values in the look-up table (i.e. an index to the look-up table), and the colour value that is identified by the index is used as the desired colour value; and if the predetermined colour compression algorithm was used to compress the colour value then the common base information comprises information identifying one of one or more predetermined colour values, the fixed-length parameter comprises zero bits, and the identified predetermined colour value is used as the desired colour value.

As described above, when the predetermined colour compression algorithm is used there may be only a single predetermined colour value and the common base information may comprise information indicating that the predetermined colour compression algorithm was used to compress the colour value. In other cases, there may be a plurality of predetermined colour values where one or more of the predetermined colour values are fixed and/or one or more of the predetermined colour values may be configurable. In some cases, the common base information may identify a particular predetermined colour value for more than one channel. For example, the common base information may indicate that the colour values for the first channel are a particular predetermined colour value and the colour values for a second channel are a particular predetermined colour value. For example, the common base information may indicate that the pixel colour value (i.e. the combination of the channel colour values) for the pixels in the compressed block is a predetermined value.

The fixed-length compression algorithm that was used to compress the colour value may be predetermined, or determined from the header by the header analysis unit 2502 and then provided to the colour value generation unit 2506.

Test Results

Figure 27:
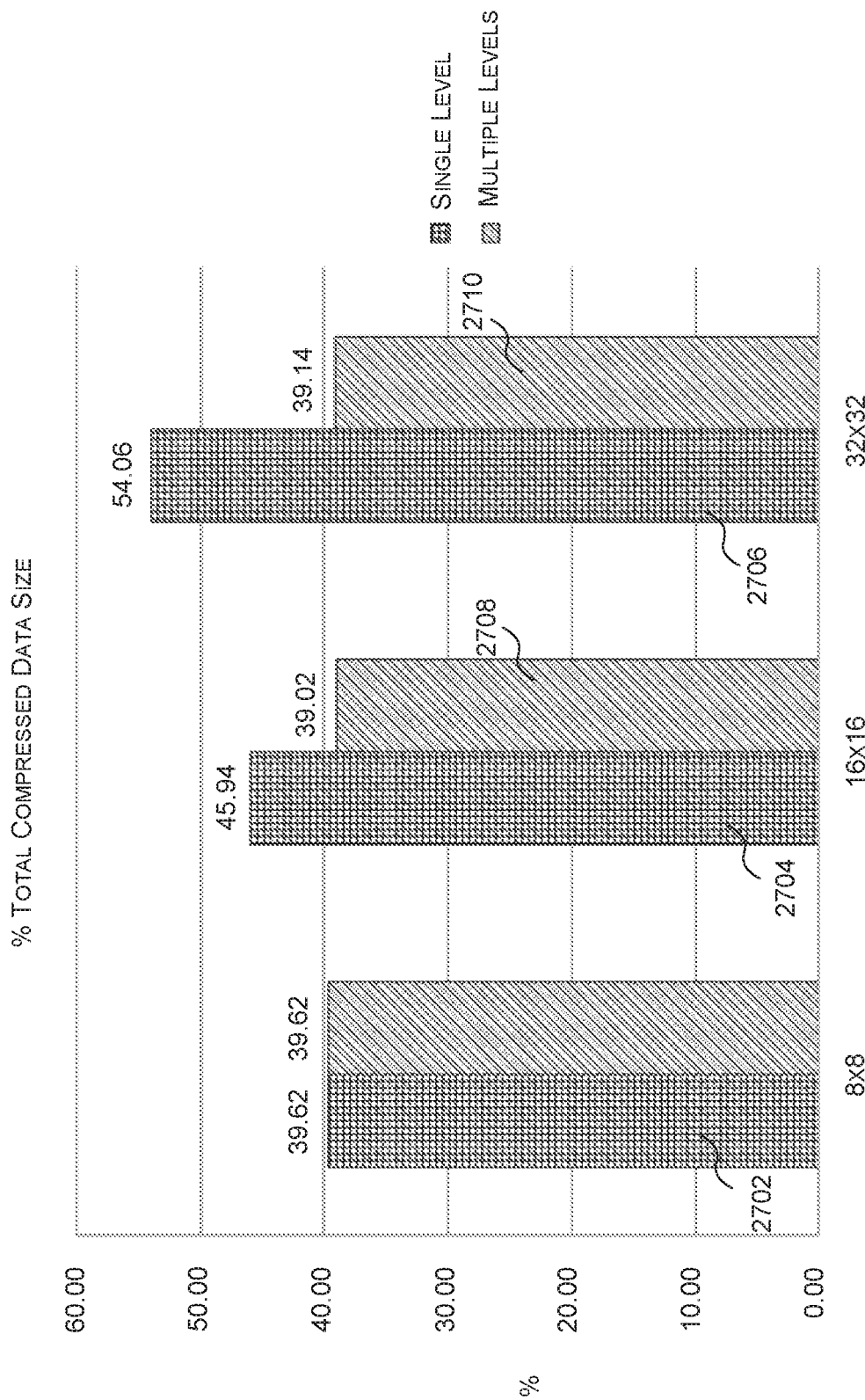
FIG. 27 is a graph illustrating the size of the compressed blocks of image data compared to the size of the uncompressed blocks of image data for a variety of compression schemes for a benchmark test.

Reference is now made to FIG. 27 which illustrates the results of using the described compression method for the Manhattan 3.0 benchmark test. Specifically, FIG. 27 shows the size of the compressed blocks of image data (including the header data and the body data) relative to the uncompressed blocks of image data when 32×32 image data blocks were compressed at a single level of compression—i.e. a 32×32 block, 16×16 blocks or 8×8 blocks—using the origin and delta compression method. It can be seen at 2702 that when the 32×32 blocks of image data were compressed in 8×8 blocks the size of the compressed data blocks were 40% of the size of the uncompressed blocks of image data which is a 60% reduction. As shown at 2704, when the 32×32 blocks of image data were compressed in 16×6 blocks the size of the compressed data blocks were 46% of the size of the uncompressed blocks of image data, which is a 54% reduction. As shown at 2706, when the 32×32 blocks of image data were compressed in 32×32 blocks the size of the compressed data blocks were 54% of the size of the uncompressed blocks of image data, which is a 46% reduction. Accordingly, the simpler single level compression has shown to work particularly well for an 8×8 block level.

FIG. 27 also shows at 2708 that when a hierarchical compression method was implemented such that 32×32 blocks were compressed at a 16×16 block level if there was a common colour value in the 16×16 block, otherwise the 8×8 blocks were compressed using the origin and delta compression algorithm, the size of the compressed blocks of image data was 39% of the size of the uncompressed blocks of image data, which is a 61% reduction. FIG. 27 also shows at 2710 that when a hierarchical compression method was implemented such that 32×32 blocks were compressed at a 32×32 level if there was a common colour value in the 32×32 block, if not the 8×8 blocks were compressed using the origin and delta compression algorithm, the size of the compressed blocks of image data was 39% of the size of the uncompressed block of image data, which is also a 61% reduction. Thus an improvement in the level of compression can be achieved with a hierarchical compression scheme, but this increases the complexity of the compression and decompression. It was found on average that the size of the header was about 7% of the size of the compressed blocks of image data.

Figure 28:
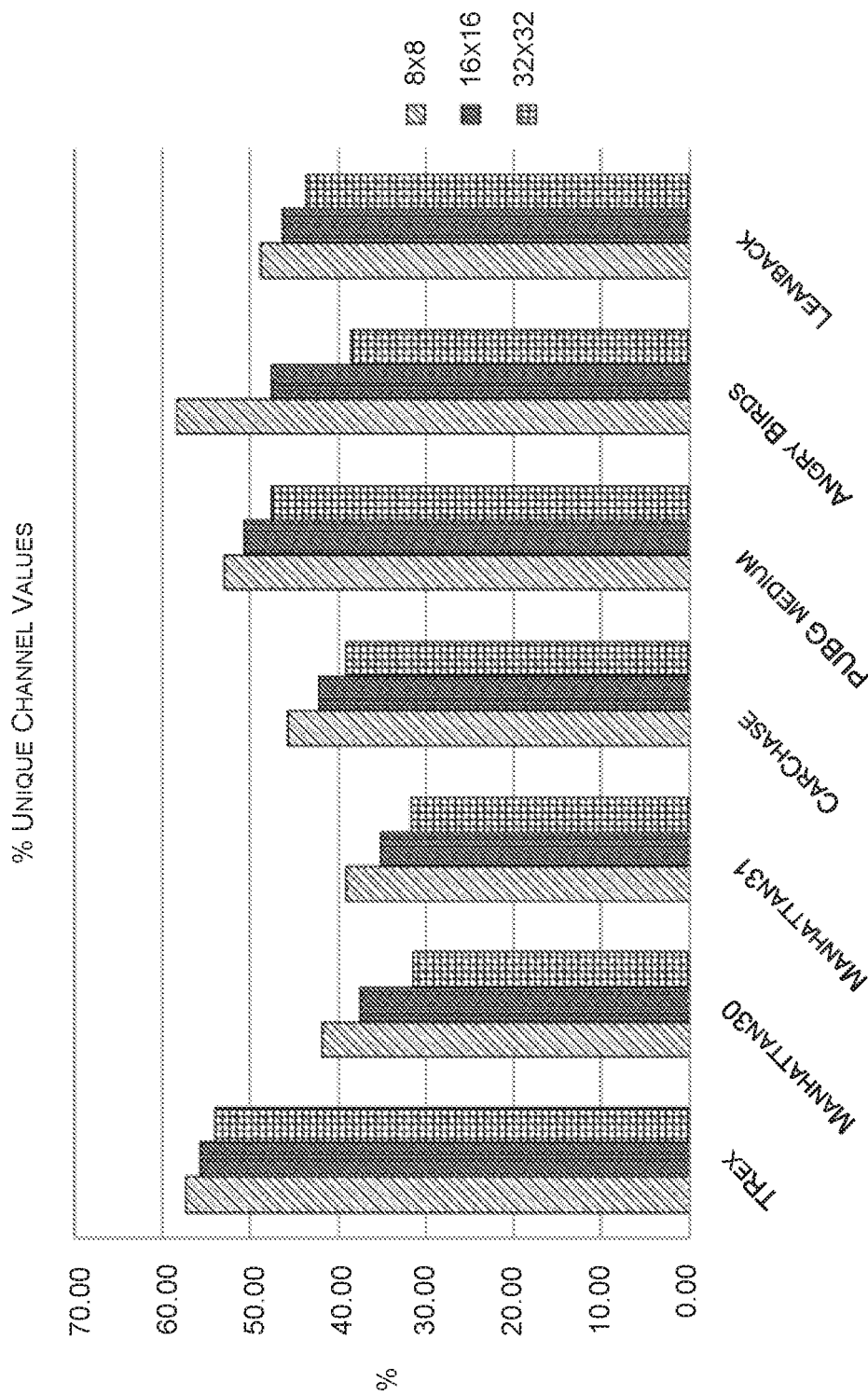
FIG. 28 is a graph illustrating the percentage of channel blocks with a common colour value for a plurality of different benchmark tests.

Reference is now made to FIG. 28 which illustrates the percentage of 8×8 blocks that have a common colour value (which are also referred to herein as unique colour blocks) for each of a plurality of benchmark tests for each of a plurality of different block sizes.

Figure 29:
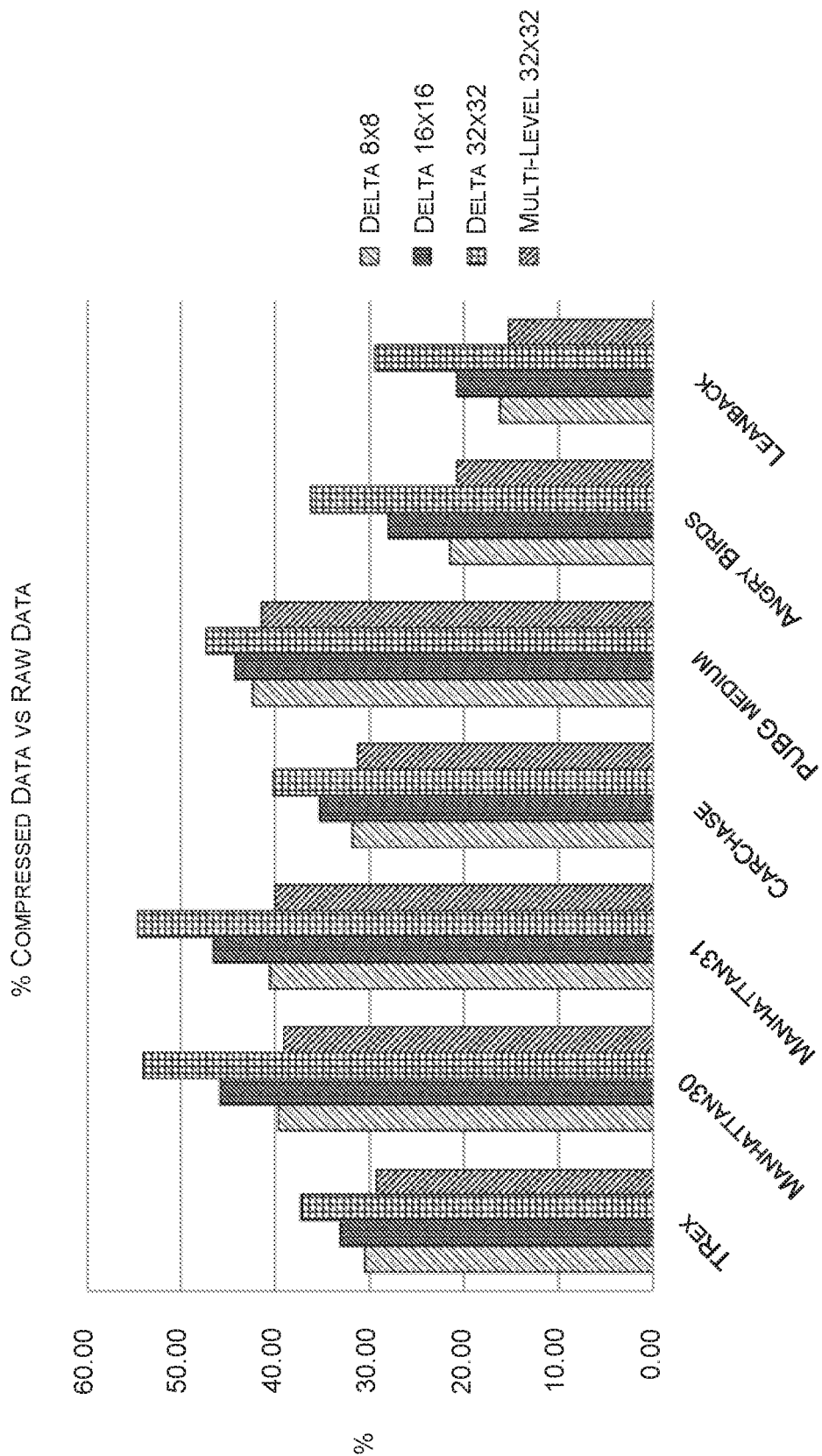
FIG. 29 is a graph illustrating the size of the compressed blocks of image data compared to the size of the uncompressed blocks of image data for a variety of compression schemes for a plurality of different benchmark tests.
Figure 30:
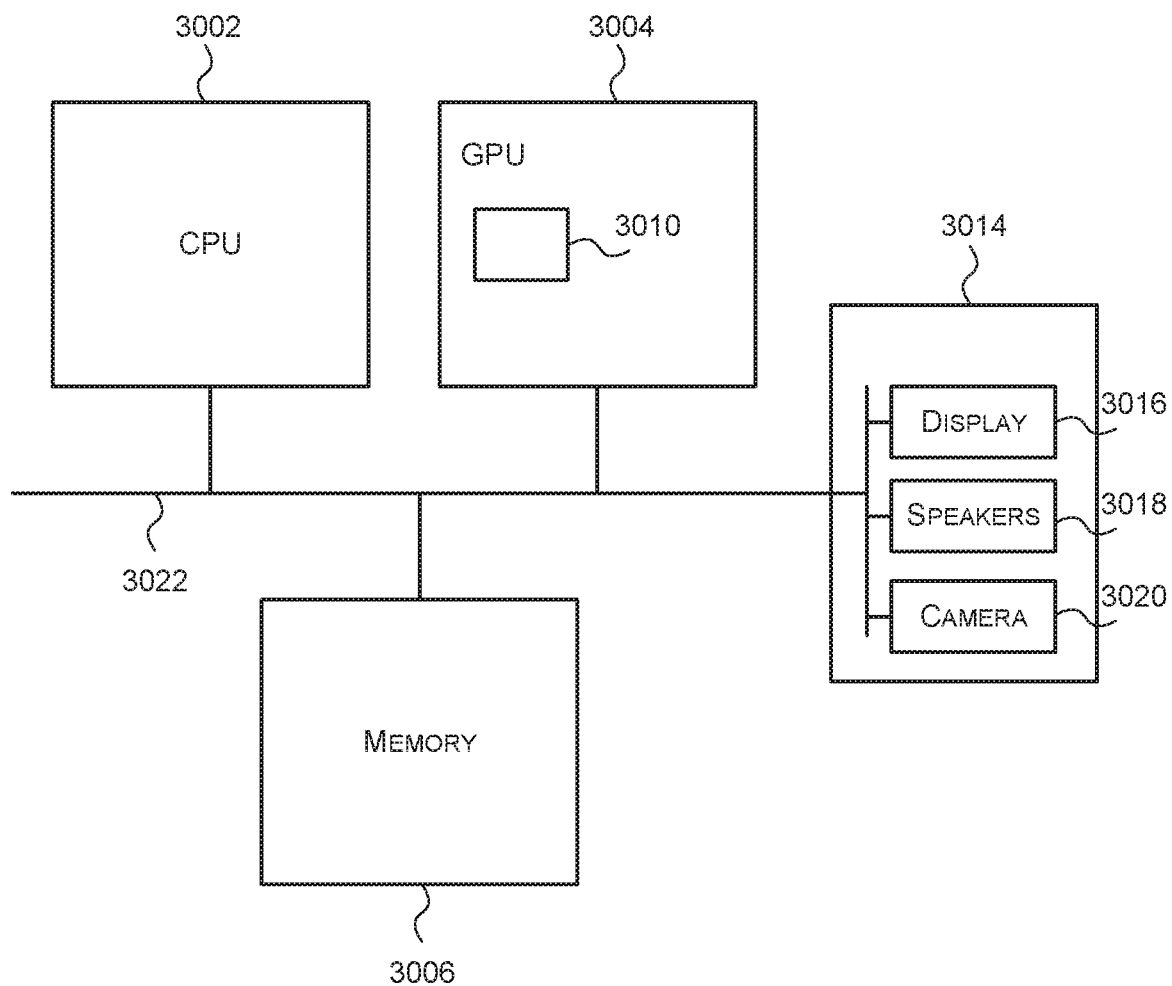
FIG. 30 is a block diagram of an example computer system in which the compression units, decompression units and/or compression/decompression units described herein may be implemented.

Reference is now made to FIG. 29 which illustrates the size of the compressed blocks of image data (including the header data and the body data) relative to the uncompressed blocks of image data when 32×32 image data blocks were compressed according to each of the following for each of a plurality of benchmark tests:
  a single level of compression—8×8 blocks—using the origin and delta compression algorithm
  a single level of compression—16×16 blocks—using the origin and delta compression algorithm
  a single level of compression—32×32 block—using the origin and delta compression algorithm
  Multi-level compression—
    32×32 block if common value—using the common value compression algorithm
    16×16 block if common value—using the common value compression algorithm
    8×8 blocks using the origin and delta compression algorithm FIG. 30 shows a computer system in which the compression units, decompression units, and compression/decompression units described herein may be implemented. The computer system comprises a CPU 3002, a GPU 3004, a memory 3006 and other devices 3014, such as a display 3016, speakers 3018 and a camera 3020. A processing block 3010 (which may be a compression unit, a decompression unit, or a compression/decompression unit described herein) is implemented on the GPU 3004. In other examples, the processing block 3010 may be implemented on the CPU 3002. The components of the computer system can communicate with each other via a communications bus 3022.

The compression and decompression units of FIGS. 24-25 are shown as comprising a number of functional blocks or units. This is schematic only and is not intended to define a strict division between different logic elements of such entities. Each functional block or unit may be provided in any suitable manner. It is to be understood that intermediate values described herein as being formed by a block or unit need not be physically generated by compression or decompression unit at any point and may merely represent logical values which conveniently describe the processing performed by the compression or decompression unit between its input and output.

The compression units, decompression units, and/or compression/decompression units described herein may be embodied in hardware on an integrated circuit. The compression units, decompression units, and/or compression/decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression unit, decompression unit, or compression/decompression unit configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a compression unit, a decompression unit, and/or compression/decompression unit as described herein. Furthermore, there may be provided an integrated circuit definition dataset that, when processed in an integrated circuit manufacturing system, causes the method of manufacturing a compression unit, decompression unit, and/or compression/decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression unit, a decompression unit, and/or a compression/decompression unit will now be described with respect to FIG. 31.

Figure 31:
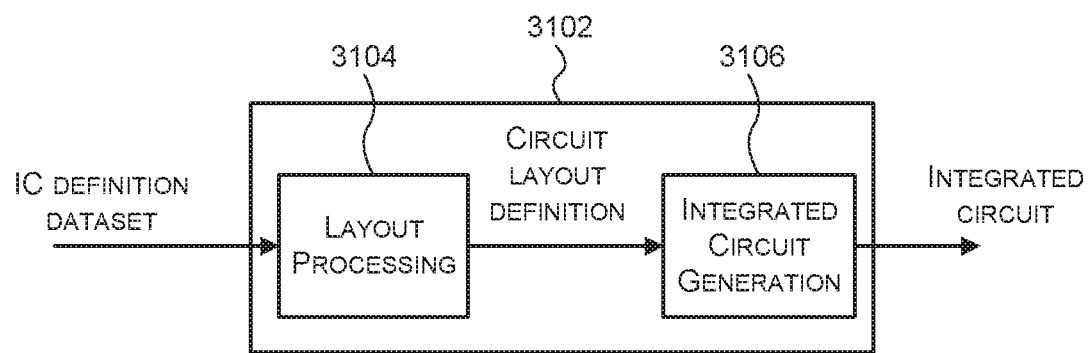
FIG. 31 is a block diagram of an example integrated circuit manufacturing system for generating an integrated circuit embodying a compression unit, a decompression unit or a compression/decompression unit described herein.

FIG. 31 shows an example of an integrated circuit (IC) manufacturing system 3102 which is configured to manufacture a compression unit, a decompression unit, and/or a compression/decompression unit as described in any of the examples herein. In particular, the IC manufacturing system 3102 comprises a layout processing system 3104 and an integrated circuit generation system 3106. The IC manufacturing system 3102 is configured to receive an IC definition dataset (e.g. defining a compression unit, a decompression unit, and/or a compression/decompression unit as described in any of the examples herein), process the IC definition dataset, and generate an IC according to the IC definition dataset (e.g. which embodies a compression units, decompression units, or compression/decompression unit as described in any of the examples herein). The processing of the IC definition dataset configures the IC manufacturing system 3102 to manufacture an integrated circuit embodying a compression unit, a decompression unit, or a compression/decompression unit as described in any of the examples herein.

The layout processing system 3104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 3104 has determined the circuit layout it may output a circuit layout definition to the IC generation system 3106. A circuit layout definition may be, for example, a circuit layout description.

The IC generation system 3106 generates an IC according to the circuit layout definition, as is known in the art. For example, the IC generation system 3106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 3106 may be in the form of computer-readable code which the IC generation system 3106 can use to form a suitable mask for use in generating an IC.

The different processes performed by the IC manufacturing system 3102 may be implemented all in one location, e.g. by one party. Alternatively, the IC manufacturing system 3102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression unit, a decompression unit, or a compression/decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 31 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 31, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of decompressing data from a compressed block of image data, the compressed block of image data representing a block of image data comprising a plurality of image element values, each image element value being divisible into at least a first value and a second value such that the block of image data comprises a two-dimensional block of first values, the method comprising:
    receiving the compressed block of image data, the compressed block of image data comprising:
        a body comprising a fixed-length parameter for each value in a first set of values that is zero, one or more than one bits, the first set of values comprising all or a portion of the two-dimensional block of first values, and
        a header comprising common base information that is common to the first set of values and information identifying a size of the fixed-length parameters for the first set of values, each value in the first set of values being obtainable from the common base information for the first set of values and the fixed-length parameter for that value;
    analysing the header to identify (i) a location in the body of the fixed-length parameter for a first selected value in the first set of values, and (ii) the common base information for the first set of values;
    retrieving the fixed-length parameter for the first selected value from the identified location in the body; and
    generating the first selected value from the common base information for the first set of values and the fixed-length parameter for the first selected value.

2. The method of claim 1, wherein the first selected value is generated from the common base information for the first set of values and the fixed-length parameter for the first selected value in accordance with a first fixed-length compression algorithm used to compress the first set of values.

3. The method of claim 2, wherein the header further comprises information identifying the first fixed-length compression algorithm and the method further comprises analysing the header of the compressed block of image data to identify the first fixed-length compression algorithm.

4. The method of claim 1, wherein:
    the first set of values comprises a first portion of the two-dimensional block of first values;
    the body further comprises a fixed-length parameter for each value in a second set of values that is zero, one or more than one bits, the second set of values comprising a second portion of the two-dimensional block of first values;
    the header further comprises common base information that is common to the second set of values and information identifying a size of the fixed-length parameters for the second set of values, each value in the second set of values being obtainable from the common base information for the second set of values and the fixed-length parameter for that value; and
    the method further comprises:
        analysing the header to identify (i) a location in the body of the fixed-length parameter for a second selected value of the second set of values, and (ii) common base information for the second set of values,
        retrieving the fixed-length parameter for the second selected value from the identified location in the body, and
        generating the second selected value from the common base information for the second set of values and the fixed-length parameter for the second selected value.

5. The method of claim 4, wherein the second selected value is generated from the common base information for the second set of values and the fixed-length parameter for the second selected value in accordance with a second fixed-length compression algorithm used to compress the second set of values.

6. The method of claim 1, wherein:
    the block of image data further comprises a two-dimensional block of second values;
    the body further comprises a fixed-length parameter for each value in a third set of values that that is zero, one or more than one bits, the third set of values comprising all or a portion of the two-dimensional block of second values;
    the header further comprises common base information that is common to the third set of values and information identifying a size of the fixed-length parameters for the third set of values, each value in the third set of values being obtainable from the common base information for the third set of values and the fixed-length parameter for that value; and
    the method further comprises:
        analysing the header to identify (i) a location in the body of a fixed-length parameter for a third selected value in the third set of values, and (ii) common base information for the third set of values,
        retrieving the fixed-length parameter for the third selected value from the identified location in the body, and
        generating the third selected value from the common base information for the third set of values and the fixed-length parameter for the third selected value.

7. The method of claim 6, wherein the third selected value is generated from the common base information for the third set of values and the fixed-length parameter for the third selected value in accordance with a third fixed-length compression algorithm used to compress the third set of values.

8. The method of claim 1, wherein:
the block of image data further comprises a two-dimensional block of second values;
each first value and each second value corresponds to a pixel; and
the body comprises a pixel data unit for each pixel, the pixel data unit comprising:
first data representing the first value in the two-dimensional block of first values corresponding to that pixel, the first data comprising the first value or a fixed-length parameter for that first value generated in accordance with a fixed-length compression algorithm, and
second data representing the second value in the two-dimensional block of second values corresponding to that pixel, the second data comprising the second value or a fixed-length parameter for that second value generated in accordance with a fixed-length compression algorithm.

9. The method of claim 8, wherein in the body the pixel data units are grouped into blocks and the first data of each pixel data unit in a block is a same size and the second data of each pixel data unit in a block is a same size.

10. The method of claim 8, wherein analysing the header to identify a location in the body of the fixed-length parameter for the first selected value comprises:
analysing the header to identify a size of the first data for the block of pixel data units corresponding to the first selected value;
analysing the header to identify a size of the second data for the block of pixel data units corresponding to the first selected value; and
determining a location in the body of the pixel data unit corresponding to the first selected value based on the identified sizes of the first data and the second data.

11. The method of claim 1, wherein analysing the header to identify the common base information for the first set of values comprises analysing the header to identify the first set of values and identifying the common base information associated with the first set of values.

12. The method of claim 11, wherein analysing the header to identify the first set of values comprises analysing the header to identify a size of a compressed set of values comprising the first selected value, the size of a compressed set of values being one of a plurality of predetermined sizes.

13. The method of claim 1, wherein:
the common base information for the first set of values comprises information identifying one of one or more predetermined values and the fixed-length parameter for the first selected value has zero bits; and
generating the first selected value from the common base information for the first set of values and the fixed-length parameter for the first selected value comprises using the identified predetermined value as the first selected value.

14. The method of claim 1, wherein:
the block of image data further comprises a two-dimensional block of second values;
the common base information for the first set of values comprises information identifying a first predetermined value for the first set of values and a second predetermined value for a second set of values comprising all of the two-dimensional block of second values or a portion of the two-dimensional block of second values;
the fixed-length parameter for the first selected value has zero bits; and generating the first selected value from the common base information for the first set of values and the fixed-length parameter for the first selected value comprises using the first predetermined value as the first selected value.

15. The method of claim 1, wherein:
the common base information for the first set of values comprises an origin value and the fixed-length parameter for the first selected value comprises a delta value that represents a difference between the first selected value and the origin value; and
generating the first selected value from the common base information for the first set of values and the fixed-length parameter for the first selected value comprises adding the origin value and the delta value to form the first selected value.

16. The method of claim 1, wherein:
the common base information for the first set of values comprises a plurality of origin values and the fixed-length parameter for the first selected value comprises an index identifying one of the plurality of origin values and a delta value representing a difference between the first selected value and the identified origin value; and
generating the first selected value from the common base information for the first set of values and the fixed-length parameter for the first selected value comprises identifying one of the plurality of origin values from the index and adding the identified origin value to the delta value to form the first selected value.

17. The method of claim 1, wherein:
the common base information for the first set of values comprises a look up table of values and the fixed-length parameter for the first selected value comprises an index to the look up table; and
generating the first selected value from the common base information for the first set of values and the fixed-length parameter for the first selected value comprises identifying one of the values in the look up table from the index and using the identified value as the first selected value.

18. The method of claim 1, wherein:
the common base information for the first set of values comprises a common value that is common to the first set of values and the fixed-length parameter for the first selected value has zero bits; and
generating the first selected value from the common base information for the first set of values and the fixed-length parameter for the first selected value comprises using the common value as the first selected value.

19. A decompression unit configured to decompress data from a compressed block of image data, the compressed block of image data representing a block of image data comprising a plurality of image element values, each image element value being divisible into at least a first value and a second value such that the block of image data comprises a two-dimensional block of first values, the decompression unit comprising:
a header analysis unit configured to:
receive a header of the compressed block of image data, the header comprising common base information that is common to a first set of values and information identifying a size of fixed-length parameters for the first set of values, the first set of values comprising all or a portion of the two-dimensional block of first values, and analyse the header to identify (i) a location in a body of the compressed block of image data of a fixed-length parameter for a first selected value of the first set of values, and (ii) the common base information for the first set of values;

a body analysis unit configured to:
receive the body, the body comprising a fixed-length parameter for each value in the first set of values that that is zero, one or more than one bits, each value in the first set of values being obtainable from the common base information for the first set of values and the fixed-length parameter for that value, and retrieve the fixed-length parameter for the first selected value from the identified location of the body; and a value generation unit configured to generate the first selected value from the common base information for the first set of values and the fixed-length parameter for the first selected value.

20. A non-transitory computer readable storage medium having stored thereon computer readable instructions that, when executed at a computer system, cause the computer system to perform the method as set forth in claim 1.

* * * * *